United States Patent
Yoshida et al.

(10) Patent No.: US 10,691,107 B2
(45) Date of Patent: Jun. 23, 2020

(54) PROCESS DESIGN DEVICE, PROCEDURE GENERATION DEVICE, METHOD OF CONTROLLING PROCESS DESIGN DEVICE, AND RECORDING MEDIUM

(71) Applicant: OMRON Corporation, Kyoto (JP)

(72) Inventors: Hiroshi Yoshida, Kusatsu (JP); Kenichiro Mori, Tama (JP); Hiromi Sasaki, Nagaokakyo (JP)

(73) Assignee: OMRON Corporation, Kyoto (JP)

( * ) Notice: Subject to any disclaimer, the term of this patent is extended or adjusted under 35 U.S.C. 154(b) by 17 days.

(21) Appl. No.: 16/161,083

(22) Filed: Oct. 16, 2018

(65) Prior Publication Data

US 2019/0179290 A1   Jun. 13, 2019

(30) Foreign Application Priority Data

Dec. 13, 2017 (JP) ................................ 2017-238597

(51) Int. Cl.
  *G05B 19/4155* (2006.01)
  *G06F 9/50* (2006.01)
  *G06Q 10/06* (2012.01)

(52) U.S. Cl.
  CPC ........... *G05B 19/4155* (2013.01); *G06F 9/50* (2013.01); *G06Q 10/0633* (2013.01); *G05B 2219/31056* (2013.01)

(58) Field of Classification Search
  CPC ..... G05B 19/4155; G05B 19/418; G06F 9/50; G06F 19/00; G06F 17/00; G06Q 10/0633
  See application file for complete search history.

(56) References Cited

U.S. PATENT DOCUMENTS

| | | | | |
|---|---|---|---|---|
| 2004/0210467 A1* | 10/2004 | Yokoyama | ....... | G05B 19/41865 705/7.24 |
| 2007/0156272 A1* | 7/2007 | Winstead | ............... | G05B 15/02 700/97 |
| 2008/0103622 A1* | 5/2008 | Hanses | .............. | G05B 19/4183 700/116 |
| 2010/0125354 A1* | 5/2010 | Knipfer | ............ | G05B 19/41865 700/95 |
| 2017/0147956 A1* | 5/2017 | Stiffler | ............. | G06Q 10/06311 |
| 2017/0199518 A1 | 7/2017 | Stoeckel et al. | | |

FOREIGN PATENT DOCUMENTS

| | | |
|---|---|---|
| JP | 2003044547 | 2/2003 |
| JP | 2015049819 | 3/2015 |

OTHER PUBLICATIONS

"Search Report of Europe Counterpart Application", dated Dec. 21, 2018, p. 1-p. 9.

* cited by examiner

*Primary Examiner* — Vincent H Tran
(74) *Attorney, Agent, or Firm* — JCIPRNET

(57) ABSTRACT

A process design device, a procedure generation device, a method of controlling a process design device, and a recording medium are provided, such that during an assembly procedure of a product, even when a special task process unique to the product, which is difficult to define in advance, is included, the process of assembling the product is designed. The process design device determines whether or not each task process in procedure data is a special process, displays the task process that has been determined to be the special process in an emphasized manner, and allows a user to decide a facility that is caused to execute the task process.

7 Claims, 24 Drawing Sheets

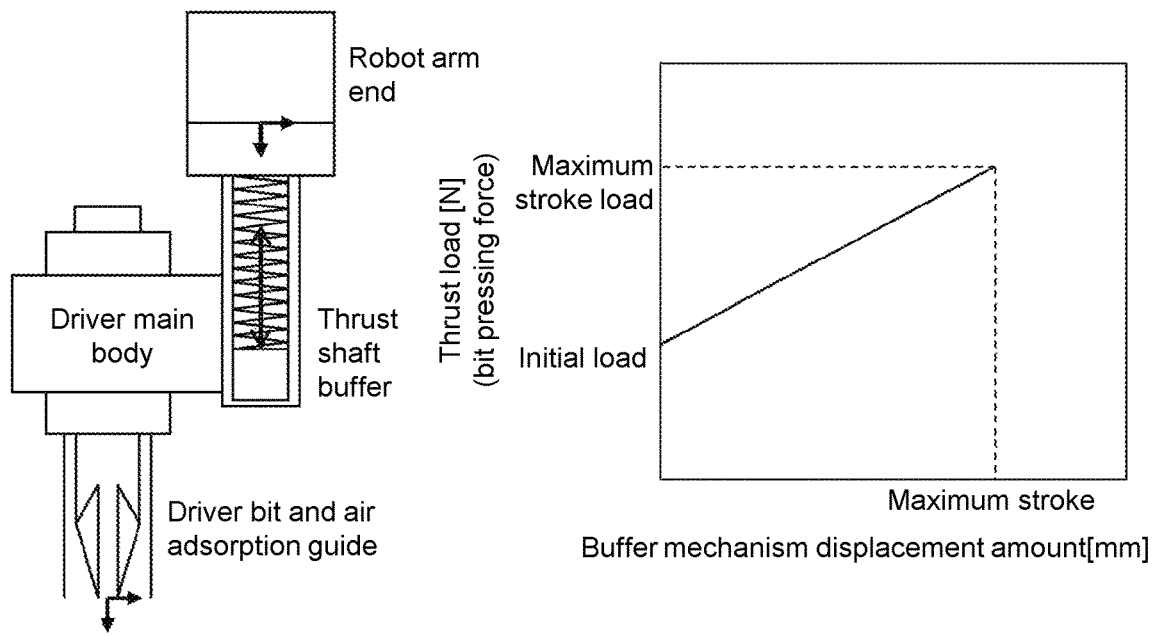

| Property Name | Description | Value Range | Unit |
|---|---|---|---|
| InitLoad | Initial thrust load (weight) with displacement 0 | Any | N |
| MaxDisp | Maximum displacement amount | Any | mm |
| LoadAtMaxDisp | Thrust load at maximum displacement amount | Any | N |

FIG. 6

| Parameter Name | Unit | Description |
|---|---|---|
| ScrewPosition<br>Screw providing position | Position and Orientation data in the world coordinate. | The target position and approaching orientation where the TCP should be to pick the provided screw. |
| AwaitningPositionAfterPick<br>Awaiting position after picking-up | Position and Orientation data in the world coordinate. | The position and orientation where the TCP should be after picking a screw. |
| MoveVelocity<br>Basic movement speed | % | Basic speed of TCP movement. |
| ApproDepartVelocity<br>Approaching and departing speed at the time of picking-up | % | Approating / Departing speed of TCP. |
| PauseTimeAtScewPosition<br>Pause time at feeded screw position | ms | Time to stay still at feeded screw position. |

FIG. 7

| Parameter Name | Unit | Description |
|---|---|---|
| ScrewHoleCenterPosition<br>Workpiece surface screw hole center | Separation speed after fastening | Position of workpiece surface screw hole center point and screw hole direction |
| ScrewLengthUnderHeadPortion<br>Length below screw neck | 0.1 mm | Length from "screw neck center point" that is located at workpiece surface position at time of completion of fastening to "screw tip end center point" |
| Depth of screw seating surface<br>Depth of screw hole seating surface | 0.1 mm | Depth from screw hole center point on workpiece surface to female screw seating surface center point |
| TighteningTorque<br>Fastening torque | Nm | Although fastening torque itself has to be mechanically set for electric driver, fastening torque is used to estimate appropriate values of variety of operation parameters, such as seating speed that depends on screw/screw hole materials, by providing fastening torque as setting to robot operation program. |
| DepartingDistance<br>Vertical separation distance after fastening | mm | Distance by which vertical separation has to be done along shaft of screw in order to remove driver bit from screw head after completion of fastening of screw; this is decided in accordance with shapes of screw head and driver bit. |
| DepartingSpeed<br>Separation speed after fastening | | Speed at which driver bit is removed from screw head after completion of fastening of screw; this is decided in accordance with shapes of screw head and driver bit. |
| | | |

FIG. 8

| Parameter Name | Unit | Description |
|---|---|---|
| ScrewHoleCenterPosition<br>Workpiece surface screw hole center | Position and Orientation data in the world coordinate. | Position of workpiece surface screw hole center point and screw hole direction |
| ApproDepartVelocity<br>Approaching and departing speed | % | Approating / Departing speed of TCP.TCP Target point approaching/departing speed of (tool tip end point) |
| ApproDepartDistance<br>Approaching and departing distance | mm | Approaching distance in vertical direction necessary in consideration of screw head height |
| | | |

FIG. 9

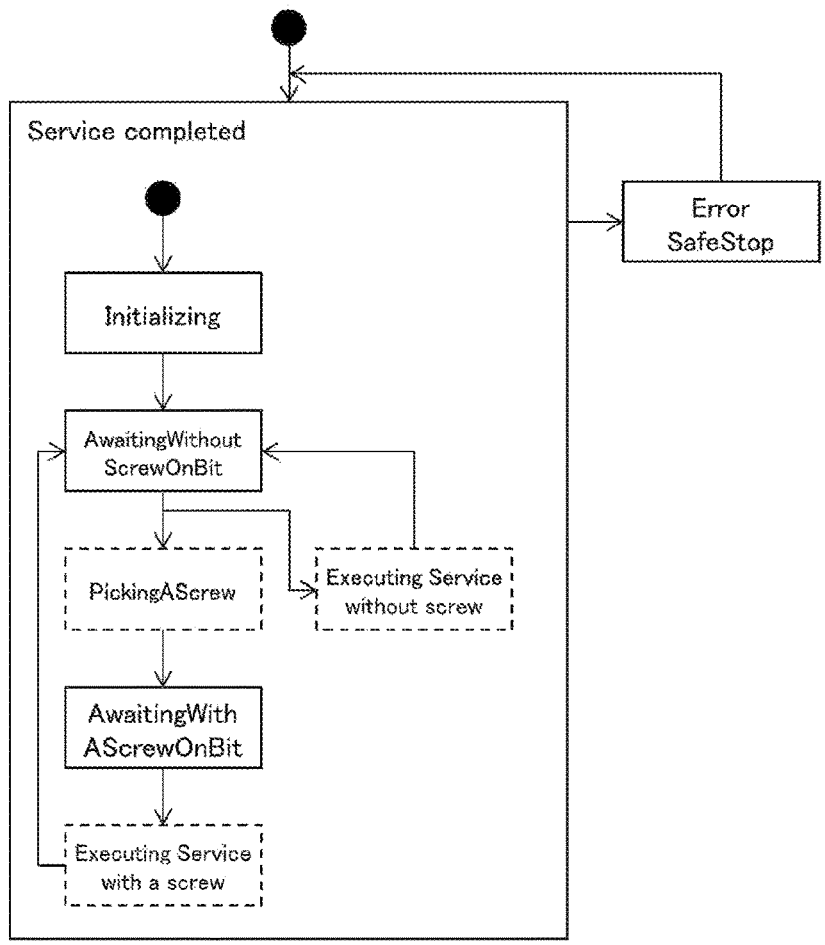

FIG. 10

| State | Content | Service that can be called |
|---|---|---|
| Initializing | During execution of initialization processing | — |
| AwaitingWithoutScrewOnBit | Waiting for service request in state in which there is no screw at bit tip end | PickAScrew / Pick up screw<br>RetightenScrew / Retighten screw<br>ChangeDriver / Change driver |
| ExecutingServiceWithoutScrew | During execution of service not using screw | — |
| PickingAScrew | During execution of service of picking up screw during "PickAScrew" | — |
| AwaitingWithAScrewOnBit | Waiting for service request in state in which screw is adsorbed at bit tip end | InsertAndTightenScrew / Insert and fasten screw |
| ExecutingServiceWithAScrew | During execution of service of consuming screw | — |
| Error/SafeStop | Safety stop state | — |

FIG. 11

PROCESS DESIGN DEVICE, PROCEDURE GENERATION DEVICE, METHOD OF CONTROLLING PROCESS DESIGN DEVICE, AND RECORDING MEDIUM

CROSS-REFERENCE TO RELATED APPLICATION

This application claims the priority benefit of Japan application serial no. 2017-238597, filed on Dec. 13, 2017. The entirety of the above-mentioned patent application is hereby incorporated by reference herein and made a part of this specification.

BACKGROUND

Technical Field

The present disclosure relates to a process design device and the like that associates executing subjects that execute a plurality of task processes included in a task procedure for assembling or disassembling a product with the respective task processes.

Description of Related Art

In the related art, research has been performed for progression in process design devices that are for examining a plurality of task processes for assembling products, execution orders of the respective task processes, executing subjects of the respective task processes, and the like and designing optimal processes for assembling the products using design information and the like of the products.

For example, Patent Document 1 (Japanese Laid-Open No. 2003-44547, published on Feb. 14, 2003) listed below discloses that a process design support device uses not only assembling and disassembling task costs calculated by a robot simulator but also optimized process dividing information that is defined as a rule by an operator for optimizing the entire processes.

Also, Patent Document 2 (Japanese Laid-Open No. 2015-49819, published on Mar. 16, 2015) discloses a production system simulation device that stores task element information including evoking conditions of task elements and output destinations after completion of the tasks and linking information between facility elements and the task elements. This device executes simulation such that a first facility element executes a task in response to satisfaction of evoking conditions of the task element information of the first task element linked with the first facility element in the linking information and provides an output to an output destination after completion of the task according to the task element information of the first task element.

However, the technologies as described above have a problem from the viewpoint that "the actual product assembly involves special task processes unique to a product, which are difficult to define in advance" is not included. That is, according to the technology disclosed in Patent Document 1, the entire processes are divided into processes defined in advance in accordance with "the rule for optimizing the entire assembling and disassembling processes" defined by the user, that is, there is an assumption that the processes are defined in advance. Also, according to the technology disclosed in Patent Document 2, it is not possible to execute the simulation unless the evoking conditions of each task element, output content after the completion of the task, and a standard task time are defined in advance for all the task elements related to the production of the product in the task element information.

SUMMARY

According to an aspect of the disclosure, there is provided a process design device that associates executing subjects that executes a plurality of task processes included in a task procedure for assembling or disassembling a product with the respective task processes, the device including: a standard process acquisition unit that acquires standard process data that defines a plurality of standard processes that are task processes executable by at least one facility; a facility acquisition unit that acquires, for each facility, facility data that defines task processes executable by the facility; a procedure acquisition unit that acquires procedure data that defines a plurality of task processes for assembling or disassembling a product along with an execution order for each product; a process determination unit that determines whether or not each of the plurality of task processes defined in the procedure data is included in the standard process data; and a display control unit that displays, in an emphasized manner, a special process that is a task process determined not to be included in the standard process data by the process determination unit on a display screen of the procedure data.

According to an aspect of the disclosure, there is provided a procedure generation device that supports a user generating the procedure data acquired by the process design device, and the procedure generation device may include: a shape presenting unit that presents, to a user, a three-dimensional shape of the product or a three-dimensional shape of each of one or more workpieces that form the product for each product; and a process presenting unit that presents, to a user, each of a plurality of standard processes defined in the standard process data.

According to an aspect of the disclosure, there is provided a method of controlling a process design device that associates an executing subject that executes each of a plurality of task processes included in a task procedure for assembling or disassembling a product with each task process, the method including: a standard process acquisition step in which standard process data that defines a plurality of standard processes, each of which is a task process executable by at least one facility, is acquired; a facility acquisition step in which facility data that defines a task process executable by each facility is acquired for each facility; a procedure acquisition step in which procedure data that defines a plurality of task processes for assembling or disassembling a product along with an execution order is acquired for each product; a process determination step in which it is determined whether or not each of the plurality of task processes defined in the procedure data is included in the standard process data; and a display control step in which a special process that is a task process determined not to be included in the standard process data in the process determination step is displayed in an emphasized manner on a display screen of the procedure data.

According to an aspect of the disclosure, a non-transitory computer readable recording medium that records an information processing program is provided. The image processing program causes a computer to function as the process design device described above, and causes the computer to function as the respective units.

BRIEF DESCRIPTION OF THE DRAWINGS

FIG. 6 is a diagram illustrating an example of items independent from input and output elements from among items to be set in facility data.

FIG. 7 is a diagram illustrating an example of items related to input and output elements from among the items to be set in the facility data.

FIG. 8 is a diagram illustrating an example of items other than those shown in FIG. 7 relating to the input and output elements from among the items to be set in the facility data.

FIG. 9 is a diagram illustrating an example of items other than those shown in FIGS. 7 and 8 relating to the input and output elements from among the items to be set in the facility data.

FIG. 10 is a diagram illustrating an example of a state machine diagram in the facility data.

FIG. 11 is a table for describing details of the respective states in the state machine diagram as exemplified in FIG. 10 and services that can be called in the respective states.

DESCRIPTION OF THE EMBODIMENTS

Figure 1:
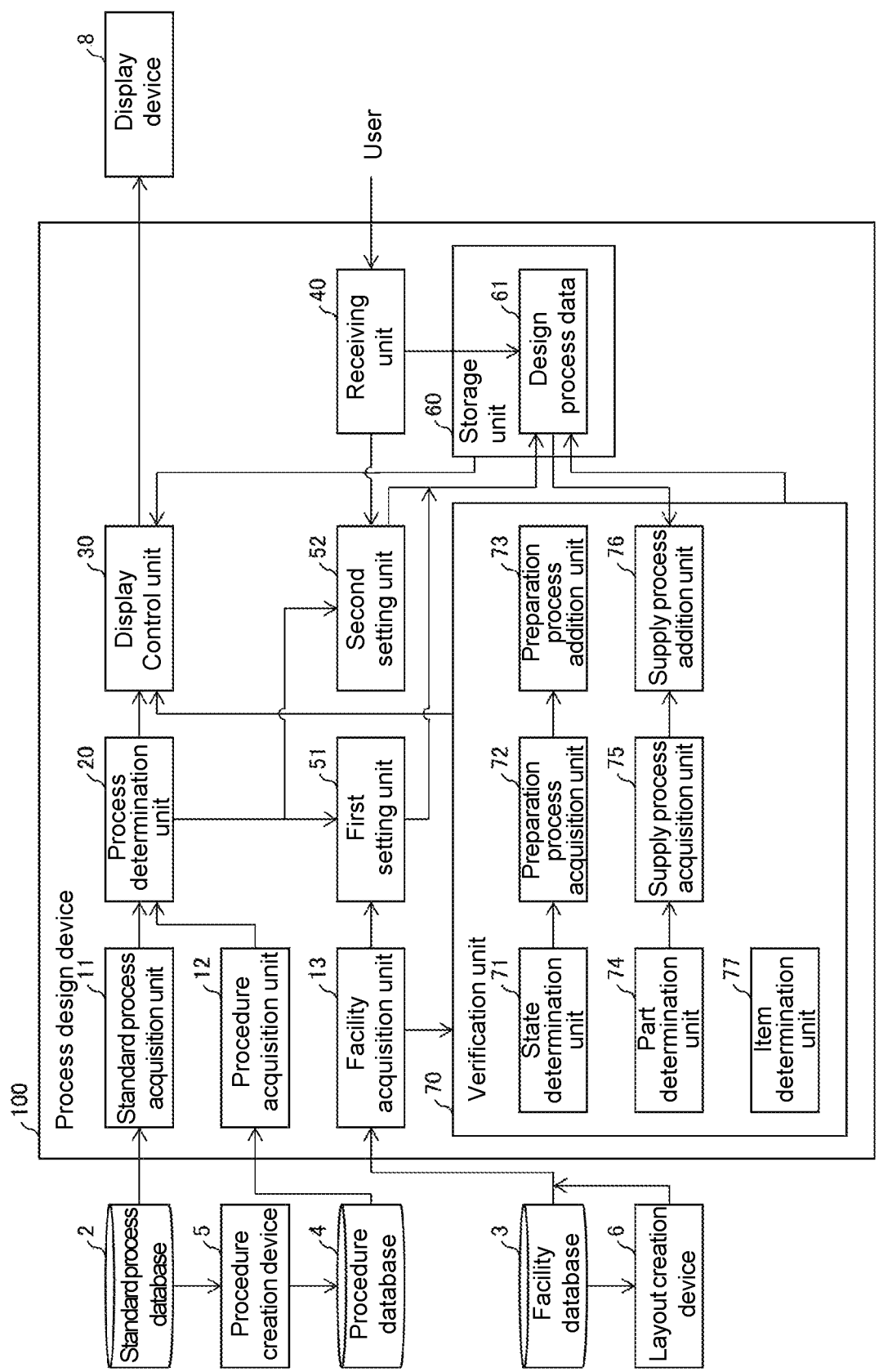
FIG. 1 is a block diagram illustrating configurations of main components, such as a process design device, according to a first embodiment of the disclosure.

The disclosure realizes a process design device and the like capable of designing a process for assembling a product even when special task processes unique to a product, which are difficult to define in advance, are included in an assembly procedure of a product.

According to the aforementioned configuration, the process design device determines whether or not each of the plurality of task processes defined in the procedure data is included in the standard process data and displays a task process determined not to be included in the standard process data as a special process in an emphasized manner.

Here, a special task process unique to a product, which is difficult to define in advance, is typically included in assembling and disassembling of the actual product.

The process design device determines whether or not such "a special task unique to the product, which is difficult to define in advance", that is, a task process that is not a standard process defined in the standard process data is included in the procedure data. Then, the process design device displays "the special task process unique to the product, which is difficult to define in advance" that is included in the procedure data as a special process in an emphasized manner, notifies the user of the task process, and prompts the user to examine such a task process.

Therefore, the process design device is possible to prompt the user to examine such a task process and to design a process of assembling a product or the like even when the special task process unique to the product, which is difficult to define in advance, is included in the procedure of assembling the product or the like.

The process design device according to an aspect of the disclosure may further include: a receiving unit that receives a user's operation for the facilities for executing the special process displayed by the display control unit in the emphasized manner; and a setting unit that (1) associates, as an executing subject, a facility defined as a facility capable of executing a task process determined to be included in the standard process data by the process determination unit, in the facility data with the task process and (2) generates design process data that associates, as the executing subject, the facility set by the user's operation with the special process, from among the plurality of task processes defined along with the execution order in the procedure data.

According to the aforementioned configuration, the process design device generates the design process data that (1) associates the facility defined in the facility data with a standard process and (2) associates the facility set by the user with the special process from among the plurality of task processes defined along with the execution order in the procedure data.

The process design device generates the design process data that associates the executing subject with each task process even in the task procedure that includes "the special task process unique to the product, which is difficult to define in advance".

Therefore, the process design device is possible to design a process in which the executing subject is associated with each task process in a procedure even when a special task process unique to a product, which is difficult to define in advance, is included in a procedure of assembling a product or the like.

In the process design device according to an aspect of the disclosure, for each combination of a facility and a task process in the facility data, an item that needs to set a value in advance to cause the facility to execute the task process may be defined, the process design device may further include an item determination unit that determines for a combination of a facility and a task process in the design process data whether or not a value has been set for the item defined for the combination in the facility data, the display control unit may display information for prompting setting of a value for the item for which the item determination unit has determined that no value has been set, the receiving unit may receive a user's operation for inputting the value for the item, and the setting unit may associate the item for which the value input by the user's operation has been set with the combination in the design process data.

According to the aforementioned configuration, the process design device determines whether or not a value has been set for an item that needs to set a value in advance to cause the facility to execute a task process, and if it is determined that no value has been set for the item, the process design device prompts the user to set the value. Then, the process design device sets the value input by the user for the item and enables the facility to execute the task process.

Therefore, the process design device is possible to perform setting of the values for items, which are necessary to cause the facility associated as the executing subject of each task process to execute each task process included in the procedure for assembling a product or the like, and to cause the facility associated with each task process to execute each task process.

In the process design device according to an aspect of the disclosure, in the facility data, state transition information describing at least (A) an initial state of the facility, (B) an execution state that is a state in which the facility is executing a task process executable by the facility, (C) a stand-by state in which the task process executed in the execution state is executable by the facility, and (D) a transition relationship between the initial state, the execution state, and the stand-by state is defined for each facility, and the process design device may further includes: a state determination unit that determines, for a combination of the facility and the task process in the design process data, whether or not the facility is in a stand-by state for the task process defined in the state transition information of the facility at a timing at which the facility is to be caused to execute the task process, a preparation process acquisition unit that acquires, for a task process of a combination determined not to be in the stand-by state by the state determination unit, a preparation process that is a task process to be executed in a state where the facility reaches before transition from the initial state or the execution state of the task process to the stand-by state of the task process in the state transition information of the facility, and a preparation process addition unit that adds, to the design process data, the preparation process acquired by the preparation process acquisition unit as a task process to be executed by the facility before the task process of the combination determined not to be in the stand-by state by the state determination unit.

With the aforementioned configuration, the process design device determines whether or not the facility is in the stand-by state for the task process at a timing at which the facility is caused to execute the task process. Then, if the facility is determined not to be in the stand-by state at the timing at which the facility is caused to execute the task process, the process design device acquires a preparation process that is a task process to be executed in a state that the facility reaches before the facility transitions to the stand-by state. The process design device adds, to the design process data, the acquired preparation process as a task process to be executed by the facility before the task process that is determined not to be in the stand-by state.

Therefore, the process design device is possible to cause the facility associated with each task process to execute each task process by causing each facility to execute the preparation process to be executed before executing each task process, for each task process included in the procedure for assembling a product or the like.

In the process design device according to an aspect of the disclosure, for each combination of a facility and a task process in the facility data, an input element necessary for the facility to execute the task process may be defined, and the process design device may further include: a part determination unit that determines, for the combination of the facility and the task process in the design process data, whether or not an input element defined for the combination in the facility data is supplied to the facility at a timing at which the facility is caused to execute the task process; and a supply process addition unit that adds, to the design process data, a supply process that is a task process of supplying the input element to the facility as a task process to be executed before a task process of a combination determined by the part determination unit that the input element is not supplied.

According to the aforementioned configuration, the process design device determines whether or not an input element is supplied to a facility at the timing at which the facility is caused to execute a task process. Then, the process design device adds, to the design process data, the supply process that is a task process of supplying the input element to the facility as the task process to be executed before the task process, to which it is determined that the input element is not supplied.

Therefore, the process design device is possible to cause the facility associated with each task process to execute each task process by supplying an input element to be supplied to each facility before each facility executes each task process in the supply process, for each task process included in a procedure for assembling a product or the like.

According to the aforementioned configuration, the procedure generation device represents, to the user, (1) the three-dimensional shape of the product and each of the three-dimensional shapes of the one or more workpieces that form the product for each product and (2) the standard processes.

Therefore, the procedure generation device is possible to support the user generating the procedure data in accordance with the standard processes with reference to the three-dimensional shape of the product or the like.

According to the aforementioned method, it is determined whether or not each of the plurality of task processes defined in the procedure data is included in the standard process data, and a task process that is determined not to be included in the standard process data is displayed in an emphasized manner, in the aforementioned control method.

Here, a special task process unique to a product, which is difficult to define in advance, is typically included in assembling and disassembling of the actual product.

In the aforementioned method, it is determined whether or not such a "special task process unique to the product, which is difficult to define in advance", that is, the task process that is not a standard process defined in the standard process data is included in the procedure data. Then, "the special task process unique to the product, which is difficult to define in advance" included in the procedure data is displayed as the special process in an emphasized manner to notify the user of the task process, and the user is prompted to examine such a task process, in the aforementioned control method.

Therefore, the aforementioned control method is possible to prompt the user to examine the special task process unique to the product, which is difficult to define in advance, and to design processes for assembling the product or the like even if such a task process is included in the procedure for assembling the product or the like.

According to an aspect of the disclosure, it is possible to design processes for assembling a product even when a special task process unique to the product, which is difficult to define in advance, is included in a procedure for assembling the product.

First Embodiment

Hereinafter, embodiments according to an aspect of the disclosure (hereinafter, also referred to as "the embodiments") will be described based on FIGS. 1 to 27. Note that the same reference numerals will be given to the same or corresponding parts in the drawings and the description thereof will not be repeated. For easy understanding of a process design device 1 according to an aspect of the disclosure, an outline of a production simulation system Sys including the process design device 1 will be described with reference to FIG. 2.

s1. Application Examples (Outline of Production Simulation System According to Embodiment)

Manufacturing requirements have changed from mass production of the same products in the related art to multiple-product small-amount production and to mass customized production in recent years. Due to a steep increase in labor costs in developing countries and difficulty in securing human resources due to a decrease in domestic populations, expectations have been placed on facility elements (robot-using production facilities) using robots and the like capable of addressing a variety of task processes PP.

For such robot-using production facilities for multiple-product small-amount production and mass customized production, the amount of changes in physical facility configurations and of additional investment for addressing production of new products has been minimal. However, the robot-using production facilities still require a large labor force to change control software for causing the robot-using production facilities to operate.

Thus, a plurality of facility components (virtual facilities corresponding to facilities R) are prepared in advance in a library (that is, a database) in the production simulation system Sys. Then, arbitrary facility components are laid out (arranged) in a virtual production space, thereby easily creating a layout plan of the production facilities.

In addition, the production simulation system Sys associates control programs for realizing "the respective task processes (standard processes CP) that are typically considered to be necessary for a production procedure of a product" such as "fitting" and "screwing" with the facility components in the library. Further, the production simulation system Sys defines, as a standard, a specification list for such respective task processes. The production simulation system Sys uses the facility components (more precisely, facility data Dr that defines the facilities R) and production procedure data of the product (procedure data Dp) in combination with such "task processes defined as a standard (standard processes CP)".

The production simulation system Sys collates the facility components (more precisely, the facility data Dr) with the production procedure data of the product (procedure data Dp). The production simulation system Sys can easily create the production facility layout necessary for the production procedure of the product to be realized and the control programs that cause the production facility layout to execute the production procedure by collating both the facility components with the production procedure data. Then, the production simulation system Sys can cause the production facility layout (more precisely, the facility components in the production facility layout) to operate in accordance with the control programs, perform simulation, and verify the layout plan of the production facility.

Here, the "special task process unique to the product (special process SP)", which the task process defined as a standard (standard process CP) cannot address, is typically included in assembling of the actual product. Thus, the production simulation system Sys enables the user to efficiently add a necessary control program in response to an instruction from the system even for such a special process SP.

(Example of Operations that Process Design Device According to Embodiment Realizes)

In an assembly cell or the like in which a plurality of facility elements (facilities R) including robots operate in a small space, it is necessary to frequently adjust operation trajectories of the facility elements (for example, the facilities R such as robots) in order to avoid interference between the facility elements. However, in a case in which the operation trajectories of the facility elements are changed, a task time required for the assembly cell to realize a desired achievement tends to greatly vary.

Therefore, in order to ascertain whether or not interference has occurred between the facility elements and production ability, it is necessary to cause a specific facility simulator/emulator (for example, a production simulation device 7) such as a robot emulator to execute specific control programs.

In the related art, there has been an attempt to quickly and precisely perform behavior simulation by defining in advance one or more control programs for causing facility elements in a library to execute each of one or more standard task processes (standard processes CP) and combining the control programs.

However, an assembly process of an actual product typically includes a task process other than the standard processes CP (specifically, a special task process unique to the product, which is difficult to define in advance (special process SP)). That is, parts that form the product use a variety of different shapes and materials for each product, and the assembly task procedure for assembling (producing) the actual product using these parts includes not only the standard processes CP but also the special process SP in many cases. Specifically, the assembly task procedure of the actual product includes not only typical task processes (standard processes CP) such as "screwing" and "overlaying" but also a special process SP that is a special task process unique to the product.

Therefore, it is difficult to generate the control program to assemble the actual product based merely on behaviors (standard processes CP) defined in advance for the facility elements in the library. Thus, the process design device 1 in the production simulation system Sys collects information necessary for the production system simulation while utilizing conversation and the like with the user. Then, the production simulation device 7 executes the production simulation for manufacturing a desired product by desired facilities R by using information and the like collected by the process design device 1.

(Setting of Task Subject that Executes Each Task Process)

Specifically, the process design device 1 sets a task subject of each task process PP included in the assembly task procedure of the product. The process design device 1 determines whether or not each task process PP included in the assembly task procedure of the product is "a standard process CP or a special process SP" first for setting the task subject of each task process PP. The task process PP included in the task procedure is a standard process CP or a special process SP.

(Setting of Task Subjects that Execute Standard Processes)

The process design device 1 associates the facilities R stored in the library (that is, defined in the facility data Dr) with the task processes PP that are determined to be the standard processes CP from among the task processes PP included in the assembly task procedure of the product. The process design device 1 may associate the "facilities R laid out in the virtual production space from among the facilities R defined in the facility data Dr" as executing subjects of the task processes PP with priority with the task processes PP that are determined to be the standard processes CP.

Here, the "control programs that cause the facilities R to execute the standard processes CP" are associated with "the combinations between the facilities R and the task processes (standard processes CP) executable by the facilities R" in the facility data Dr as described above.

Thus, the process design device 1 associates "the facilities R that are defined in the facility data Dr (that is, the facilities R that can execute the task processes PP that are the standard processes CP)" as the executing subjects of the task processes PP with the task processes PP that are determined to be the standard processes CP. Further, the process design device 1 associates "the control programs that cause the facilities R to execute the task processes PP" with "the combinations between the task processes PP that are determined to be the standard processes CP and the facilities R".

(Setting of Task Subjects that Execute Special Processes)

The process design device 1 notifies the user of the fact that a task process PP that is determined not to be a standard process CP, that is, a task process PP that is determined to be a special process SP is a special process SP from among the task processes PP included in the assembly task procedure of the product. Then, the process design device 1 prompts the user to decide the facility R that is caused to execute the special process SP and to additionally install a control program that realizes the special process SP on the facility R (facility component). The user performs off-line teaching for the special process SP on the facility R selected as the executing subject of the special process SP, for example. The process design device 1 reads a control program generated by the off-line teaching performed by the user as "the control program for causing the facility R to execute the special process SP".

(Setting of Task Process or the Like Necessary for Causing Each Task Subject to Execute Each Task Process)

The process design device 1 assigns each facility R as an executing subject to each task process PP in the procedure data Dp and then further adds or prompts the user to add the following task process PP as a task process PP to be executed before each task process PP. That is, the process design device 1 adds or prompts the user to add the task process PP (preparation process RP) that is necessary to be executed in advance to execute each task process PP and the task process PP (supply process IP) of supplying parts necessary to execute each task process PP to each facility R.

(Setting of a Value for Item that is Necessary to Cause Each Task Subject to Execute Each Task Process)

The process design device 1 detects information (items to be set It) that is insufficient for causing each facility R to which execution of each task process PP in the procedure data Dp has been assigned to execute the task process PP for each facility R. The process design device 1 promotes additional setting and teaching of such information and promotes additional reading and the like of necessary control programming.

Note that the process design device 1 can be realized by using an information processing device such as a personal computer (PC). That is, it is possible to realize the process design device 1 as a PC on which application software that causes the information processing device to operate as the process design device 1 has been installed.

s2. Configuration Example

Configuration Example of Production Simulation System

Figure 2:
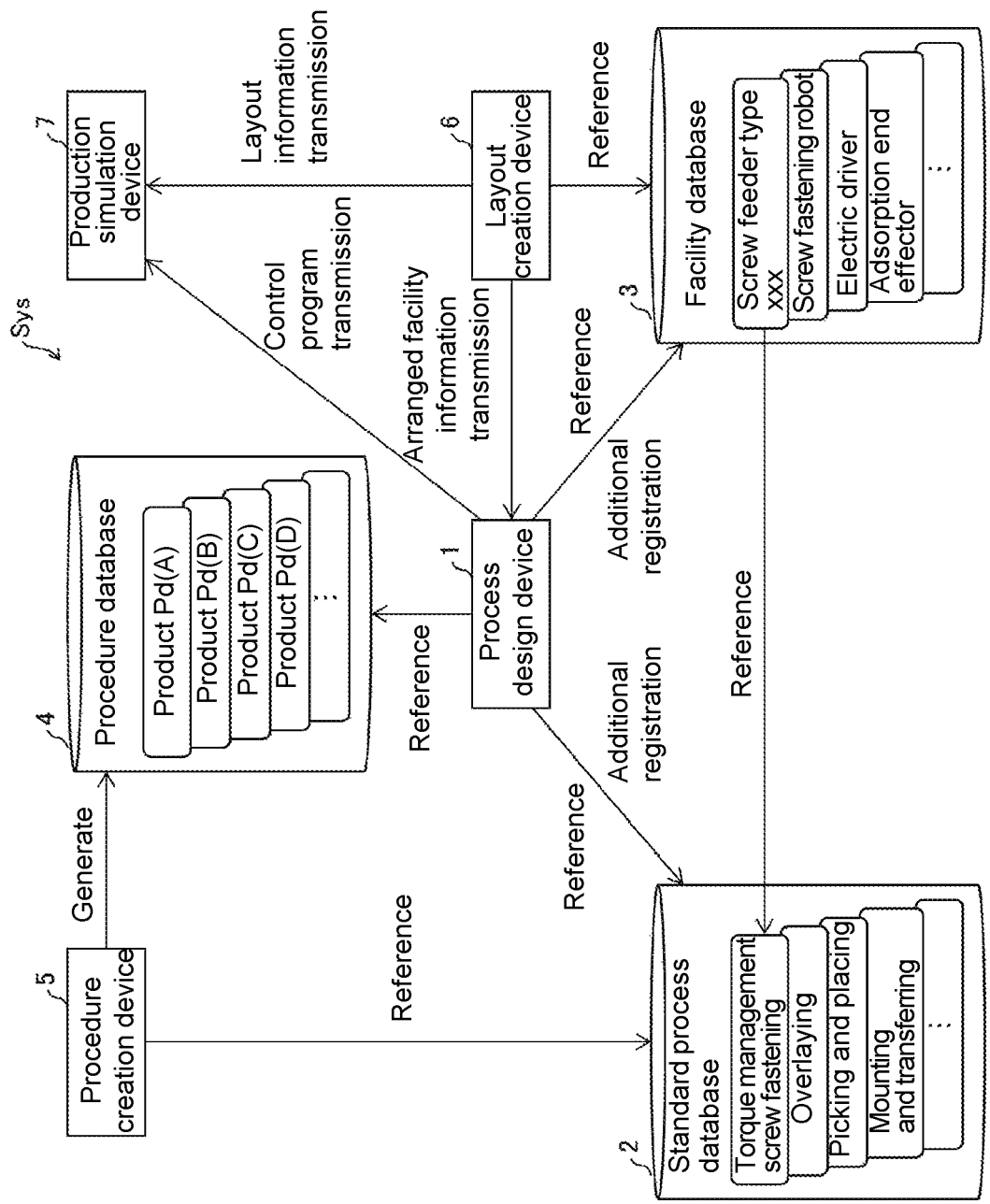
FIG. 2 is a diagram illustrating an outline of an entire production simulation system including the process design device in FIG. 1.

FIG. 2 is a diagram illustrating an overall outline of the production simulation system Sys that includes the process design device 1. The production simulation system Sys as exemplified in FIG. 2 includes the process design device 1, a standard process database 2, a facility database 3, a procedure database 4, a procedure generation device 5, a layout creation device 6, and a production simulation device 7.

The process design device 1 sets an executing subject or the like for each of a plurality of task processes PP included in a task procedure for assembling a product (assembly task procedure) for each product. The process design device 1 may further manage the control program that causes each facility R set as the executing subject of each task process PP to execute each task process PP. The process design device 1 can output such a control program to the production simulation device 7 and causes the production simulation device 7 to execute simulation in which each facility R set as the executing subject of each task process PP is caused to execute each task process PP.

(Standard Process Data Association)

In the standard process database 2, the standard process data Dd that defines each of the plurality of standard processes CP is stored, for example, information that defines types and specifications of the respective task processes PP necessary to assemble the product is stored. Each of the standard processes CP is a task process PP executable by at least one facility R.

(Facility Data Association)

In the facility database 3, the facility data Dr is stored, for example, shapes, various specifications, control programs that realizes unique operations executable by each facility R, and task processes PP (particular, standard processes CP) that can be realized through the unique operations are stored. In other words, the facility data Dr defines, for each facility R, standard processes CP executable by the facility R, control programs for causing the facility R to execute the standard processes CP, items to be set It for which it is necessary to set values for causing the facility R to execute the standard processes CP, and the like.

For example, the facility data Dr defines, for each facility R, (1) task processes PP (particularly, the standard processes CP) executable by the facility R. The facility data Dr further defines (2) a three-dimensional shape of each facility R, (3) control programs and the like for each facility R executing the task processes PP (particularly, the standard processes CP), and (4) a state machine diagram of each facility R. Also, the facility data Dr defines (5) process execution ability of each facility R related to the task processes PP (particularly, the standard processes CP) executable by the facility R, (6) input and output elements of the task processes PP (particularly, the standard processes CP) that each facility R is caused to execute, and (7) items to be set It for each facility R executing each task process PP (particularly, each standard process CP). Note that "three-dimensional" may be abbreviated as "3D" in the following description. Details of the facility data Dr will be described later with reference to FIGS. 5 to 11.

(Procedure Data Association)

The layout creation device 6 presents the facility data Dr stored in the library (that is, defined in the facility data Dr) to the user and supports the user constructing the facility layout. For example, the layout creation device 6 presents a list of facilities R defined in the facility data Dr to the user. The user selects facilities R(1), R(2), R(3), . . . R(n) from the list of the facilities R defined in the facility data Dr and arranges the selected facilities R(1), R(2), R(3), . . . R(n) in the virtual production space provided by the layout creation device 6. The layout creation device 6 notifies the process design device 1 of the facilities R(1), R(2), R(3), . . . R(n) arranged in the virtual production space along with arrangement position information in the virtual production space and the like.

Also, the layout creation device 6 presents three-dimensional shapes of input and output elements (workpieces; for example, a product, parts of the product, a work-in-process product, a half product) defined for each of "combinations of the facilities R and the standard processes CP executable by the facility R" in the facility data Dr to the user. The user arranges the workpieces used or output by the selected facilities R(1), R(2), R(3), . . . R(n) in the virtual production space on which the facilities R(1), R(2), R(3), . . . R(n) are arranged. The layout creation device 6 notifies the process design device 1 of "information specifying the workpieces arranged in the virtual production space" along with "arrangement position information of the workpieces in the virtual production space".

The details of creation of the layout plan of the production facilities using the layout creation device 6 (in other words, arrangement of the facilities R in the virtual production space) will be described with reference to FIG. 13.

In the procedure database 4, procedure data Dp that is data indicating assembly task procedures or disassembly task procedures for each product is stored. The procedure data Dp defines a plurality of task processes PP for assembling or disassembling the product along with an execution order for each product. The plurality of task processes PP defined in the procedure data Dp includes at least either a plurality of standard processes CP or a plurality of special processes SP.

The procedure generation device 5 presents, to the user, the three-dimensional shape of the product and the three-dimensional shape of each of one or more parts that form the product. In addition, the procedure generation device 5 presents, to the user, each of the plurality of standard processes CP defined in the standard process data Dd. The procedure generation device 5 supports the user generating the procedure data Dp by presenting, to the user, the three-dimensional shapes of the product and the parts and the plurality of standard processes CP defined in the standard process data Dd. In the production simulation system Sys, the procedure data Dp (the assembly procedure of the product) is considered and created by the user, for example. The details of the creation of the procedure data Dp using the procedure generation device 5 will be described later with reference to FIG. 14 and the like.

The production simulation device 7 dynamically reproduces behaviors of the respective facilities R including robots. As described above, the production simulation device 7 can acquire a control program that causes each facility R to execute each of the plurality of task processes PP included in the task procedure (assembly task procedure) from the process design device 1 and execute simulation of causing each facility R to execute each task process PP. The production simulation device 7 causes the control program acquired from the process design device 1 to actually operate on an emulator and calculates a desired assembly task time of the product, for example.

Definitions of Terms Used in Each Embodiment

For precise understanding of the production simulation system Sys, the respective terms used in the description of the production simulation system Sys will be defined as follows.

"Facility elements (=facilities R)" are a general term for physical components that form production facilities, such as the respective robots, peripheral devices, an end effector, and a stand.

"Facility component" is a term of a software module prepared by combining a single or a plurality of facility elements and being reusable by facility construction support software (=layout creation device 6). The facility components include control programs of facility elements that realize 0 to n "process execution services" in addition to the three-dimensional shape and mechanism information of the facility elements for a 3D facility simulator. If the facility components are instantiated in the virtual production space (facility layout) provided by the layout creation device 6 and arrangement positions are fixed, then process execution services provided by the facility components can be called. For example, the layout creation device 6 notifies the process design device 1 of the facilities R arranged in the virtual production space (arranged facilities RR) as the facilities R that execute the task processes PP executable by the facilities R.

It is also possible to generate a plurality of instances from the same facility component and to change prescribed specifications of the facility for each instance (for example, the length, the height, the width, and the like of a belt conveyor, for example) in accordance with the facility R that the user actually owns. In some cases, other facility components are internally referred and used.

"Library (=facility database 3)" is a library obtained by collecting facility components that are available for creating the facility layout such that the user can easily select and use the facility components.

"Facility layout" means virtual production facilities that are created by instantiating the facility components and arranging the facility components in a world coordinate system in the virtual production space provided by the 3D facility simulator (=layout creation device 6). In some cases, the facility layout expresses a single cell, and in other cases, the facility layout expresses a line formed by a plurality of cells.

"Cell (device)" means a configuration unit of a production facility that forms a line and has a certain level of independency. Complicated mechanism operations are realized and hidden inside, and such units are provided from device vendors to end users in many cases. In many cases, there are concepts of operation modes/operation states as an interface for a high-order system for a manufacturing execution system, and a warning lamp, a human machine interface (HMI), a safety button, or the like is provided as an interface for an operator. As interfaces with cells that are in charge of previous and subsequent processes, there is a concept of a cycle time with an inlet port of material workpieces and an outlet port for workpieces after working.

"Line" means a configuration unit of a production system to which input and output workpieces of a plurality of cells are connected directly or via the respective transport systems (a conveyor, an automated guided vehicle (AGV), a human, and the like). A transport route is not limited to one dimension, and there is a case in which a transport route with a branched or net workpiece shape is provided.

"Process definition information (=standard process data Dd)" means information that defines a specification list for each standard process CP along with a process ID that uniquely identifies each standard process CP, for each standard process CP for production, such as "screwing" and "fitting". The specifications for the standard process CP are, for example, specifications that can be assumed to be required in many cases in terms of design of the product, for example, and examples thereof include a screw size and a fastening torque. The process definition information can be used as a template for expressing process execution ability of a facility element (facility component) or can be used as a dictionary when required specifications of each task process PP in the procedure data Dp are described.

"Process execution ability" means a range in which the process execution services provided by each facility component can address, which is described in accordance with process definitions. The facility components in the library store declaration of the process execution ability of the process execution services of its own in header information, for example.

"Process execution services" mean services that are provided by the facility components instantiated on the facility layout and are realized by the task processes such as "insertion and fastening of screws". Processes necessary for the product are executed in the facility layout by calling the specifications required by the product as parameters of the process execution services.

"Process execution sequence" means a control sequence program that describes a procedure for sequentially calling the respective process execution services of each facility component in the facility layout with appropriate parameter settings in accordance with the assembly procedure of the product. The "information (design process data 61) that associates the facilities R as the executing subjects with the respective task processes PP in the procedure data Dp" will be referred to as a "process execution sequence" in some cases.

(Outline of Process Design Device)

The overall outline of the production simulation system Sys has been described hitherto. Next, details of the process design device 1, the procedure generation device 5, and the like will be described. For easy understanding of the process design device 1, the procedure generation device 5, and the like, outlines of the process design device 1, the procedure generation device 5, and the like are summarized as follows.

That is, the process design device 1 is a process design device 1 that associates the executing subject that executes each of the plurality of task processes PP included in the task procedure (procedure data Dp) for assembling or disassembling the product with each of the task processes PP. The process design device 1 includes: a standard process acquisition unit 11 that acquires standard process data Dd that defines "a plurality of standard processes CP, each of which is a task process PP executable by at least one facility R"; a facility acquisition unit 13 that acquires facility data Dr that defines "task processes PP (standard processes CP) executable by the facility R for each facility R"; a procedure acquisition unit 12 that acquires "procedure data Dp that defines a plurality of task processes PP for assembling or disassembling the product along with an execution order for each product"; a process determination unit 20 that determines whether or not each of the plurality of task processes PP defined in the procedure data Dp is included in the standard process data Dd; and a display control unit 30 that displays the special process SP that is a task process PP determined not to be included in the standard process data Dd by the process determination unit in an emphasized manner on a display screen (process design screen) of the procedure data Dp.

According to the aforementioned configuration, the process design device 1 determines whether or not each of the plurality of task processes PP defined in the procedure data Dp is included in the standard process data Dd and displays the task process PP determined not to be included in the standard process data Dd as a special process SP in an emphasized manner.

Here, the special task process PP unique to the product, which is difficult to define in advance, that is, the special process SP is typically included in assembling or disassembling of the actual product.

The process design device 1 determines whether or not such "a special task process PP unique to the product, which is difficult to define in advance", that is, the task process PP that is not a standard process CP defined in the standard process data Dd is included in the procedure data Dp. Then, the process design device 1 displays the "special task process PP unique to the product, which is difficult to define in advance" included in the procedure data Dp as a special process SP in an emphasized manner, notifies the user of the special task process PP, and prompts the user to examine such a task process PP.

Therefore, the process design device 1 achieves an effect that it is possible to prompt the user to examine such a task process PP and to design the processes such as assembly of the product or the like even when the special task process PP unique to the product, which is difficult to define in advance, is included in the procedure for assembling the product or the like.

The process design device 1 further includes: a receiving unit 40 that receives a user's operation for setting a facility R that is caused to execute the special process SP displayed by the display control unit 30 in an emphasized manner; and a setting unit (a first setting unit 51 and a second setting unit 52) that generates the design process data 61 that (1) associates "the facilities R defined as the facilities R that can execute the task processes PP in the facility data Dr" as executing subjects with "the task processes PP determined to be included in the standard process data Dd by the process determination unit 20" and (2) associates "the facility R set by the user's operation" as an executing subject with the special process SP, from among the plurality of task processes PP defined along with the execution order in the procedure data Dp.

According to the aforementioned configuration, the process design device 1 generates the design process data 61 that (1) associates "the facilities R defined in the facility data Dr" with the standard processes CP and (2) associates "the facility R set by the user" with the special process SP, from among the plurality of task processes PP defined along with the execution order on the procedure data Dp.

The process design device 1 generates the design process data 61 that associates the executing subject with each of the task processes PP even in the task procedure (procedure data Dp) that includes "the special task process PP unique to the product, which is difficult to define in advance".

Therefore, the process design device 1 achieves an effect that it is possible to design a process in which the respective processes PP in the procedure are associated with the executing subjects even when the special task process PP unique to the product, which is difficult to define in advance, is included in the procedure for assembling the product or the like.

According to the process design device 1, "items to be set It (items) for which it is necessary to set values in advance for causing the facilities R to execute task processes PP" are defined for each of the combinations of the facilities R and the task processes PP in the facility data Dr, the process design device 1 further includes an item determination unit 77 that determines whether or not the values have been set for the items to be set It defined for the combinations in the facility data Dr for the combination of the facilities R and the task processes PP in the design process data 61, the display control unit 30 displays information for prompting setting of the values for the items to be set It, for which it is determined that no values have been set by the item determination unit 77, a receiving unit 40 receives user's operations to input the values to the items to be set It, and the setting unit (the first setting unit 51 and the second setting unit 52) associates the items to be set It for which the values input by the user's operation are set with the combinations in the design process data 61.

According to the aforementioned configuration, the process design device 1 determines whether or not values have been set for "the items to be set It which need to set values in advance for causing the facilities R to execute the task processes PP", and if it is determined that no values have been set for the items to be set It, the process design device 1 prompts the user to set the values. Then, the process design device 1 sets the values input by the user for the items to be set It and enables the facilities R to execute the task processes PP.

Therefore, the process design device 1 achieves an effect that it is possible to set the values for the items to be set It that are necessary to "cause 'the facility R associated as an executing subject of each task process PP' to execute 'each task process PP in the procedure for assembling the product or the like'" and to cause the facility R associated with each task process PP to execute each task process PP.

According to the process design device 1, state transition information (state machine diagram) describing at least (A) an initial state of a facility R, (B) an execution state in which the facility R is executing "the task process PP executable by the facility R", (C) a stand-by state in which the task process PP executed in the execution state is executable by the facility R, (D) a transition relationship between the initial state, the execution state, and the stand-by state is defined for each facility R in the facility data Dr, the process design device 1 further including: a state determination unit 71 that determines "whether or not the facility R is in 'the stand-by state for the task process PP that is defined in the state transition information of the facility R' at 'the timing at which the facility R is caused to execute the task process PP'" for each combination of the facility R and the task process PP in the design process data 61; a preparation process acquisition unit 72 that acquires, for the task process PP of the combination determined "not to be in the stand-by state" by the state determination unit 71, a preparation process RP that is a task process PP to be executed in "a state that the facility R reaches before transition from 'the initial state or the execution state of the task process PP' to 'the stand-by state of the task process PP'; and a preparation process addition unit that "adds 'the preparation process RP acquired by the preparation process acquisition unit 72' as the task process PP to be executed by the facility R before 'the task process PP of the combination determined not to be in the stand-by state by the state determination unit 71' to the design process data 61".

According to the aforementioned configuration, the process design device 1 determines whether or not the facility R is in the stand-by state for the task process PP at the timing at which the facility R is caused to execute the task process PP. If the process design device 1 determines that the facility R is not in the stand-by state at the timing at which the facility R is caused to execute the task process PP, then the process design device 1 acquires the preparation process RP that is a task process PP to be executed in a state that the facility R reaches before the transition to the stand-by state. The process design device 1 adds the acquired preparation process RP as the task process PP executed by the facility R before "the task process PP determined 'not to be in the stand-by state'" to the design process data 61.

Therefore, the process design device 1 achieves an effect that it is possible to cause the facility R associated with each task process PP to execute each task process PP by causing each facility R to execute the preparation process RP that is to be executed before each facility R executes each task process PP, for each task process PP included in the procedure for assembling the product or the like.

According to the process design device 1, "an input element (workpiece) that is necessary for the facility R to execute the task process PP" is defined for each combination of the facility R and the task process PP in the facility data Dr, and the process design device 1 further includes: a part determination unit 74 that determines, for "each combination of the facility R and the task process PP in the design process data 61", "whether or not 'the input element defined for each combination in the facility data Dr' has been supplied to the facility R at 'the timing at which the facility R is caused to execute the task process PP'"; and a supply process addition unit 76 that "adds 'a supply process IP that is a task process PP of supplying the input element to the facility R' to the design process data 61 as the task process PP that is to be executed before the task process PP of 'each combination determined by the part determination unit 74 that the input element is not supplied'".

According to the aforementioned configuration, the process design device 1 determines whether or not the input element is supplied to the facility R at the timing at which the facility R is caused to execute the task process PP. Then, the process design device 1 adds "the supply process IP that is a task process PP of supplying the input element to the facility R" as the task process PP that is to be executed before "the task process PP determined that the input element is not supplied" to the design process data 61.

Therefore, the process design device 1 achieves an effect that it is possible to cause the facility R associated with each task process PP to execute each task process PP by supplying the input element that is to be supplied to each facility R before each facility R executes each task process PP in the supply process IP, for each task process PP included in the procedure for assembling the product or the like.

The procedure generation device 5 is a procedure generation device that supports the user generating the procedure data Dp acquired by the process design device 1 and includes a shape presenting unit that presents, to the user, the three-dimensional shape of the product and the three-dimensional shape of each of the one or more workpieces that form the product, for each product, and a process presenting unit that presents, to the user, each of the plurality of standard processes CP defined in the standard process data Dd.

According to the aforementioned configuration, the procedure generation device 5 presents, to the user, (1) the three-dimensional shape of the product and the three-dimensional shape of each of the one or more workpieces that form the product, for each product and (2) the standard processes CP.

Therefore, the procedure generation device 5 achieves an effect that it is possible to support the user creating the procedure data Dp in accordance with the standard processes CP while referring to the three-dimensional shapes of the product and the like.

(Details of Process Design Device)

FIG. 1 is a block diagram illustrating configurations and the like of main parts of the process design device 1 and the like. The process design device 1 as exemplified in FIG. 1 includes the standard process acquisition unit 11, the procedure acquisition unit 12, the facility acquisition unit 13, the process determination unit 20, the display control unit 30, the receiving unit 40, the first setting unit 51, the second setting unit 52, a storage unit 60, and a verification unit 70.

In order to ensure simplicity of description, configurations that are not related directly to the embodiment are omitted in the description and the block diagram. However, the process design device 1 may include the omitted configurations depending on situations of implementation. The standard process acquisition unit 11, the procedure acquisition unit 12, the facility acquisition unit 13, the process determination unit 20, the display control unit 30, the receiving unit 40, the first setting unit 51, the second setting unit 52, and the verification unit 70 as exemplified in FIG. 1 can be realized by a processor (CPU: central processing unit) or the like reading and executing programs stored in a non-volatile manner (storage unit 60) realized by a non-volatile random access memory (NVRAM) or the like in a main memory realized by a RAM or the like. Hereinafter, the respective functional blocks in the process design device 1 will be described.

(Functional Blocks Other Than Storage Unit)

The standard process acquisition unit 11 acquires standard process data Dd from the standard process database 2 and outputs the acquired standard process data Dd to the process determination unit 20.

The procedure acquisition unit 12 acquires procedure data Dp from the procedure database 4 and outputs the acquired procedure data Dp to the process determination unit 20.

The facility acquisition unit 13 acquires facility data Dr from the facility database 3. In addition, the facility acquisition unit 13 acquires "facilities R that have been arranged in the virtual production space (hereinafter, also abbreviated as "arranged facilities RR" in some cases) from among the facilities R defined in the facility data Dr" from the layout creation device 6. The facility acquisition unit 13 outputs the facilities R defined in the acquired facility data Dr and the arranged facilities RR to the first setting unit 51.

The process determination unit 20 determines whether or not each task process PP defined in the procedure data Dp acquired from the procedure acquisition unit 12 is included in the standard process data Dd acquired from the standard process acquisition unit 11. Then, (1) the process determination unit 20 outputs the task processes PP determined to be included in the standard process data Dd, that is, the task processes PP determined to be standard processes CP, from among the task processes PP in the procedure data Dp acquired from the procedure acquisition unit 12 to the first setting unit 51. Also, (2) the process determination unit 20 outputs the task processes PP determined not to be included in the standard process data Dd, that is task processes PP determined to be special processes SP, from among the task processes PP in the procedure data Dp acquired from the procedure acquisition unit 12 to the second setting unit 52. Further, (3) the process determination unit 20 outputs the task processes PP determined to be the special processes SP to the display control unit 30.

The display control unit 30 causes the display device 8 to display a process design screen that is a screen for displaying the procedure data Dp and information and the like stored in the design process data 61 in the storage unit 60 and controls display content related to the process design screen. For example, the display control unit 30 causes the task processes PP determined "not to be included in the standard process data Dd" by the process determination unit 20 to be displayed on the process design screen in an emphasized manner, for example. In addition, the display control unit 30 causes information for prompting values for items to be set It for which the item determination unit 77 determines whether or not the "values necessary for the facilities R to execute the task processes PP have not been set at the timing at which the facilities R are caused to execute the task processes PP" to be displayed on the process design screen in an emphasized manner.

The receiving unit 40 receives user's operations, notifies the second setting unit 52 of processing corresponding to the received user's operations, and updates information stored in the design process data 61 in the storage unit 60 in accordance with the received user's operations.

The receiving unit 40 receives, for the special processes SP displayed on the process design screen in an emphasized manner, "user's operations for setting facilities R that are caused to execute the special processes SP", for example. The receiving unit 40 notifies the second setting unit 52 of the facilities R set as the executing subjects of the special processes SP by the user's operations.

In addition, the receiving unit 40 receives user's operations for inputting values to "the items to be set It which need to set values in advance for causing the facilities R to execute the task processes PP" and stores information corresponding to the received user's operations in the design process data 61, for example. That is, the receiving unit 40 associates the items to be set It in which the values input by the user's operations have been set with "the combinations of the facilities R and the task processes PP" in the design process data 61.

The receiving unit 40 may notify the first setting unit 51 or the second setting unit 52 of the items to be set It in which the values input by the user's operations have been set. Then, the first setting unit 51 or the second setting unit 52 may associate the items to be set It in which the values have been set with "the combinations of the facilities R and the task processes PP" in the design process data 61.

The first setting unit 51 associates the facilities R as the executing subjects of the task processes PP with "the task processes PP determined to be standard processes CP by the process determination unit 20, from among the task processes PP in the procedure data Dp", that is, "the standard processes CP in the procedure data Dp". Then, the first setting unit 51 stores the data in which the facilities R are associated with the standard processes CP in the procedure data Dp, in the design process data 61 in the storage unit 60.

The first setting unit 51 associates "the facilities R that are defined as being able to execute the standard processes CP in the facility data Dr" as executing subjects of the standard processes CP with "the standard processes CP in the procedure data Dp". The first setting unit 51 associates, with priority, the arranged facilities RR from among "the facilities R that are defined as being able to execute the standard processes CP in the facility data Dr" with "the standard processes CP in the procedure data Dp". In other words, if there is a facility R capable of executing "the standard process CP in the procedure data Dp" in the arranged facilities RR, the first setting unit 51 associates, with priority, the facility R with the "standard process CP in the procedure data Dp".

The second setting unit 52 associates the facilities R as executing subjects of the task processes PP with "the task processes PP determined to be special processes SP by the process determination unit 20, from among the task processes PP in the procedure data Dp", that is, "the special processes SP in the procedure data Dp". Then, the second setting unit 52 stores the data in which the facilities R are associated with the special processes SP in the procedure data Dp, in the design process data 61 in the storage unit 60.

The second setting unit 52 associates the facilities R notified from the receiving unit 40, that is, "the facilities R set as the executing subjects of the special processes SP" by the user, with "the special processes SP in the procedure data Dp".

The respective task processes PP in the procedure data Dp are associated with the respective facilities R as the executing subjects of the respective task processes PP along with the execution order and are stored in the design process data 61 by the first setting unit 51 and the second setting unit 52.

The verification unit 70 includes the state determination unit 71, the preparation process acquisition unit 72, a preparation process addition unit 73, the part determination unit 74, a supply process acquisition unit 75, a supply process addition unit 76, and an item determination unit 77.

The state determination unit 71 determines, for each combination of the facility R and the task process PP stored in the design process data 61, whether or not the facility R is in the stand-by state for the task process PP at the timing at which the facility R is caused to execute the task process PP, by using the facility data Dr.

As described above, the facility data Dr defines, for each facility R, the state machine diagram of the facility R, that is, the state transition information of the facility R. The state determination unit 71 determines, at a timing at which a specific facility R is caused to execute a specific task process PP, whether or not the facility R is in the stand-by state for the task process PP, by using the state transition information of the facility R in the facility data Dr.

The state determination unit 71 notifies the preparation process acquisition unit 72 of a combination of a facility R that is determined to be not in the stand-by state for the task process PP and the task process PP at the timing at which the facility R is caused to execute the task process PP, from among the combinations of the facilities R and the task processes PP stored in the design process data 61.

The preparation process acquisition unit 72 acquires preparation process RP for the task process PP of the "combination of the facility R and the task process PP" notified from the state determination unit 71, by using "the state machine diagram (that is, the state transition information) of the facility R" defined in the facility data Dr. That is, the preparation process acquisition unit 72 acquires the preparation process RP for the task process PP determined that "the facility R is not in the stand-by state for the task process PP at the timing at which the facility R is caused to execute the task process PP" by the state determination unit 71, by using the state transition information of the facility R.

For example, the preparation process acquisition unit 72 acquires the preparation process RP that is a task process PP executed in the state that the facility R reaches before transition from the initial state or the execution state of the task process PP to the stand-by state of the task process PP in the state transition information of the facility R. Here, the initial state, the execution state of the task process PP (specifically, the standard process CP) executable by the facility R, and the stand-by state of the task process PP (specifically the standard process CP) executed in the execution state are described in the state transition information of the facility R. Thus, the preparation process acquisition unit 72 refers to the state transition information of the facility R and acquires an intermediate state that is a state that the facility R reaches before the transition from the initial state or the execution state of the task process PP to the stand-by state of the task process PP first. Then, in the case in which the acquired intermediate state is the execution state of some task process PP, the preparation process acquisition unit 72 acquires the task process PP executed in the intermediate state as the preparation process RP.

The preparation process acquisition unit 72 refers to the facility data Dr, specifically, the state transition information of the facility R of "the combination of the facility R and the task process PP" notified from the state determination unit 71, acquires the preparation process RP, and notifies the preparation process addition unit 73 of the acquired preparation process RP.

The preparation process addition unit 73 adds the preparation process RP notified from the preparation process acquisition unit 72 as the task process PP to be executed by the facility R before the task process PP of "the combination between the facility R and the task process PP" notified from the state determination unit 71 to the design process data 61. That is, the preparation process addition unit 73 adds the preparation process RP notified from the preparation process acquisition unit 72 as the task process PP "to be executed by the facility R of the combination before the task process PP of 'the combination determined not to be in the stand-by state by the state determination unit 71'" to the design process data 61. Before "the combination of the facility R and the task process PP determined not to be in the stand-by state by the state determination unit 71" in the design process data 61, the combination of the facility R of the combination and the preparation process RP is added by the preparation process addition unit 73.

The part determination unit 74 determines, for the combinations of the facilities R and the task processes PP stored in the design process data 61, whether or not "input elements necessary for the facilities R to execute the task processes PP" have been supplied to the facilities R at the timing at which the facilities R are caused to execute the task processes PP. First, the part determination unit 74 acquires, for the combinations of the facilities R and the task processes PP stored in the design process data 61, "the input elements (workpieces) defined for the combinations of the facilities R and the task processes PP (standard processes CP) in the facility data Dr". Then, the part determination unit 74 determines whether or not the acquired input elements have been supplied to the facilities R at the timing at which the facilities R are caused to execute the task processes PP.

The part determination unit 74 notifies the supply process acquisition unit 75 of "the combinations of the facilities R and the task processes PP" determined as "the input elements have not been supplied to the facilities R at the timing at which the facilities R are caused to execute the task processes PP".

First, the supply process acquisition unit 75 acquires the supply processes IP that are task processes of "supplying 'the input elements necessary for the facilities R of the combinations to execute the task processes PP of the combinations' to the facility R" for "the combinations of the facilities R and the task processes PP" notified from the part determination unit 74. The supply process acquisition unit 75 acquires, as the supply processes IP, the task processes PP of "supplying 'the input elements necessary for the facilities R to execute the task processes PP' to the facility R" from among the standard processes CP defined in the standard process data Dd, for example.

Next, the supply process acquisition unit 75 determines whether or not the acquired supply processes IP are standard processes CP, that is, the supply processes IP are included in the standard process data Dd.

If it is determined that the supply processes IP are standard processes CP, the supply process acquisition unit 75 associates "the facilities R defined as being able to execute the supply processes IP in the facility data Dr" as the executing subjects of the supply processes IP. If there are facilities R that can execute the supply processes IP from among the arranged facilities RR, then the supply process acquisition unit 75 associates the facilities R with the supply processes IP with priority.

If it is determined that the supply processes IP are special processes SP, the supply process acquisition unit 75 notifies the display control unit 30 of the determination result and causes the supply processes IP determined to be the special processes SP to be displayed on the process design screen in an emphasized manner. If the receiving unit 40 receives user's operations of setting facilities R that are caused to execute the supply processes IP determined to be the special processes SP, then the supply process acquisition unit 75 associates the facilities R set as the executing subjects of the supply processes IP by the user's operations with the supply processes IP.

The supply process acquisition unit 75 notifies the supply process addition unit 76 of the supply processes IP with which the facilities R have been associated as the executing subjects, that is, "the combinations of the supply processes IP and the facilities R that are the executing subjects of the supply processes IP".

The supply process addition unit 76 adds, to the design process data 61, "the combinations of the supply processes IP and the facilities R that are the executing subjects of the supply processes IP" notified from the supply process addition unit 76. That is, the supply process addition unit 76 adds, to the design process data 61, the supply processes IP notified from the supply process addition unit 76 as the task processes PP that are to be executed before the task processes PP of the combinations, which is determined as "the input elements are not supplied" by the part determination unit 74. In addition, the supply process addition unit 76 stores the "facilities R that are the executing subjects of the supply processes IP" notified from the supply process addition unit 76 in the design process data 61 in association with the supply processes IP.

The item determination unit 77 executes the following determination on the combinations of the facilities R and the task processes PP stored in the design process data 61. That is, the item determination unit 77 determines whether or not values have been set for the items to be set It which need to set values in advance for causing the facilities R to execute the task processes PP at the timing at which the facilities R are caused to execute the task processes PP.

As described above, the items to be set It which need to set values in advance for causing the facilities R to execute the standard processes CP are defined in the combinations of the facilities R and the task processes PP (standard processes CP) in the facility data Dr.

Thus, the item determination unit 77 acquires, for the combinations of the facilities R and the task processes PP stored in the design process data 61, "the items to be set It defined for the combinations of the facilities R and the task processes PP (standard processes CP) in the facility data Dr". Next, the item determination unit 77 determines whether or not values have been set for the acquired items to be set It at the timing at which the facilities R are caused to execute the task processes PP.

If it is determined that no values have been set for the items to be set It, the item determination unit 77 notifies the display control unit 30 of the determination result and causes information for prompting setting of values to be displayed for the items to be set It for which it is determined that no values have been set.

(Details of Storage Unit)

The storage unit 60 is a storage device that stores various kinds of data used by the process design device 1. The storage unit 60 may non-transitorily store (1) control programs, (2) OS programs, (3) application programs for executing various functions of the process design device 1, and (4) various kinds of data read when the application programs are executed. The storage unit 60 further stores the design process data 61. Also, the standard process data Dd acquired by the standard process acquisition unit 11, the procedure data Dp acquired by the procedure acquisition unit 12, and "the facility data Dr and the facilities R arranged in the virtual production space" acquired by the facility acquisition unit 13 may be stored in the storage unit 60.

The plurality of task processes PP in the procedure data Dp are stored along with the facilities R serving as the executing subjects thereof, the execution order, and the like in the design process data 61. In a case in which a task process PP(1), a task process PP(2), a task process PP(3), and a task process PP (4) are defined in the procedure data Dp as an execution order in this order, for example, the following task processes PP are stored in the design process data 61. That is, the task process PP(1), the task process PP(2), the task process PP(3), and the task process PP(4) are stored in the design process data 61 as the execution order in this order.

In addition, if a facility R(1) is set as an executing subject of the task process PP(1), a facility R(2) is set as an executing subject of the task process PP(2), a facility R(3) is set as an executing subject of the task process PP(3), and a facility R(4) is set as an executing subject of the task process PP(4), the following association is stored in the design process data 61. That is, the facility R(1) is stored in association with the task process PP(1), the facility R(2) is stored in association with the task process PP(2), the facility R(3) is stored in association with the task process PP(3), and the facility R(4) is stored in association with the task process PP(4), in the design process data 61.

For each combination of the task process PP and the facility R, a control program that causes the facility R to execute the task process PP may be stored in the design process data 61. Further, items to be set It which need to set values in advance for causing the facility R to execute the task process PP and the values set for the items to be set It may be stored in the design process data 61 for each combination of the task process PP and the facility R.

s3. Operation Examples

Figure 3:
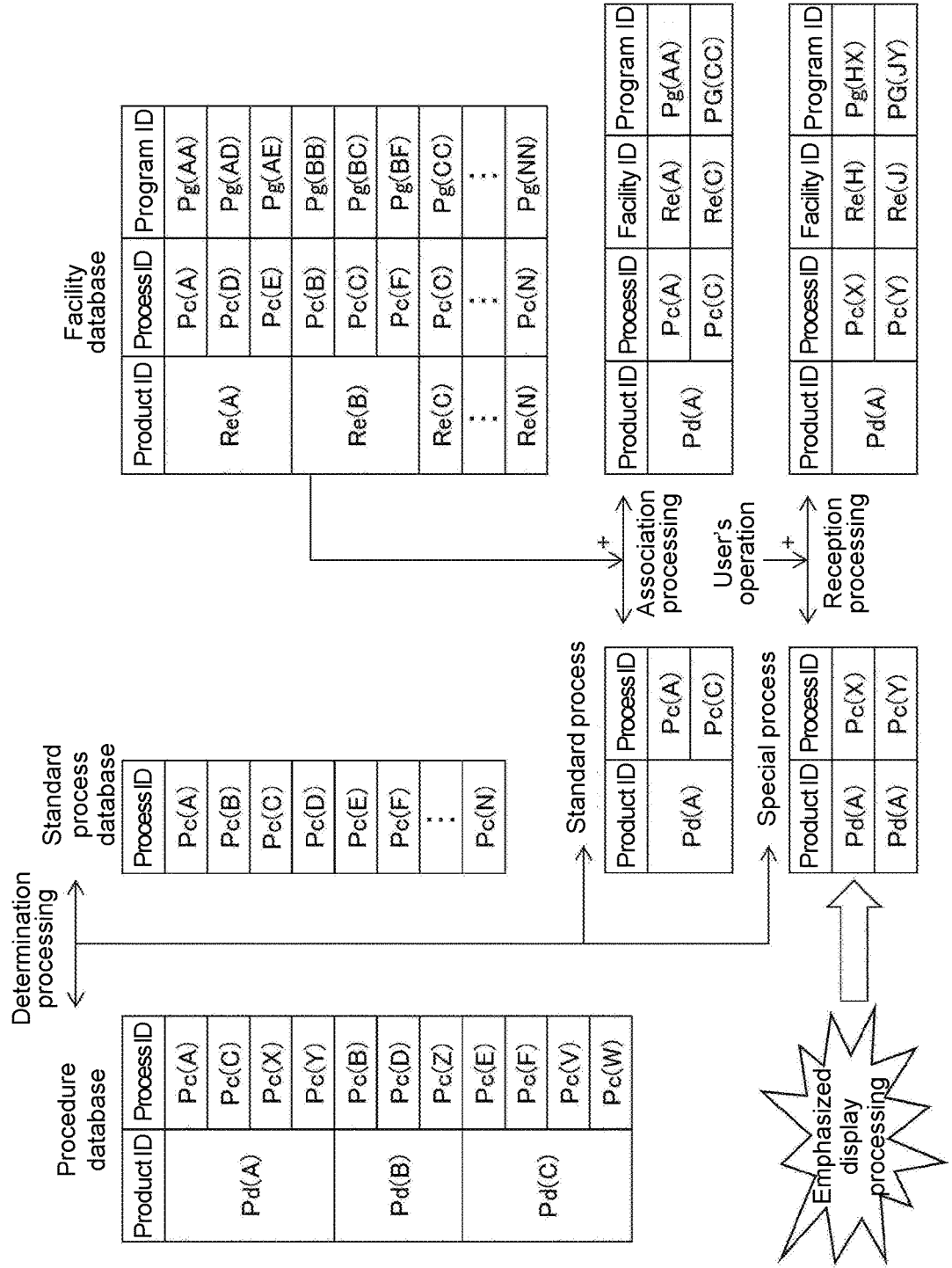
FIG. 3 is a diagram for describing an outline of processing that the process design device in FIG. 1 executes.

FIG. 3 is a diagram for describing an outline of processing that the process design device 1 executes. As illustrated In FIG. 3, the process design device 1 uses the procedure data Dp stored in the procedure database 4 and the standard process data Dd stored in the standard process database 2 to execute determination processing. That is, the process design device 1 determines whether or not each of the plurality of task processes PP that are defined in the procedure data Dp stored in the procedure database 4 is included in the standard process data Dd stored in the standard process database 2. In other words, the process design device 1 determines whether or not each of the plurality of task processes PP in the procedure data Dp is a standard process CP.

The facility data Dr stored in the facility database 3 defines, for each facility R, standard processes CP executable by the facility R and control programs that causes the facility R to execute the standard processes CP.

The process design device 1 associates the facilities R defined in the facility data Dr with the task process PP determined to be the standard processes CP from among the task processes PP included in the procedure data Dp (association processing). Further, the process design device 1 associates the control programs "that cause the facilities R associated with the task processes PP to execute the task processes PP" with the task processes PP determined to be the standard processes CP from among the task processes PP included in the procedure data Dp.

The process design device 1 causes the task processes PP determined to be special processes SP from among the task processes PP included in the procedure data Dp to be displayed on the process design screen in an emphasized manner (emphasized display processing). The process design device 1 receives user's operations for setting facilities R that are caused to execute the special processes SP displayed in an emphasized manner (receiving processing). Also, the process design device 1 receives user's operations for inputting control programs that cause the facilities R to execute the special processes SP. The process design device 1 associates the facilities R set by the user's operations with the special processes SP and associates the control programs input by the user's operations therewith.

Therefore, the process design device 1 can generate data in which the facilities R serving as the executing subjects are associated with the respective task processes PP in the procedure data Dp even when the special processes SP are included in the procedure data Dp. Also, the process design device 1 can generate data in which "the control programs 'that causes the facilities R associated with the task processes PP to execute the task processes PP' are associated with the respective task processes PP in the procedure data Dp". In the production simulation system Sys, the process design device 1 generates the control programs of the task processes PP determined to be the special processes SP while supplementing necessary information from the user.

For precise understanding of the process design device 1, details of data and the like used by the process design device 1 in the production simulation system Sys will be described next with reference to FIGS. 4 to 11.

(Outline of Data Used by Process Design Device)
(Outline of Standard Process Data)

Figure 4:
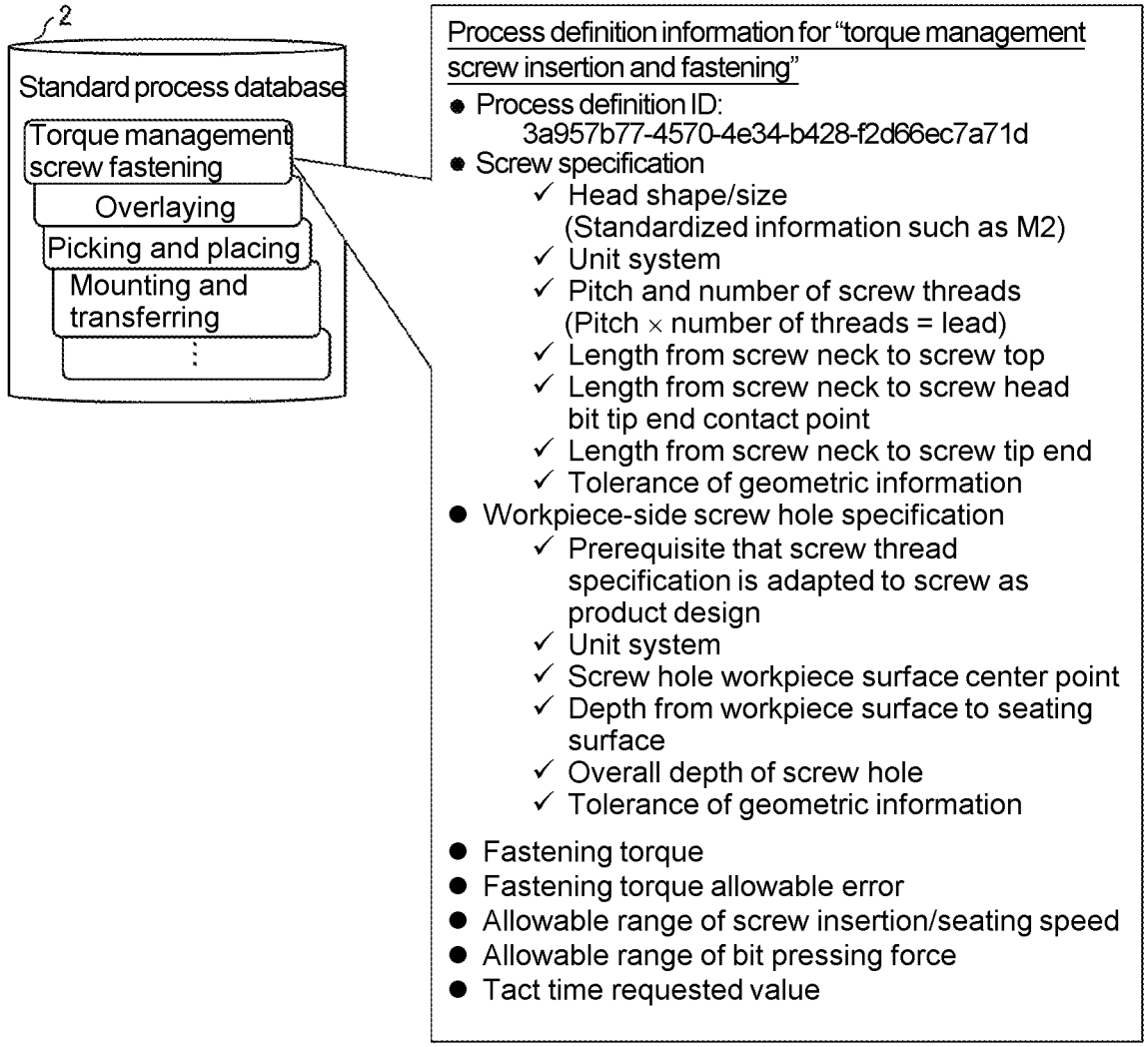
FIG. 4 is a diagram for describing an outline of a standard process database.

FIG. 4 is a diagram for describing an outline of the standard process database 2. The standard process data Dd is stored in the standard process database 2 (also referred to as "process definition information database"), that is, definition information of a variety of standard processes CP necessary to realize assembly and the like of products is stored. In the standard process data Dd, that is, in the process definition information of each task process, a process definition ID that uniquely identifies the task process PP (the type of the task process PP) and a specification list of the task process PP are defined. The specification list of the task process PP is a specification list that is typically required for designing the product, for example, and may be provided with reference to product design information (procedure data Dp). The facility components in the library, that is, the facilities R defined in the facility data Dr declare process execution ability that the respective facilities R have based on the process definition information (standard process data Dd). Also, "required specifications for an assembly process" generated with reference to the process definition information are described in the procedure data Dp that defines the assembly procedure of the product.

(Outline of Facility Data)

Figure 5:
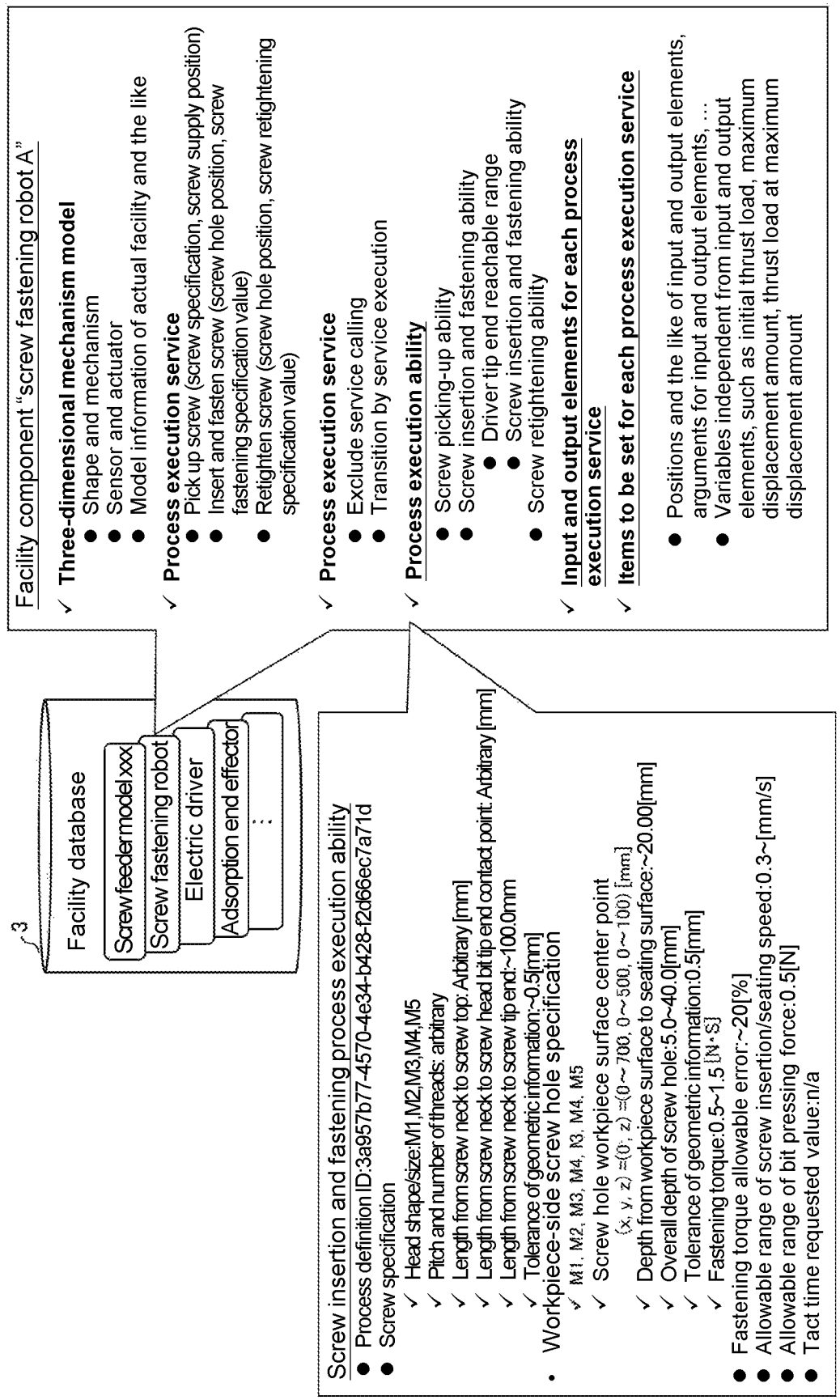
FIG. 5 is a diagram for describing an outline of a facility database.

FIG. 5 is a diagram for describing an outline of the facility database 3. The facility database 3 (=library) stores "definition information of the facility components (=facility data Dr)" that is available when the production facility layout is created and the like. The facility data Dr includes the following information.

(Three-Dimensional Shapes of Each Facility)

That is, the facility data Dr includes, for each facility R, information related to a three-dimensional mechanism model (shapes and restriction conditions between the shapes, arrangement positions of a sensor and an actuator, and the like) of each facility R.

(Control Programs and the Like for Each Facility to Execute Task Processes)

The facility data Dr includes, for each facility R, process IDs that are identification information of the standard processes CP (task processes PP) executable by each facility R. In addition, the facility data Dr includes, for each facility R, information related to an interface for calling "a group of processing executing services (=the standard processes CP executable by each facility R)" provided by each facility R. Further, the facility data Dr includes control programs that cause each facility R to execute the standard processes CP executable by each facility R.

(State Machine Diagram of Each Facility)

The facility data Dr includes, for each facility R, a state machine and "availability of execution of services in the respective state in the state machine (that is, information indicating which standard processes CP (task processes PP) can be executed in the respective states)".

In the state machine diagram of each facility R, "a plurality of states that the facility R can employ", "whether or not the standard processes CP are executable in the respective states, and if it is executable, identification information of the executable standard processes CP", and "transition relationships between the states" are described. In other words, state transition information between "the plurality of states that the facility R can employ" is defined in the state machine diagram of each facility R.

For example, at least the following three states and the transition relationship between the three states are described in the state machine diagram of each facility R. That is, (1) an initial state of the facility R, that is, a state immediate after power is supplied to the facility R is described in the state machine diagram of each facility R. Also, (2) an execution state in which the facility R is executing the task process PP (specifically, the standard process CP) executable by the facility R is described in the state machine diagram of each facility R. Further, (3) a stand-by state in which the task process PP (specifically, the standard process CP) executed in the execution state is executable by the facility R is described in the state machine diagram of each facility R. Note that the stand-by state and the initial state may be the same.

(Ability of Each Facility Related to Executable Task Processes=Process Execution Ability)

The facility data Dr includes, for each facility R, information that defines process execution ability that describes "what standard processes CP (task processes PP) can be executed in what specification range" for each facility R. The process execution ability for the combination of the facilities R and the standard processes CP (task processes PP) may be described with reference to the standard process data Dd (=process definition information of each standard process CP). That is, the process execution ability that each facility component (=facility R) has for each standard process CP (task process PP) indicates a range of ability (a parameter range that each process execution service can accept) that the facility R has for executing each standard process CP. Then, the process execution ability may be described based on the specification list defined in the standard process data Dd (=process definition information of each standard process CP).

(Input and Output Elements for Task Process Executable by Each Facility Element)

The facility data Dr includes, for each combination of the facility R and the standard process CP (task process PP), information that defines input and output elements (workpieces). That is, input elements (input workpieces) that are to be supplied to a specific facility R before execution of a specific standard process CP and output elements (output workpieces) that the facility R outputs by the execution of the standard process CP for causing the facility R to execute the standard process CP are defined.

(Items to be Set for Causing Each Facility to Execute Each Task Process)

The facility data Dr includes, for each combination of the facility R and the standard process CP (task process PP), information that defines "items (=items to be set It) which need to set values in advance for causing the facility R to execute the standard process CP". The items to be set It, "which need to set values in advance for causing the facility R to execute the standard process CP" may be roughly classified into the following two types of items, for example.

(1) "The items to be set It (=the items for which it is necessary to set values for each input element) for input elements (workpieces)" for which it is necessary to set values before the facility R executes the standard process CP are associated with each combination of the facility R and the standard process CP in the facility data Dr. Also, "items to be set It (=items for which it is necessary to set values for each output element) for output elements (workpieces)" for which it is necessary to set values before the facility R executes the standard process CP are associated with each combination of the facility R and the standard process CP in the facility data Dr.

Such items to be set It, for example, include "an item indicating a position of a screw to be picked up before the picking-up for a standard process CP of picking up the screw" and "an output position of an output element generated through execution of a task process PP".

The items to be set It, for which it is necessary to set values for each of the input and output elements when the facilities R execute the standard processes CP, are associated with the combinations of the facilities R and the standard processes CP, such as the position of the screw S1 in the case of picking up the screw S1 and the output position of the output element from the task process PP.

(2) Items to be set It that does not depend on input and output elements necessary for the facility R to execute the standard process CP are associated with each combination of the facility R and the standard process CP in the facility data Dr. Such items to be set It may be, for example, "an item indicating pressing force to be applied to a screw head from a driver bit, which is necessary to fasten the screw with a predetermined torque". That is, it is necessary to set "the pressing force to be applied to the screw head of a screw S1 or S2 from the driver bit" in advance regardless of whether the screw to be fastened is the screw S1 and the screw S2, in order to fasten the screw with the predetermined torque.

"The item indicating the pressing force to be applied to the screw head from the driver bit, which is necessary to fasten the screw with the predetermined torque" may be an item to be set It for which it is necessary to set a value for each of input and output elements. "The pressing force to be applied to the screw head from the driver bit" may be decided to be proportional to a necessary fastening torque, and for example, "the pressing force to be applied to the screw head from the driver bit" may be set to be strong (=large) for tightly fastening the screw. Also, "the pressing force to be applied to the screw head from the driver bit" may be set to be weak (=small) for a soft screw hole material and for a screw which it is necessary to fasten with a small torque.

The "pressing force to be applied to the screw head from the driver bit" has been described just as one of examples of the items to be set It that do not depend on the input and output elements, and "the pressing force to be applied to the screw head from the driver bit" may be regarded as an item to be set It for which it is necessary to set a value for each of input and output elements. Not only "the pressing force to be applied to the screw head from the driver bit" but also items to be set It that do not depend on the input and output element which is necessary for the facility R to execute the standard process CP are associated with each combination of the facility R and the standard process CP in the facility data Dr.

(One Example of Items to be Set: Items to be Set That are Independent from Input and Output Elements)

FIG. 6 is a diagram illustrating an example of items to be set It that are independent from input and output elements from among the items to be set It in the facility data Dr. As described above with reference to FIG. 5, items to be set It for each of input and output elements and items to be set It that do not depend on the input and output elements (=that are independent from the input and output elements) are defined as the item to be set It for causing the facility R to execute the standard process CP.

For example, an item to be set It that is independent from input and output elements, as exemplified in FIG. 6, is associated with a facility R (facility component) capable of executing "a screw fastening component (a standard process CP(x) of "fastening a screw") in the facility data Dr. That is, the item to be set It (x) that is "a specification of a thrust shaft buffer mechanism" is associated as an item to be set It for causing "the screw fastening component (facility R(x))" to execute (utilize) the standard process CP(x) (service) of "fastening the screw".

The process design device 1 performs the following determination in relation to the item to be set It(x) that is "the specification of the thrust shaft buffer mechanism" defined in the facility data Dr. That is, the process design device 1 determines whether or not a value has been set for "the specification of the thrust shaft buffer mechanism (item to be set It(x))" before "the screw fastening component (facility R(x))" to execute (utilize) the standard process CP(x) (service) of "fastening the screw". If it is determined that no value has been set for "the specification of the thrust shaft buffer mechanism (item to be set It(x))", the process design device 1 requests the user to set a value for the item to be set It(x). The process design device 1 receives "an input of a value to the item to be set It(x)" by the user and then associates the item to be set It (x) for which the value input by the user has been set with "the combination of the facility R(x) and the standard process CP(x)" in the design process data 61.

Here, rotation of the screw and management of the torque in "the fastening of the screw (standard process CP(x))" are realized by an electric driver. At that time, it is necessary to control a robot arm end position such that the position of the driver conforms to the amount of screwing in order to prevent the driver bit from being separated from the screw head and idly turning.

In the "screw fastening component (facility R(x))", the electric driver is fixed to the robot arm end via "a thrust shaft buffer mechanism". "The thrust shaft buffer mechanism" is a simple sliding mechanism with a spring having a degree of freedom with respect to an axial direction of the driver incorporated therein, includes a buffer displacement detection sensor, and generates a signal if buffer displacement becomes equal to or less than a set threshold value. Then, the position of the driver is controlled such that the buffer displacement for generating "the pressing force to be applied to the screw head from the driver bit" necessary for fastening the screw with a designated torque is maintained.

In order to realize "the control of the position of the driver", it is necessary to set a value for a specification (item to be set It) related to "the thrust shaft buffer mechanism" before the "screw fastening component (facility R(x))" provides the service. In other words, in order for "the screw fastening component (facility R(x))" to execute "the screw fastening component (standard process CP(x))", it is necessary to set a value for the item to be set It related to "the thrust shaft buffer mechanism".

(One Example of Items to be Set: Item to be Set for Each of Input and Output Element)

FIG. 7 is a diagram illustrating an example of items related to input and output elements from among the items to be set It in the facility data Dr. For example, an item to be set It for each of input and output element (=related to the input and output elements) as exemplified in FIG. 7 is associated with a facility R (facility component) that can execute a standard process CP(y) of "picking a screw". That is, an item to be set It(y) that is "ScrewPosition (screw supply position)" is associated as an item to be set It for causing "the screw fastening component (facility R(x))" to execute the standard process CP(y) (service) of "picking the screw".

For example, the standard process CP(y) (service) of "picking the screw" that "the screw fastening component (facility R(x))" can execute is the following operation. That is, the standard process CP(y) is an operation of "causing a driver bit tip end with screw adsorption ability to move to a designated screw supply position and picking up (lifting up) one screw with the driver bit tip end". Here, "the designated screw supply position" is identified with a value set for the item to be set It(y) of "ScrewPosition (screw supply position)".

Note that this service can be executed only when "the screw fastening component (facility R(x))" is in a predetermined state (specifically, an "AwaitingWithScrewOnBit" state) described in FIG. 10. After the execution of this service is completed, the state of "the screw fastening component (facility R(x))" transitions to the "AwaitingWithScrewOnBit" state described later in FIG. 10. Note that each parameter exemplified in FIG. 7 can be designated as an argument when this service is called.

FIG. 8 is a diagram illustrating an example of items other than those shown in FIG. 7 relating to the input and output elements from among the items to be set It in the facility data Dr. For example, an item to be set It for each of input and output elements (=related to the input and output elements) as illustrated in FIG. 8 is associated with a facility R (facility component) that can execute a standard procedure CP(z) of "fastening a screw after insertion" in the facility data Dr. That is, an item to be set It(z) of "ScrewHoleCenterPosition (workpiece surface screw hole center)" is associated as an item to be set It for causing "the screw fastening component (facility R(x))" to execute (utilize) the standard process CP(z) (service) of "fastening the screw after the insertion".

For example, the standard process CP(z) (service) of "fastening the screw after the insertion" that "the screw fastening component (facility R(x))" can execute is the following operation. That is, the standard process CP(z) is an operation of "inserting a screw into a designated screw hole position by using the driver with a screw adsorbed at the bit tip end and fastening the screw until the driver sends a fastening completion signal under a set torque condition". Here, "the designated screw hole position" is identified with a value set for the item to be set It(z) of "ScrewHoleCenterPosition (workpiece surface screw hole center)".

Note that the service can be executed only when "the screw fastening component (facility R(x))" is in a predetermined state (specifically, an "AwaitingWithScrewOnBit (a screw has been adsorbed at the driver tip end)" state) described in FIG. 10. The state of "the screw fastening component (facility R(x)) transitions to an "ExecutingServiceWithScrew" state in FIG. 10, and execution of other services is refused (that is, the facility R(x) cannot execute other task processes) during execution of this service. After the execution of this service is completed, the state of "the screw fastening component (facility R(x))" transitions to an "AwaitingWioutScrewOnBit (there is no screw at the driver tip end)" state in FIG. 10. Note that each parameter as exemplified in FIG. 8 can be designated as an argument when this service is called.

FIG. 9 is a diagram illustrating an example of items other than those shown in FIGS. 7 and 8 relating to input and output elements from among the items to be set It in the facility data Dr. For example, an item to be set It for each of input and output elements (=related to the input and output elements) as exemplified in FIG. 9 is associated with a facility R (facility component) that can execute a standard process CP (w) of "retightening of a screw" in the facility data Dr. That is, an item to be set It(z) of "ScrewHoleCenterPosition (workpiece surface screw hole center)" is associated as the item to be set It for causing "the screw fastening component (facility R(x))" to execute (utilize) the standard process CP(w) (service) of "retightening the screw".

For example, the standard process CP(w) (service) of "retightening the screw" that "the screw fastening component (facility R(x))" can execute is the following operation. That is, the standard process CP(w) is an operation of "retightening a screw that has already been inserted into the designated screw hole position (lightly screwed) by using a driver with no screw attached to the bit tip end". Here, "the designated screw hole position" is identified with the value set for the item to be set It(z) that is "ScrewHoleCenterPosition (workpiece surface screw hole center)".

Note that this service can be executed only when "the screw fastening component (facility R(x))" is in a predetermined state (specifically, the "AwaitingWioutScrewOnBit (there is no screw at the driver tip end)" described in FIG. 10. An "ExecutingServiceWithoutScrew" state in FIG. 10 is reached, and execution of other services is refused during the execution of the service. Then, after the execution of the service is completed, the state transitions to the "AwaitingWioutScrewOnBit (there is no screw at the driver tip end)". Note that each parameter as exemplified in FIG. 9 can be designated as an argument when the service is called.

(Example of State Machine)

FIG. 10 is a diagram illustrating an example of a state machine diagram in the facility data Dr. The facility data Dr includes a state machine of the facility R (facility component) and defines "whether the service (standard process CP) can be executed" and "the executable standard process CP if the service can be executed" in each state of the state machine.

FIG. 10 illustrates, as an example, a state machine diagram of the facility R that is a "screw fastening component". The state machine diagram as exemplified in FIG. 10 defines (1) "an initial state (Initializing)" and (2) an "execution state" in which the task process PP (specifically, the standard process CP) is being executed. Also, in the state machine diagram as exemplified in FIG. 10, a "stand-by state" that is a state in which the facility R can execute the task process PP (specifically, the standard process CP) executed in each execution state.

FIG. 11 is a table for describing, for each of the states in the state machine diagram as exemplified in FIG. 10, content and services that can be called in the state. As defined in FIG. 11, "PickingAScrew" in FIG. 10 is the "execution state", and specifically, a state in which the facility R that is the "screw fastening component" is executing the standard process CP(y) (service) of "picking the screw".

"ExecutingServiceWithoutScrew" in FIG. 10 is the "execution state", and specifically, a state in which the facility R that is the "screw fastening component" is executing the service in which no screw is used (for example, the standard process CP(w) of "retightening the screw").

"ExecutingServiceWithAScrew" in FIG. 10 is the "execution state", and specifically a state in which the facility R that is the "screw fastening component" is executing the service of consuming a screw (for example, the standard process CP(z) of "fastening the screw after the insertion").

"AwaitingWithoutScrewOnBit" in FIG. 10 is the "stand-by state", and specifically, a state in which the facility R that is the "screw fastening component" can execute the standard process CP(y) that is executed in "PickingAScrew". Also, "AwaitingWithoutScrewOnBit" is a state in which the facility R that is the "screw fastening component" can execute the standard process CP (for example, the standard process CP(w)) in "ExecutingServiceWithoutScrew".

"AwaitingWithAScrewOnBit" in FIG. 10 is the "stand-by state", and specifically, a state in which the facility R that is the "screw fastening component" can execute the standard process CP (for example, the standard process CP(z)) that is executed in "ExecutingServiceWithAScrew".

(Outline of Processing Flow Executed in System)

Figure 12:
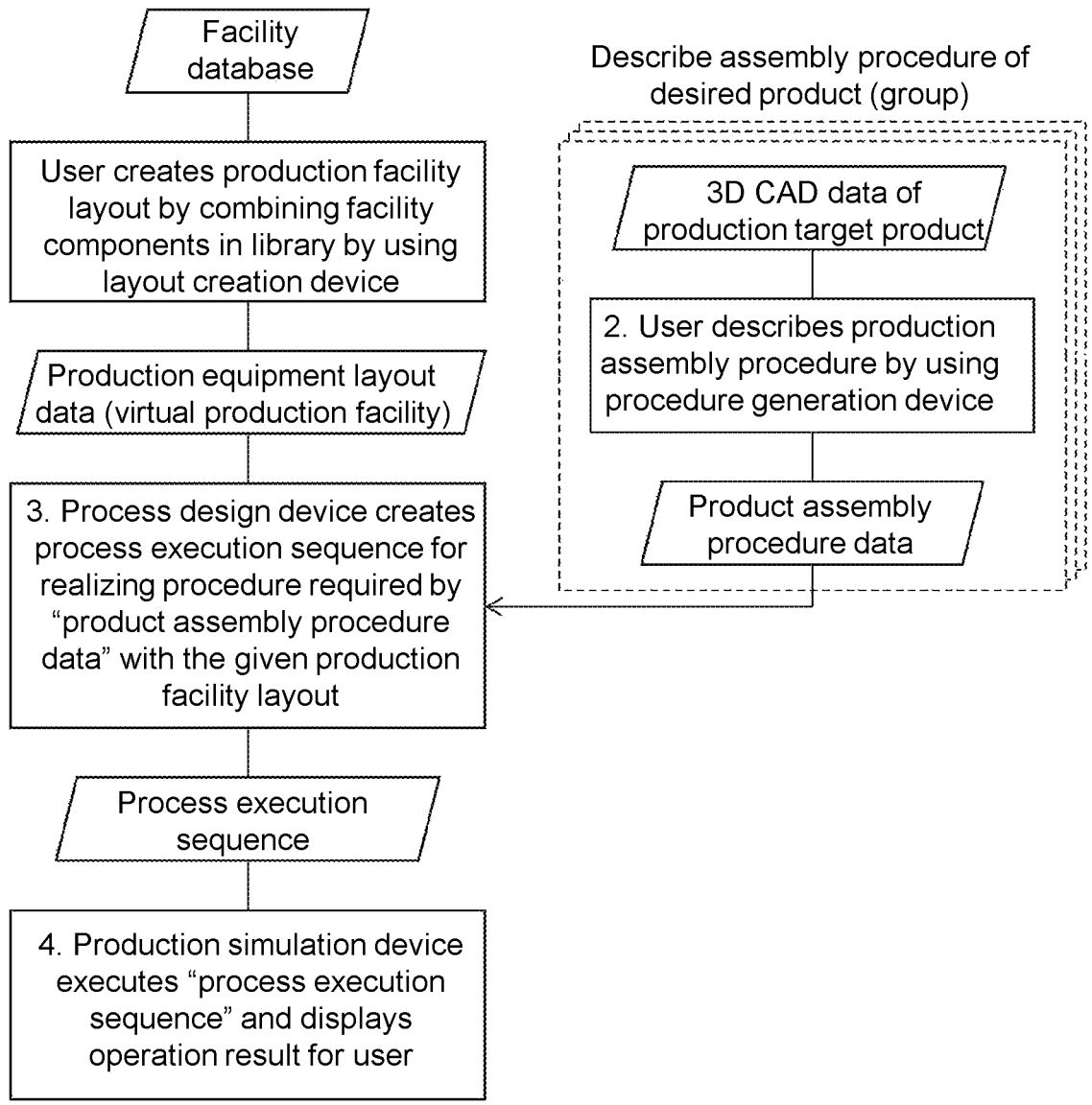
FIG. 12 is a flowchart for describing an outline of processing that is executed by an entire production simulation system illustrated in FIG. 2.

FIG. 12 is a flowchart for describing an outline of processing that is executed in the entire production simulation system Sys exemplified in FIG. 2. The facility database 3 stores the facility data Dr, and the layout creation device 6 acquires the facility data Dr from the facility database 3. The user combines the facility components in the library (that is, the facilities R defined in the facility data Dr) by using the layout creation device 6 and creates the production facility layout (S1).

The layout creation device 6 outputs, to the process design device 1, the production facility layout data that is information related to the production facility layout created by the user (for example, information that identifies the arranged facilities RR that are facilities R arranged in the virtual production space and the like).

The user describes an assembly procedure of a desired product (product group) by using the procedure generation device 5, that is, the user creates the procedure data Dp of the desired product (group) by using the procedure generation device 5. The procedure generation device 5 acquires three-dimensional computer aided design (CAD) data of the desired product (production target product) and presents the acquired three-dimensional CAD data to the user. In addition, the procedure generation device 5 acquires the standard process data Dd from the standard process database 2 and presents, to the user, each of the plurality of standard processes CP defined in the acquires standard process data Dd.

If the user describes the assembly procedure (procedure data Dp) of the desired product (product group) (S2) by using the procedure generation device 5, the procedure generation device 5 outputs the described procedure data Dp to the process design device 1 or stores the described procedure data Dp in the procedure database 4.

The process design device 1 acquires the "assembly procedure data of the product (procedure data Dp)" from the procedure generation device 5 or the procedure database 4. The process design device 1 creates a process execution sequence (=design process data 61) for realizing the task process PP required by the acquired procedure data Dp by a given production facility layout or the like (S3). That is, the process design device 1 associates the arranged facilities RR and the like defined in the production facility layout data acquired from the layout creation device 6 as executing subjects with each of the plurality of task processes PP defined along with the execution order in the procedure data Dp. The process design device 1 creates the process execution sequence (=design process data 61) that associates the facilities R as the executing subjects with the respective task processes PP in the procedure data Dp and outputs the created process execution sequence to the production simulation device 7.

The production simulation device 7 executes the "process execution sequence (=design process data 61)" acquired from the process design device 1 and displays the operation result to the user (S4). That is, the production simulation device 7 executes simulation of causing the facilities R associated with the respective task processes PP in the design process data 61 to execute the respective task processes PP defined along with the execution order in the design process data 61. Then, the production simulation device 7 displays the execution result of the simulation to the user.

(Example of Creation of Production Facility Layout)

Figure 13:
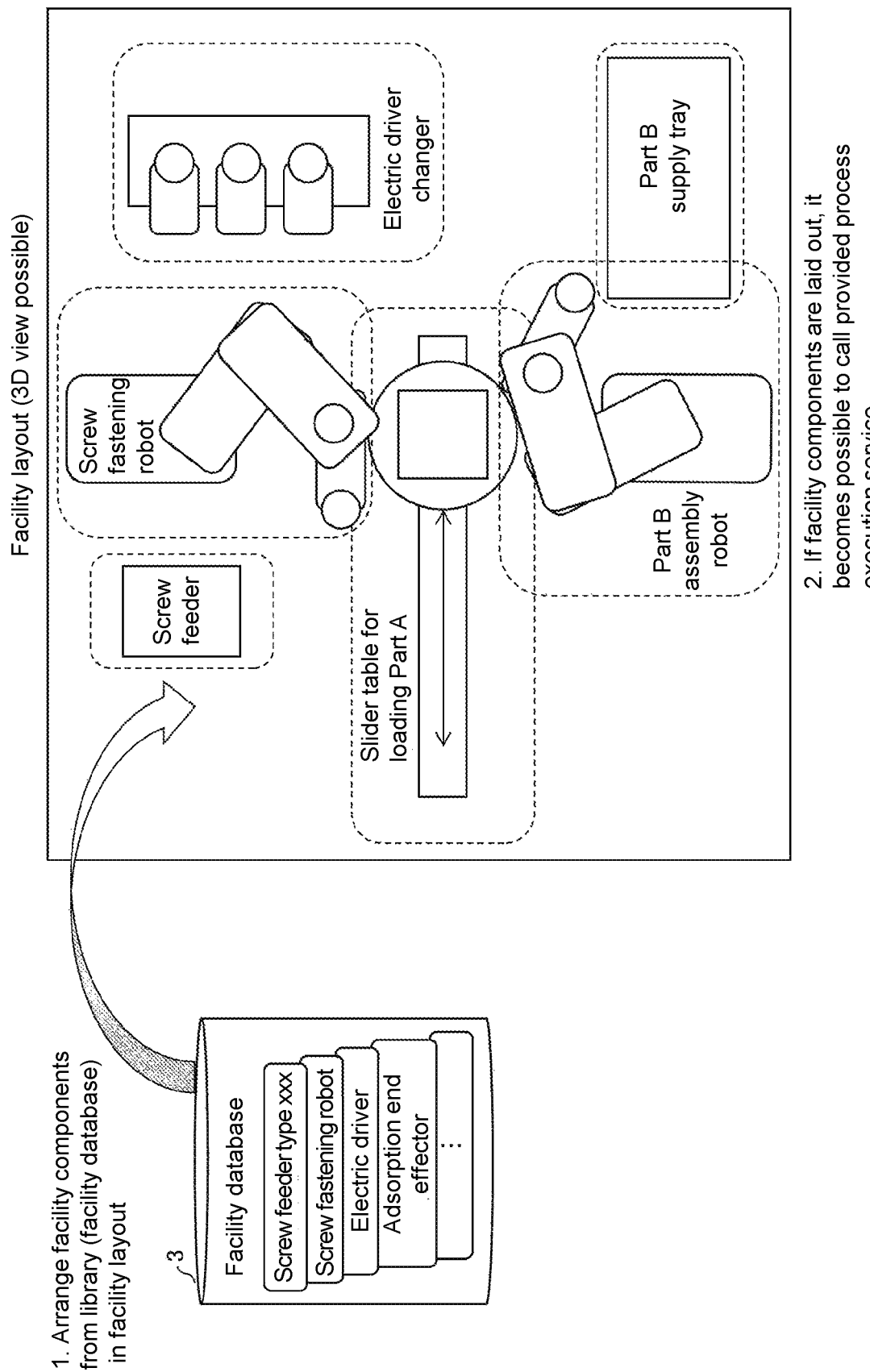
FIG. 13 is a diagram for describing an example of a method of creating a facility layout.

FIG. 13 is a diagram for describing an example of a method of creating a facility layout corresponding to S1 in FIG. 12. As exemplified in FIG. 13, the user combines facility components (=facilities R) in the library (that is, defined in the facility database 3) and creates a layout plan of the production facilities, by using the layout creation device 6. Specifically, the user arranges the facility components from the library in the virtual production space, that is, selects arbitrary facilities R from a list of the facilities R presented by the layout creation device 6 and layouts the facilities R in the virtual production space.

As the facility components in the library are arranged in the virtual production space, the process execution services provided the facility components can be called. That is, the layout creation device 6 notifies the process design device 1 of the facilities R (arranged facilities RR) arranged in the virtual production space as facilities R that executes the task processes PP executable by the facilities R. In particular, the layout creation device 6 notifies the process design device 1 of the production facility layout data "including information for identifying the arranged facilities RR, arrangement position information of the arranged facilities RR in the virtual production space, and the like".

The layout creation device 6 may notify the process design device 1 of information other than the "information for identifying the arranged facilities RR and the arrangement position information of the arranged facilities RR in the virtual production space" for the arranged facilities RR as the production facility layout data. That is, the layout creation device 6 may include "a process ID that is identification information of a standard process CP (task process PP) executable by each facility R" and "process execution ability for the standard process CP executable by each facility R" for the arranged facilities RR in the production facility layout data. In addition, the layout creation device 6 may include "a control program for causing each facility R to execute a standard process CP executable by each facility R" and the like for the arranged facilities RR in the production facility layout data. In other words, the layout creation device 6 may output various kinds of information defined for the respective arranged facilities RR in the facility database 3 to the process design device 1 in such a manner in which the information is included in the production facility layout data.

(Creation Example of Procedure Data)

Figure 14:
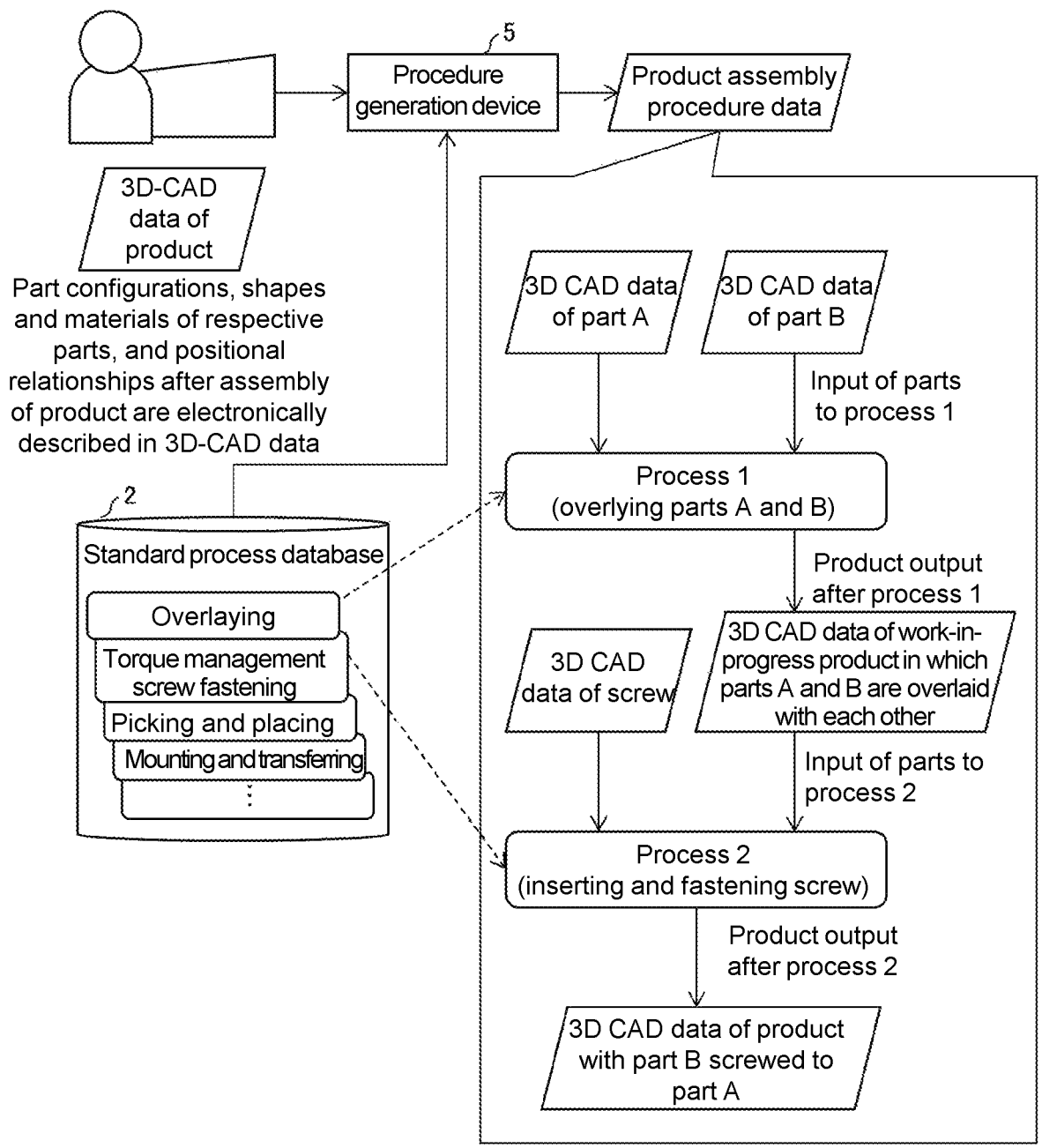
FIG. 14 is a diagram for describing an example of a method of creating procedure data for each product.

FIG. 14 is a diagram for describing an example of a method of creating the "procedure data Dp for each product" corresponding to S2 in FIG. 12. The user describes (creates) the procedure data Dp for each product by using the procedure generation device 5 that presents "three-dimensional CAD data of the product" and "each of the plurality of standard processes CP defined in the standard process data Dd" to the user. In the three-dimensional CAD data that the procedure generation device 5 presents to the user, part configurations of the product, shapes and materials of the respective parts, and positional relationships after the assembly are electronically described.

In FIG. 14, for example, first, the user describes that it is necessary to execute a task process PP(1) of "overlaying a part B on a part A" for the "three-dimensional CAD data of the part A" and the "three-dimensional CAD data of the part B" presented by the procedure generation device 5.

Second, the user describes that "it is necessary to execute the task process PP(2) of inserting and fastening a screw" for the "three-dimensional CAD data of a work-in-progress product with the part B overlaid on the part A" and the "three-dimensional CAD data of the screw" that are presented by the procedure generation device 5.

The procedure generation device 5 presents, to the user, the "three-dimensional CAD data of the product with the part B screwed to the part A" as an execution result of the task process PP(2), that is, as an output of the task process PP(2).

As illustrated in FIG. 14, the user creates the "procedure data Dp for each product" by using the procedure generation device 5. A task process PP(1) having the first execution order and a task process PP(2) having the second execution order are defined in the "procedure data Dp for each product" created in the example illustrated in FIG. 14. The procedure generation device 5 outputs the procedure data Dp including the "task process PP(1) having the first execution order and the task process PP(2) having the second execution order", which is described by the user to the process design device 1, or stores the procedure data Dp in the procedure database 4.

Figure 15:
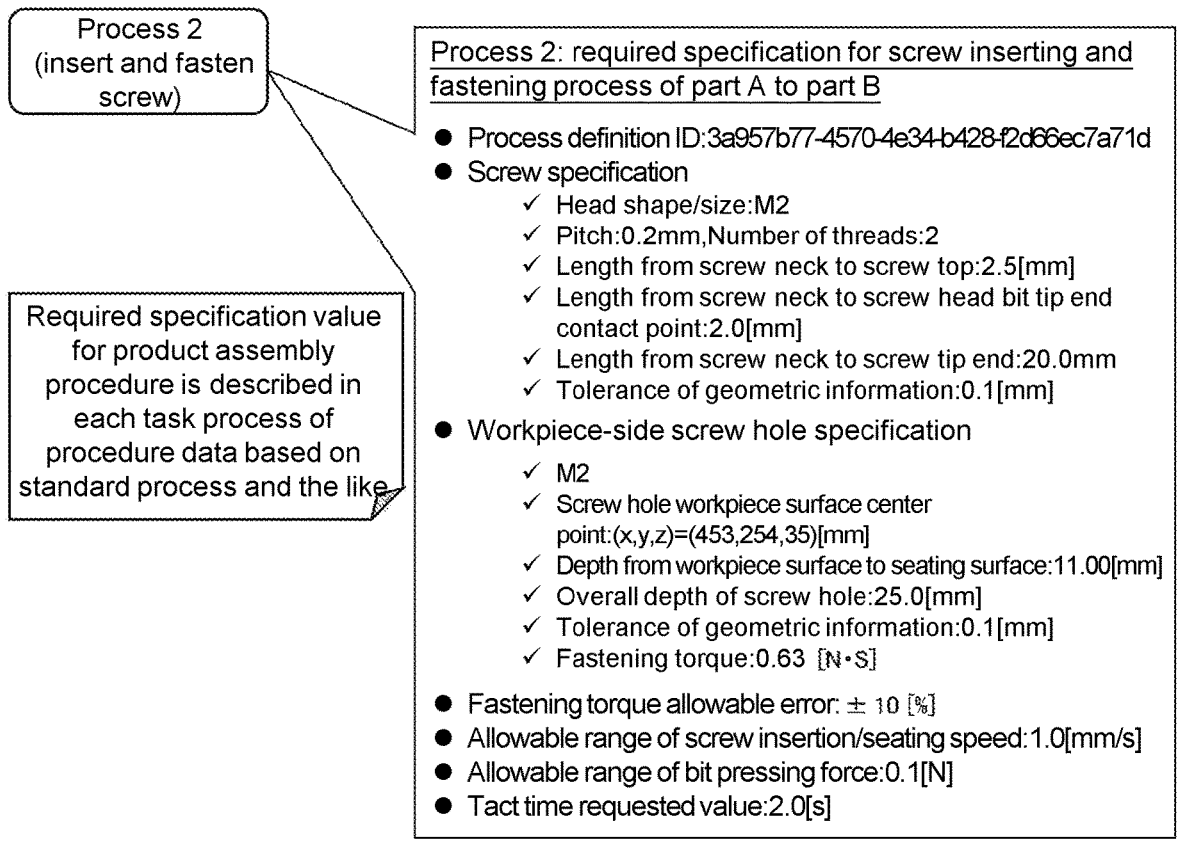
FIG. 15 is a diagram illustrating a description example of the respective task processes in the procedure data.

FIG. 15 is a diagram illustrating a description example of each task process PP in the procedure data Dp. A requested specification value for the assembly procedure of the product is described based on the standard process CP or the like in each task process PP in the procedure data Dp. As described above, the procedure generation device 5 presents, to the user, "each of the plurality of standard processes CP defined in the standard process data Dd" in addition to the "three-dimensional CAD data of the product".

For example, "screw specification", "workpiece-side screw hole specification", "fastening torque", "fastening torque allowable error", "allowable range of screw insertion/seating speed", "allowable range of bit pressing force", "tact time requested value", and the like are defined in the standard process CP of "inserting and fastening the screw" exemplified in FIG. 4. The "screw specification" includes "a head shape/size", "a unit system", "a pitch and a number of threads (pitch*number of threads=lead)", "a length from a screw neck to a screw top", "a length from the screw neck to a screw head bit tip end contact point", "a length from the screw neck to the neck tip end", "a tolerance of geometric information", and the like are included in the "screw specification". "Prerequisite that the screw thread specification is adapted to the screw as product design", "a unit system", "screw hole workpiece surface center point", "a depth from a workpiece surface to a seating surface", "an overall depth of screw hole", "a tolerance of geometric information", and the like are included in the "workpiece-side screw hole specification".

In accordance with this, the user defines the "screw specification", "workpiece-side screw hole specification", "fastening torque", "fastening torque allowable error", "allowable range of screw insertion/seating speed", "allowable range of bit pressing force", and "tact time requested value" for the task process PP of "inserting and fastening the screw" in the procedure data Dp exemplified in FIG. 15. Further, the "head shape/size", "pitch and number of threads", "length from the screw neck to the screw top", "length from the screw neck to the screw head bit tip end contact point", "length from the screw neck to the screw tip end", "tolerance of the geometric information" and the like are defined in the "screw specification". In addition, the "screw hole workpiece surface center point", "depth from the workpiece surface to the seating surface", "overall depth of screw hole", "tolerance of the geometric information", and the like are defined in the "workpiece-side screw hole specification".

Figure 16:
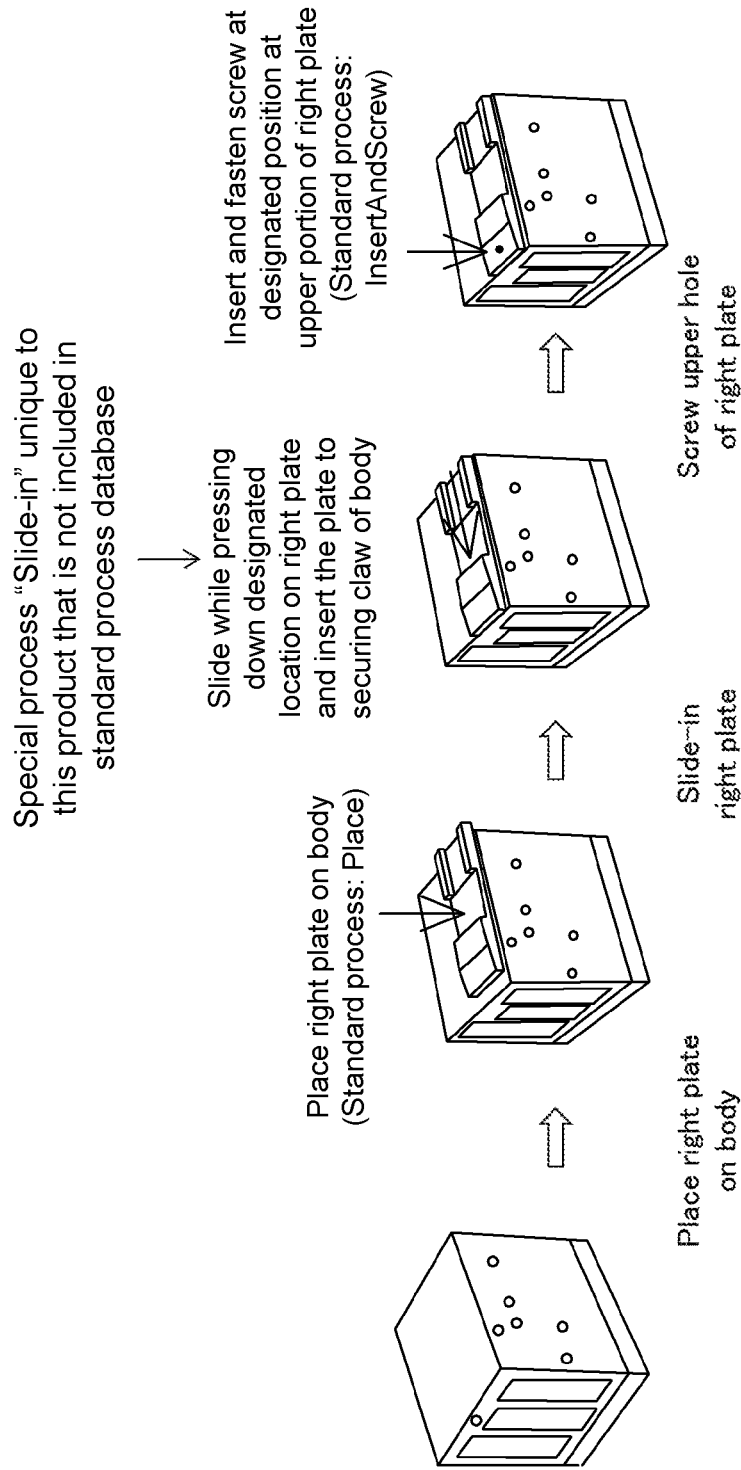
FIG. 16 is a diagram illustrating an example of standard processes and a special process included in the procedure data for each product.

FIG. 16 is a diagram illustrating an example of standard processes CP and a special process SP included in the procedure data Dp for each product. Specifically, FIG. 16 illustrates an example of the standard processes CP and the special process SP included in "a task of screw fastening of a DIN rail mounting plate to a back of a switching power source".

The following three task processes are included in "the task of screw fastening of the DIN rail mounting plate to the back of the switching power source" as an execution order in this order. That is, a task process PP(1) of "placing a right plate on a body", a task process PP(2) of "sliding while pressing down a designated position on the right plate and inserting the right plate to a securing claw of the body", and a task process PP(3) of "inserting and fastening a screw at a designated position at an upper portion of the right plate" are included.

The task process PP(1) corresponds to a standard process CP(1) of "Place (arranging)" while the task process PP(3) corresponds to a standard process CP(2) of "InsertAndScrew (inserting and fastening the screw)". However, the task process PP(2) is a special process SP unique to the product rather than a standard process CP defined in the standard process data Dd stored in the standard process database 2, and is a special process SP that is called "Slide-in".

Example of Processing Flow Executed by Process Design Device

Figure 17:
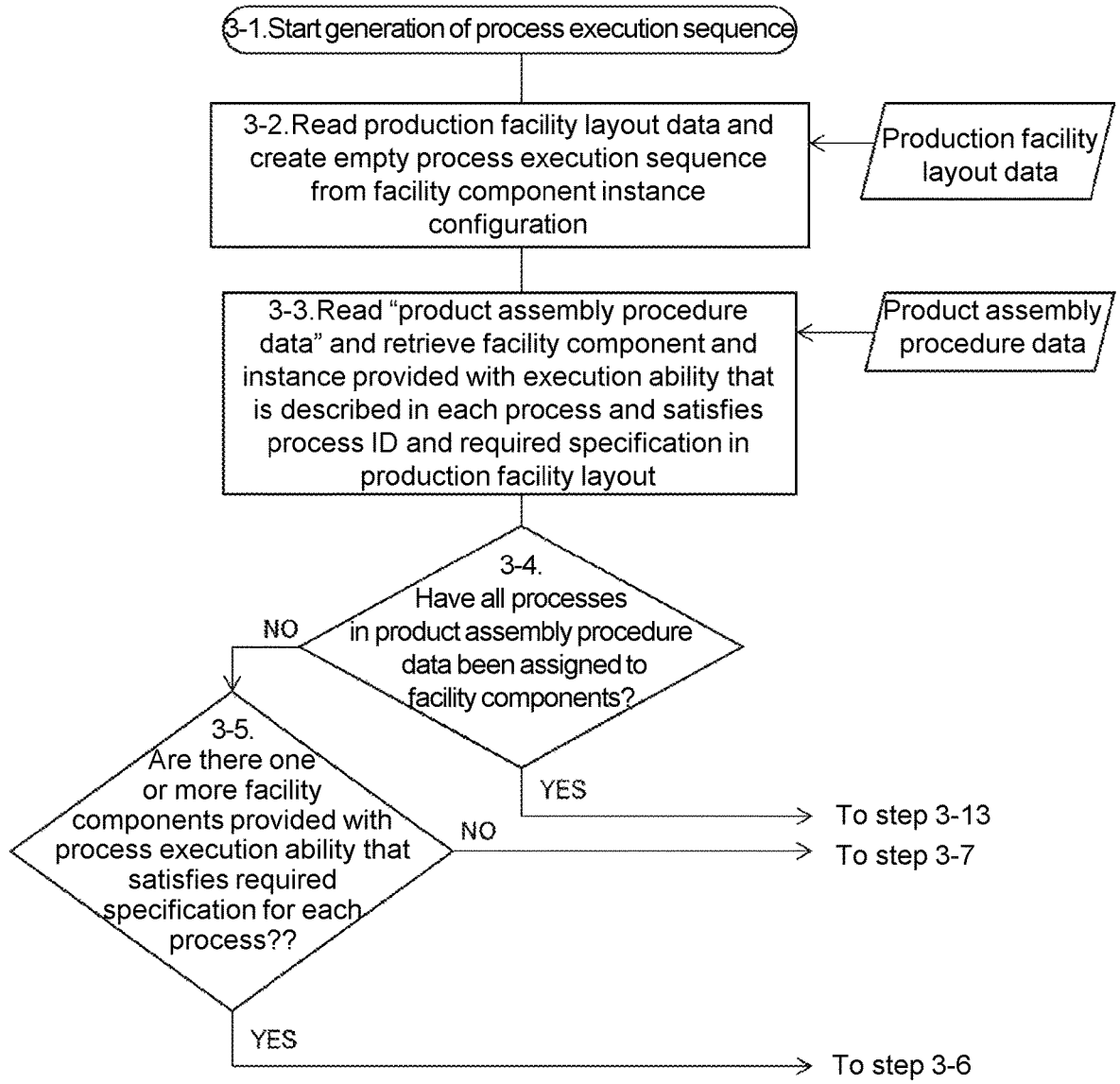
FIG. 17 is a flowchart illustrating, as an example, a part of processing that the process design device in FIG. 1 executes.

FIG. 17 is a flowchart illustrating, as an example, a part of processing that the process design device 1 executes and a diagram for describing details of processing (process execution sequence generation processing) executed by the process design device 1 in S3 in FIG. 12.

The process design device 1 starts the process execution sequence generation processing (S3-1), and first, reads production facility data "including the information for identifying the arranged facilities RR and the arrangement position information of the arranged facilities RR in the virtual production space" from the layout creation device 6. Also, the process design device 1 acquires the facility data Dr from the facility database 3.

The process design device 1 creates "an empty process execution sequence" that uses the arranged facilities RR as the executing subjects from among the facility components (arranged facilities RR) included in the read production facility layout data (S3-2). The "process execution sequence" is data in which the plurality of task processes PP in the "procedure data Dp for each product" are associated with the executing subjects thereof and the execution orders thereof.

Note that information other than "the information for identifying the arranged facilities RR and the arrangement position information of the arranged facilities RR in the virtual production space" may be included in the production facility layout data that the process design device 1 acquires from the layout creation device 6. For example, the production facility layout data acquired by the process design device 1 may include various kinds of information of the respective arranged facilities RR defined in the facility database 3. Specifically, the production facility layout data may include "process IDs of identification of the standard processes CP (task processes PP) executable by the respective arranged facilities RR", "process execution ability of the standard processes CP executable by the respective arranged facilities RR", and the like.

In addition, the process design device 1 may refer to the facility database 3 from the "information for identifying the arranged facilities RR" included in the production facility layout data and acquire various kinds of information defined in the facility data Dr in the facility database 3 for the respective facilities RR.

The process design device 1 reads the "assembly procedure data (procedure data Dp) of the product" acquired from the procedure generation device 5 or the procedure database 4. The process design device 1 retrieves a facility R to be associated as an executing subject with each of the plurality of processes PP defined in the read procedure data Dp, from among the arranged facilities RR in the production facility layout (S3-3). Specifically, the process design device 1 retrieves facility components (facilities R) equipped with "the process IDs (=identification information of the respective task processes PP) of the respective task processes PP in the procedure data Dp and the process execution ability that satisfies required specifications" from among the arranged facilities RR.

That is, the process design device 1 determines whether or not the IDs of the respective task processes PP in the procedure data Dp coincide with the "IDs of the executable task processes PP" of the respective arranged facilities RR. If it is determined that "an ID of a task process PP(n) in the procedure data Dp: PP01" coincides with "an ID of an executable task process PP(m) of an arranged facility RR(1): PP01", for example, then the process design device 1 further executes the following determination. That is, it is determined whether or not "process execution ability of the arranged facility RR(1) for the task process PP(m)" satisfies "a required specification of the task process PP(n)". For example, the process design device 1 determines whether or not the "process execution ability of the arranged facility RR(1) defined for 'the screw specification' and the like for the task process PP(m)" satisfies "a requirement defined for 'the screw specification' and the like of the task process PP(n)". If it is determined that the "process execution ability of the arranged facility RR(1) for the task process PP(m)" satisfies the "required specification of the task process PP(n)", then the process design device 1 associates the arranged facility RR(1) with the task process PP(n).

The process design device 1 determines "whether or not the facility components (facilities R) have been assigned (=associated) as the executing subjects" with all the task processes PP in the assembly procedure data (procedure data Dp) of the product (S3-4). If it is determined that the "facility components have been assigned" to all the task processes PP in the procedure data Dp (Yes in S3-4), then the process design device 1 transitions to S3-13 in FIG. 19.

If there is a task process PP, for which it is determined that "no facility component has been assigned", remaining in the procedure data Dp (No in S3-4), the process design device 1 executes the following determination. That is, the process design device 1 determines "whether or not there are one or more facility components (facilities R) provide with process execution ability that satisfies the required specification in the arranged facilities RR" for each task process PP in the procedure data Dp (S3-5).

Figure 18:
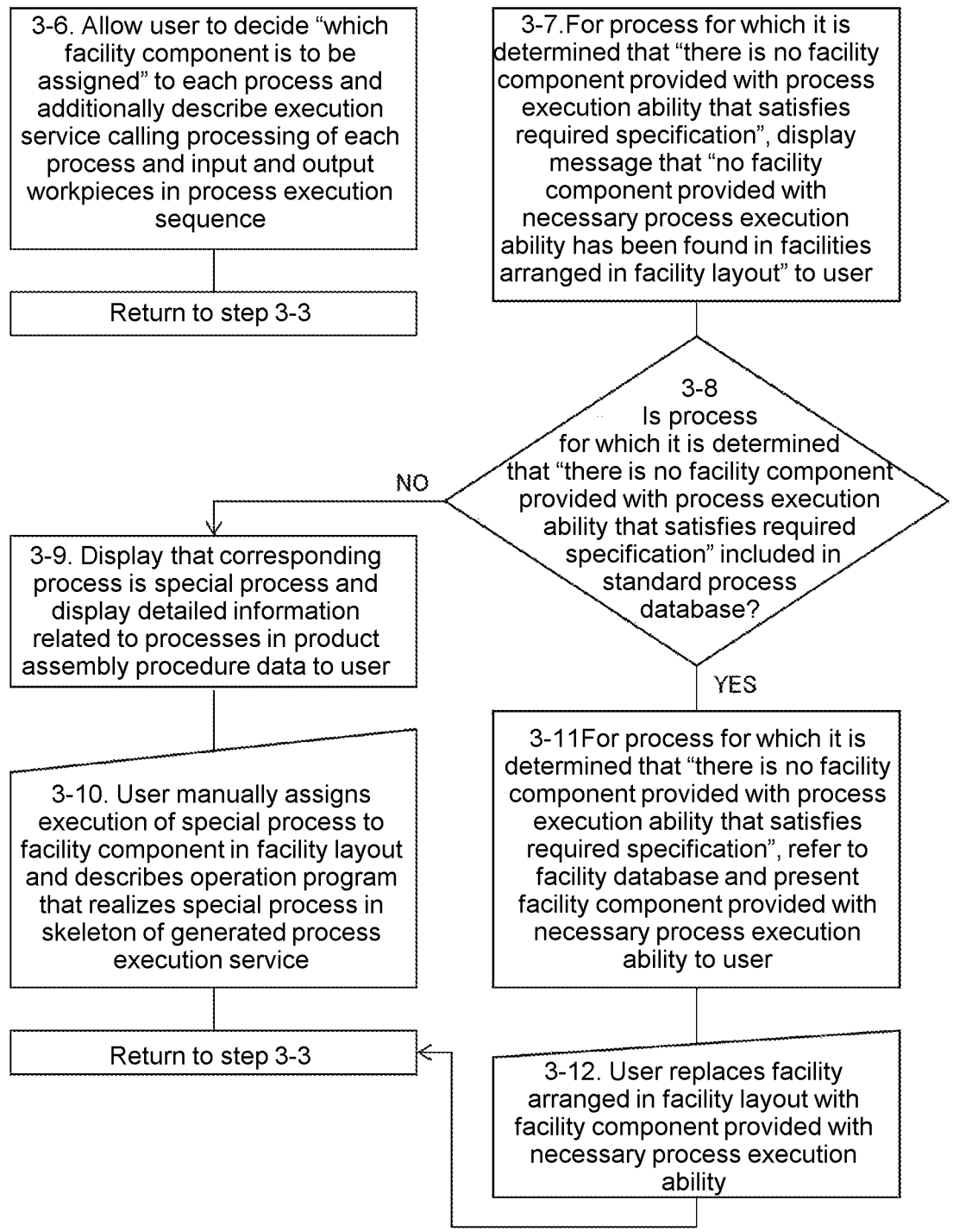
FIG. 18 is a flowchart illustrating portions different from those illustrated in FIG. 17, of the processing executed by the process design device of FIG. 1.

The process design device 1 executes the processing in S3-6 in FIG. 18 based on the task process PP determined as "there are one or more facilities R provided with the process execution ability that satisfies the required specification in the arranged facilities RR" (Yes in S3-5) from among the task processes PP in the procedure data Dp. In addition, the process design device 1 executes processing in S3-7 in FIG. 18 for the task process PP determined as "that there is no facility R having the process execution ability that satisfies the required specification in the arranged facilities RR" (No in S3-5) from among the task processes PP in the procedure data Dp.

FIG. 18 is a flowchart illustrating portions different from those illustrated in FIG. 17, of the processing executed by the process design device of FIG. 1, and specifically, a flowchart illustrating processing executed after the processing exemplified in FIG. 17.

The process design device 1 allows the user to select an executing subject for the task process PP determined as "there is one or more facilities R provided with the process execution ability that satisfies the required specification in the arranged facilities RR" (Yes in S3-5) from among the task processes PP in the procedure data Dp. That is, the process design device 1 allows the user to decide "which facility component is to be assigned (specifically, which arranged facility RR is to be assigned)" with respect to the task process PP to be determined as Yes in S3-5. Then, the process design device 1 associates the arranged facility RR decided as an executing subject of the task process PP with the task process PP by the user. The process design device 1 further associates execution service calling processing of the task process PP and input and output elements (input and output workpieces) with the task process PP and additionally describes the execution service calling processing and the input and output elements to the process execution sequence (S3-6). In other words, the process design device 1 stores, in the design process data 61 of the storage unit 60, the data in which the arranged facilities RR as the executing subjects, the execution service calling processing of the task process PP, and the input and output elements are associated with the task process PP. The process design device 1 executes the processing in S3-6 and returns to S3-3.

The process design device 1 notifies the user of the following information for the task process PP determined as "there is no facility R having the process execution ability that satisfies the requested specification in the arranged facilities RR" (No in S3-5) from among the task processes PP in the procedure data Dp. That is, the process design device 1 displays, for the user, the fact that "no facility component (that is, the facility R) with necessary process execution ability has been found in the facilities arranged in the facility layout (that is, the arranged facilities RR)" (S3-7).

The process determination unit 20 of the process design device 1 determines whether or not the task process PP determined as "there is no facility R provided with the process execution ability that satisfies the required specification included in the arranged facility RR" is included in the standard process data Dd in the standard process database 2 (S3-8). That is, the process determination unit 20 determines whether or not the task process PP is the standard process CP.

The display control unit 30 causes the display device 8 to display that the task process PP determined not to be the standard process CP by the process determination unit 20 (No in S3-8) is "a special process SP". Also, the display control unit 30 causes the display device 8 to display "detailed information related to the task process PP in the assembly procedure data (procedure data Dp) of the product" for the task process PP determined not to be the standard process CP by the process determination unit 20 (S3-9).

The user assigns execution of the special process SP to a facility component (=arranged facility RR) in the facility layout or a facility R defined in the facility data Dr. That is, the arranged facility RR or the facility R serving as an executing subject is associated with the task process PP determined "not to be the standard process CP (=special process SP)" by the process determination unit 20 and displayed by the display control unit 30 in an emphasized manner.

The receiving unit 40 of the process design device 1 receives a user's operation of "associating the arranged facility RR or the facility R as the executing subject with the special process SP", and the display control unit 30 causes the process execution sequence of the associated arranged facility RR or the facility R to be displayed.

In addition, the receiving unit 40 of the process design device 1 receives a user's operation of inputting the control program for "causing the arranged facility RR or the facility R associated with the special process SP to execute the special process SP". The display control unit 30 displays the control program input by the user's operation received by the receiving unit 40 in the process execution sequence of the arranged facility RR or the facility R.

That is, the process design device 1 describes the "control program for realizing the special process SP" input by the user in a skeleton of the process execution service provided by the "arranged facility RR or the facility R selected by the user" as the executing subject (S3-10). The process design device 1 executes the processing in S3-10 and then returns to S3-3.

For the task process PP determined to be the standard process CP by the process determination unit 20 (Yes in S3-8), it has been determined in S3-5 that "there is no facility R provided with the process execution ability that satisfies the required specification in the arranged facilities RR". For the task process PP, which is determined to be the "standard process CP" and determined as "there is no facility component (arranged facility RR) provided with the process execution ability that satisfies the required specification of the task process PP", the process design device 1 executes the following processing. That is, the process design device 1 refers to the facility database 3, retrieves the facility component (facility R) provided with the process execution ability necessary for the task process PP, and presents the retrieved facility R to the user (S3-11).

The user returns to S1 in FIG. 12 and replaces a facilities R arranged in the facility layout with the facility R presented in S3-11. That is, the user resets the executing subject of the task process PP, which is determined to be the "standard process CP" by the process design device 1 and determined as "there is no facility component (arranged facility RR) provided with the process execution ability that satisfies the required specification of the task process PP". Specifically, the user replaces the arranged facility RR in the facility layout with a facility R provided with the process execution ability that satisfies the required specification of the task process PP (S3-12).

If the processing in S3-12 is executed, the process design device 1 acquires, from the layout creation device 6, the production facility layout data that includes the "facility R provided with the process execution ability that satisfies the required specification of the task process PP", which has been replaced in S3-12. Then, the process design device 1 associates the arranged facility RR in the newly acquired production facility layout data with the task process PP and returns to S3-3.

Figure 19:
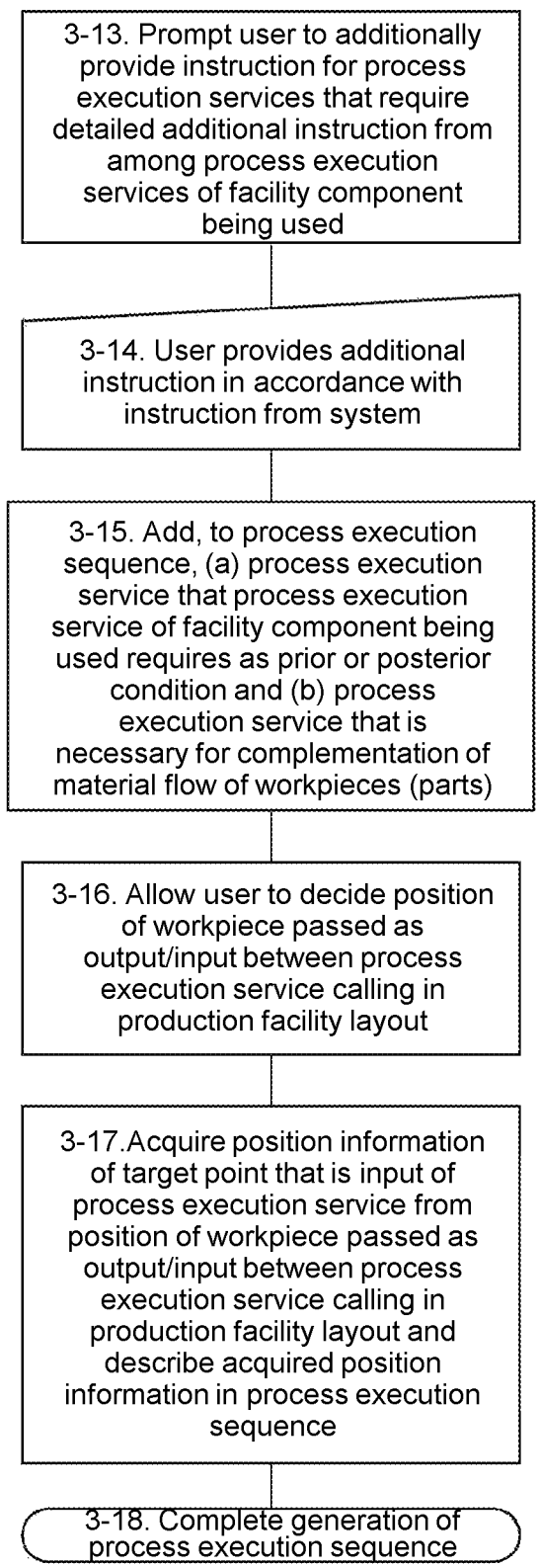
FIG. 19 is a flowchart illustrating portions different from those illustrated in FIGS. 17 and 18, of the processing executed by the process design device of FIG. 1.

FIG. 19 is a flowchart illustrating portions different from those illustrated in FIGS. 17 and 18, of the processing executed by the process design device of FIG. 1, and specifically, a flowchart illustrating processing that is executed after the processing exemplified in FIGS. 17 and 18.

The process design device 1 prompts the user to additionally provide an additional instruction for a process execution service for which it is necessary to additionally provide an instruction for details, from among process execution services (=task processes PP) of the facility component (=facility R) being used (S3-13). That is, the process design device 1 promotes addition of detailed information and the like necessary to cause the facility R to execute the task process PP. Note that the "process execution service (=task process PP) of the facility component (=facility R) being used" means "each task process PP in the procedure data Dp" that is "a task process PP in which each facility R is associated as an executing subject".

Specifically, the item determination unit 77 of the process design device 1 acquires, for the combination of the facility R being used and the task process PP, "the item to be set It defined for the combination of the facility R and the task process PP (standard process CP) in the facility data Dr". Next, the item determination unit 77 determines whether or not a value has been set for the acquired item to be set It at a timing at which the facility R is caused to execute the task process PP. For the item to be set It determined as "no value has been set" by the item determination unit 77, the display control unit 30 causes the display device 8 to display information that promotes setting of a value for the item to be set It. The user provides an additional instruction in response to an instruction from the system (that is, the process design device 1) (S3-14).

The process design device 1 adds the following two process executions services (=task processes PP) to the process execution sequence (S3-15).

That is, the process design device 1 (A) adds a process execution service (for example, a preparation process RP) that is required by a process execution service (=task process PP) of the facility component (=facility R) as a previous or subsequent condition, to the process execution sequence. Specifically, the state determination unit 71 determines "whether or not the facility R is in the stand-by state for the task process PP at the timing at which the facility R that is being used is caused to execute the task process PP being used" by using state transition information (state machine diagram) of the facility R in the facility data Dr. For the facility R of the combination determined "not to be in the stand-by state" by the state determination unit 71, the preparation process acquisition unit 72 acquires the preparation process RP by using the state transition information of the facility R in the facility data Dr and notifies the preparation process addition unit 73 of the acquired preparation process RP. The preparation process addition unit 73 adds, to the design process data 61, the preparation process RP being notified as the task process PP to be executed before the task process PP of the combination determined "not to be in the stand-by state" by the state determination unit 71.

In addition, the process design device 1 (B) adds a process execution service (for example, a supply process IP) that is necessary for supplementing of a material flow of workpieces (parts), to the process execution sequence. Specifically, the part determination unit 74 determines whether or not an input element "that is necessary for the facility R to execute the task process PP" has been supplied to the facility R at the timing at which "the facility R that is being used is caused to execute the task process PP being used". The supply process addition unit 76 adds, to the design process data 61, a supply process IP of "supplying an input element 'that is determined not to be supplied by the part determination unit 74' to the facility R" as the task process PP to be executed before the task process PP being used.

The process design device 1 allows the user to decide a position of a workpiece passed as an output/input between process execution service callings in the production facility layout (S3-16). Specifically, the item determination unit 77 acquires, for the combination of the facility R being used and the task process PP, "the item to be set It for each of input and output elements of the task process PP of the combination" from among "the items to be set It defined for the combination in the facility data Dr". "The item to be set It for each of input and output elements of the task process PP of the combination" from among "the items to be set It defined for the combination in the facility data Dr" means an item related to a position of an input element that is necessary to cause the facility R to execute the task process PP, for example.

Next, the item determination unit 77 determines whether or not the value has been set for the acquired item to be set It at the timing at which the facility R is caused to execute the task process PP. For the item to be set It determined as "no value has been set" by the item determination unit 77, the display control unit 30 causes the display device 8 to display information for prompting setting of a value for the item to be set It.

The user identifies the positions of the input and output elements (workpieces) in the production facility layout, for example, that is, the positions of the input and output element (workpieces) in the virtual production space that the layout creation device 6 presents to the user. The layout creation device 6 notifies the process design device 1 of the positions of the input and output elements (workpieces) in the virtual production space.

The process design device 1 acquires position information of a target point that serves as an input of the process execution service from the position of the workpiece passed as an output/input between the process execution service callings in the production facility layout and describes the position information in the process execution sequence (S3-17). That is, the process design device 1 identifies the position of "the workpiece to be exchanged among a plurality of task processes PP in the process execution sequence (=design process data 61)" from the position of the workpiece "in the virtual production space that the layout creation device 6 presents to the user". "Workpiece to be exchanged among the plurality of task processes PP in the process execution sequence (=design process data 61)" are defined as input and output elements for the respective task processes PP in the facility data Dr. The process design device 1 executes the processing in S3-17 and then completes the process execution sequence generation processing (S3-18).

The processing that the process design device 1 executes as described above with reference to FIGS. 17, 18, and 19 can be summarized as follows. That is, the control method executed by the process design device 1 is a control method of the process design device 1 of associating the executing subject that executes the task process PP with each of the plurality of task processes PP included in the task procedure of assembling or disassembling the product (procedure data Dp). The control method executed by the process design device 1 includes: a standard process acquisition step in which standard process data Dd that defines "a plurality of standard processes CP, each of which is a task process PP executable by at least one facility R, is acquired; a facility acquisition step (S3-2) in which "facility data Dr that defines a task process PP executable by each facility R" is acquired for each facility R; a procedure acquisition step (S3-3) in which "procedure data Dp that defines a plurality of task processes PP for assembling or disassembling the product along with an execution order is acquired for each product"; a process determination step (S3-8) in which it is determined "whether or not each of the plurality of task processes PP defined in the procedure data Dp is included in the standard process data Dd"; and a display control step (S3-9) in which a special process SP that is a task process PP "that is determined not to be included in the standard process data Dp" in the process determination step is displayed in an emphasized manner on a display screen (process design screen) of the procedure data Dp.

According to the aforementioned method, it is determined whether or not each of the plurality of task processes PP defined in the procedure data Dp is included in the standard procedure data Dd, and the task process PP that is determined not to be included in the standard process data Dd is displayed as a special process SP in an emphasized manner.

Here, a special task process PP unique to the product, which is difficult to define in advance, is typically included in assembling and disassembling the actual product.

In the control method, it is determined whether or not such "a special task process PP unique to the product, which is difficult to define in advance", that is, the task process PP that is not a standard process CP defined in the standard process data Dd is included in the procedure data Dp. Then, in the control method, "the special task process PP unique to the product, which is difficult to define in advance", included in the procedure data Dp is displayed as a special process SP in an emphasized manner, the user is notified of the special process SP, and the user is prompted to examine such a task process PP.

Therefore, the control method has an effect that it is possible to prompt the user to examine such a special task process PP unique to the product, which is difficult to define in advance, and to design a process of assembling the product or the like even when such a task process PP is included in the procedure of assembling the product or the like.

(Outline of Process Design Screen)

Figure 20:
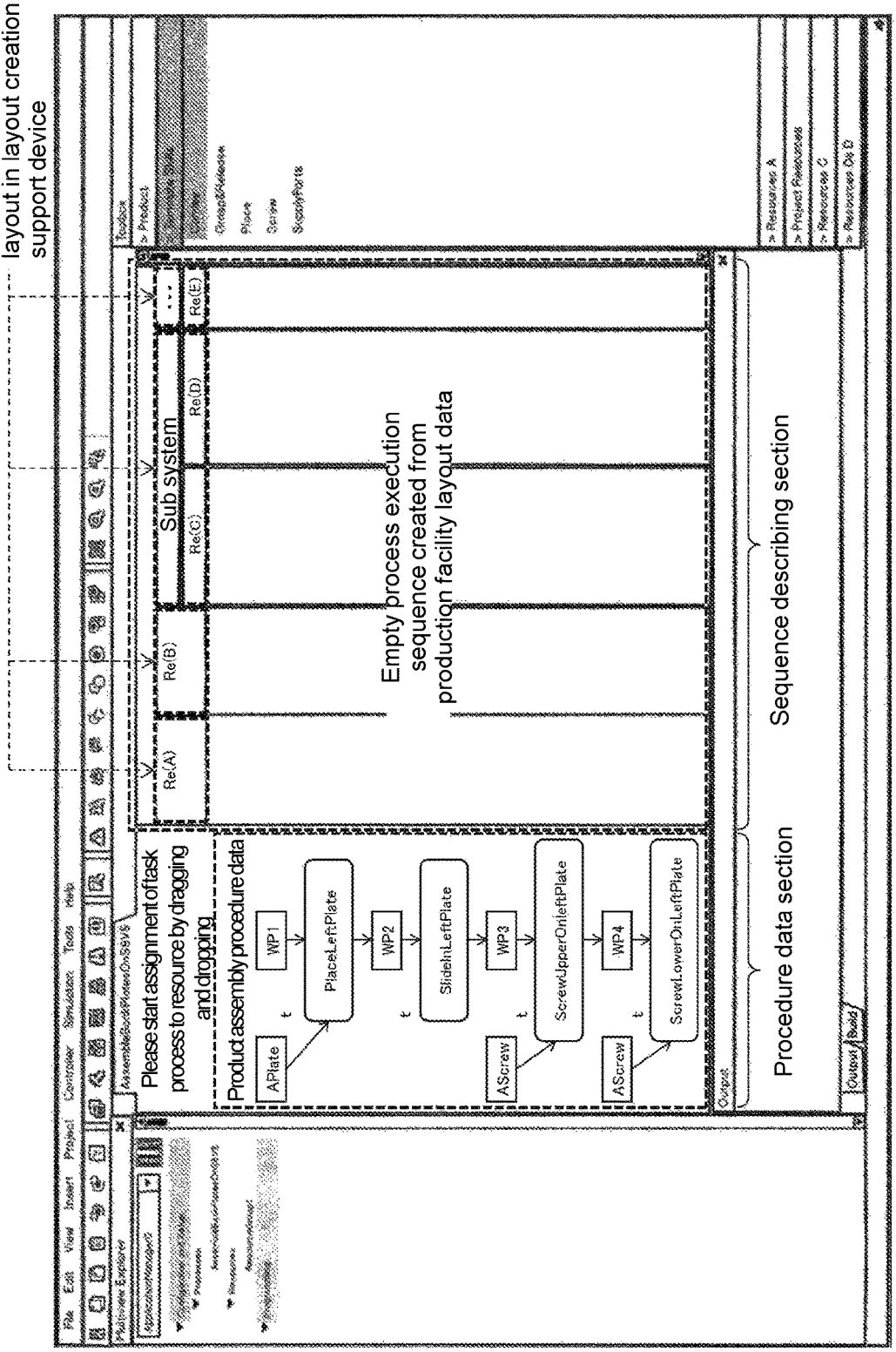
FIG. 20 is a diagram illustrating an example of a process design screen that is a screen that a display device is caused to display while the process design device in FIG. 1 is executing processing.

FIG. 20 is a diagram illustrating an example of a process design screen that is a screen that the display device 8 is caused to display while the process design device 1 is executing the processing. The process design device 1 causes the display device 8 to display the process design screen as exemplified in FIG. 20, and in particular, the display control unit 30 of the process design device 1 controls various kinds of display content on the process design screen.

The display control unit 30 causes a "product assembly procedure data (procedure data Dp)" display section and a "process execution sequence (=design process data 61)" display section (hereinafter, also referred to as a "sequence description section) to be displayed at substantially the center of the process design screen.

The display control unit 30 causes the respective task processes PP in the procedure data Dp to be displayed such that the task processes PP of the earlier execution orders are arranged on the upper side, in the "product assembly procedure data" display section. Also, the display control unit 30 causes the respective task processes PP in the procedure data Dp as a process execution sequence in association with the respective facilities R as the executing subjects thereof in the "process execution sequence" display section. The display control unit 30 causes the respective task processes PP in the process execution sequence to be displayed such that the task processes PP of the earlier orders are arranged on the upper side, in the "process execution sequence" display section.

The display control unit 30 causes "an empty process execution sequence" that uses, as executing subjects, the facility components (arranged facilities RR) included in the production facility layout data read from the layout creation device 6 to be displayed in the "process execution sequence" display section. Then, the display control unit 30 arranges the respective task processes PP in the procedure data Dp in a "process execution sequence" row that uses the facilities R associated with the task processes PP as executing subjects and causes the respective task processes PP to be displayed.

Figure 21:
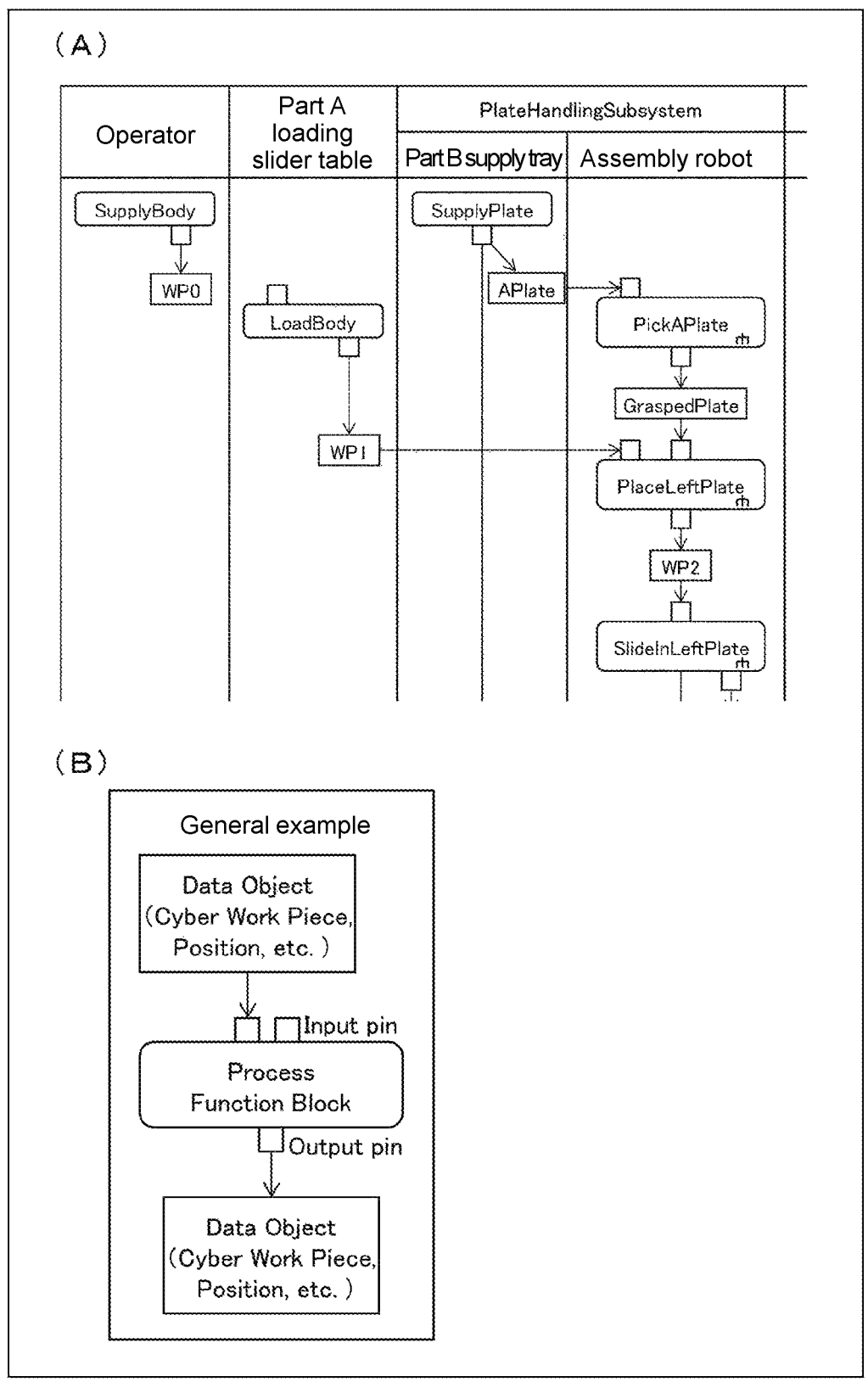
FIG. 21 is a diagram for describing a display example and display details in a sequence description section on the process design screen in FIG. 20.

FIG. 21 is a diagram for describing a display example and display content of the sequence description section ("process execution sequence" display section) on the process design screen in FIG. 20. As exemplified in (A) of FIG. 21, the vertical lanes in the "process execution sequence" display section corresponds to "process execution sequence" rows, that is, the vertical lanes indicate "a process execution sequence" that uses the respective arranged facilities RR in the production facility layout data as executing subjects. As exemplified in (B) of FIG. 21, rectangles with rounded corners in the respective lanes in the "process execution sequence" display section indicate calling of the process execution services that the facility components provide, that is, the rectangles represent task processes PP executable by the respective arranged facilities RR. In addition, the rectangles (rectangles with no rounded corners) in the "process execution sequence" display section indicate workpieces (parts, work-in-progress products, half products). In the "process execution sequence" display section, the arrows that connect the rectangles with the rounded corners and the rectangles indicate that workpieces are passed between a plurality of process execution services. Further, pins arranged on the upper side of the rectangles with the rounded corners indicating calling of process execution services indicate inputs of workpieces (parts or the like) to the process execution services, while pins arranged on the lower side of the rectangles with the rounded corners on the sheet indicate outputs of workpieces from the process execution services.

That is, the display control unit 30 causes, for each facility R as an executing subject, the task processes PP executed by the facility R to be displayed with rectangles with the rounded corners in the "process execution sequence" row that uses the facility R as the executing subject, in the "process execution sequence" display section. In addition, the display control unit 30 causes input and output elements (workpiece) defined in the facility data Dr for combinations of the facility R and the task processes PP to be displayed with rectangles (rectangular shapes with non-rounded corners) for the task processes PP executed by each facility R.

Then, the display control unit 30 causes inputs of input elements defined for the combination of the facility R and the task processes PP to be displayed as pins arranged on the upper side of the rectangles with the rounded corners indicating the task processes PP in the "process execution sequence" rows that uses the facility R as the executing subject. In addition, the display control unit 30 causes outputs of output elements defined for the combinations of the facility R and the task processes PP to be displayed as pins arranged on the lower side of the rectangles with the rounded corners indicating the task processes PP in the "process execution sequence" rows that uses the facility R as the executing subject.

(Emphasized Display of Special Process)

Figure 22:
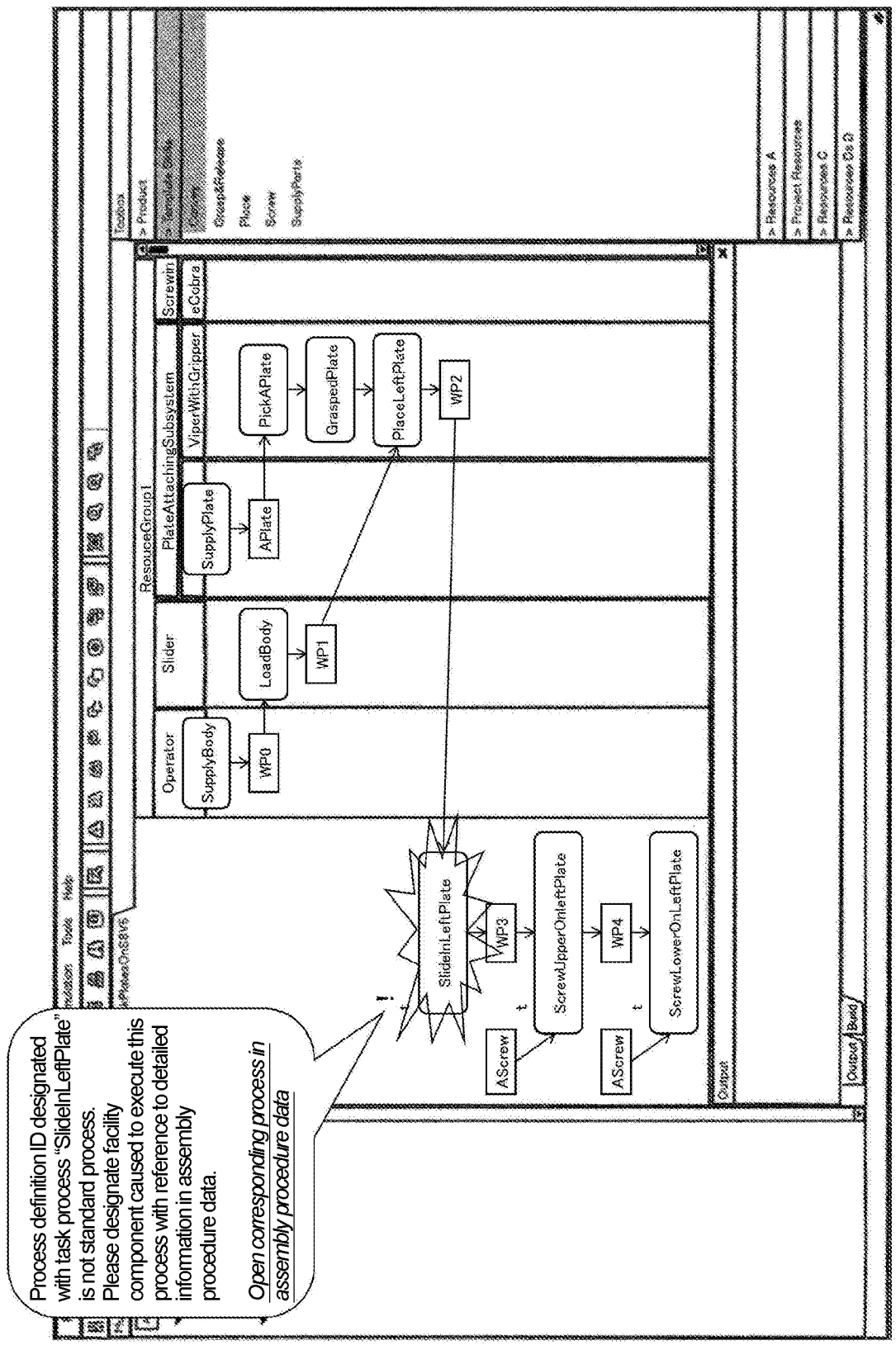
FIG. 22 is a diagram of a display example of a special process on the process design screen in FIG. 20.

FIG. 22 is a diagram illustrating a display example of the special process SP on the process design screen in FIG. 20 and illustrates an example of the process design screen displayed by the process design device 1 for executing the processing corresponding to S3-9 in FIG. 18. The display control unit 30 of the process design device 1 displays the task process PP determined to be the special process SP by the process determination unit 20 from among the task processes PP in the procedure data Dp in an emphasized manner. For example, the display control unit 30 notifies the user of the fact that the task process PP of "SlideInLeftPlate" is a special process SP in FIG. 22. Specifically, the display control unit 30 notifies the user of information indicating that "the task process PP of 'SlideInLeftPlate' is not a standard process CP".

The display control unit 30 requests the user to further provide an additional instruction (such as setting of an executing subject, an input of a control program for causing the set executing subject to execute the task process PP, and the like) for the task process PP determined to be the special process SP by the process determination unit 20. For example, the display control unit 30 notifies the user of a message "Please designate a facility component (facility R) caused to execute this task process with reference to detailed information in the procedure data Dp" in FIG. 22.

Note that the task process PP of "SlideInLeftPlate" is an example of the special process SP of "Slide-in" in FIG. 16. The task process PP of "SlideInLeftPlate" is a special process SP unique to the product that is "to place the plate to the claw of the body by sliding forward the designated location of the left plate placed at a predetermined position on the body while pressing down the designated location", for example. Since the task process PP of "SlideInLeftPlate" is not a standard process CP such as "fastening a screw" or "overlaying", there is no facility component (=facility R) that can execute the special process SP of "SlideInLeftPlate" in the library. Therefore, the process design device 1 allows the user to decide "which facility component is caused to execute the special process SP", that is, allows the user to decide the facility R with which the special process SP is associated.

If the user executes selection of "opening the process in the procedure data Dp", the display control unit 30 causes details of the task process PP of "SlideInLeftPlate" in the procedure data Dp to be displayed.

(Setting of Executing Subject for Special Process)

Figure 23:
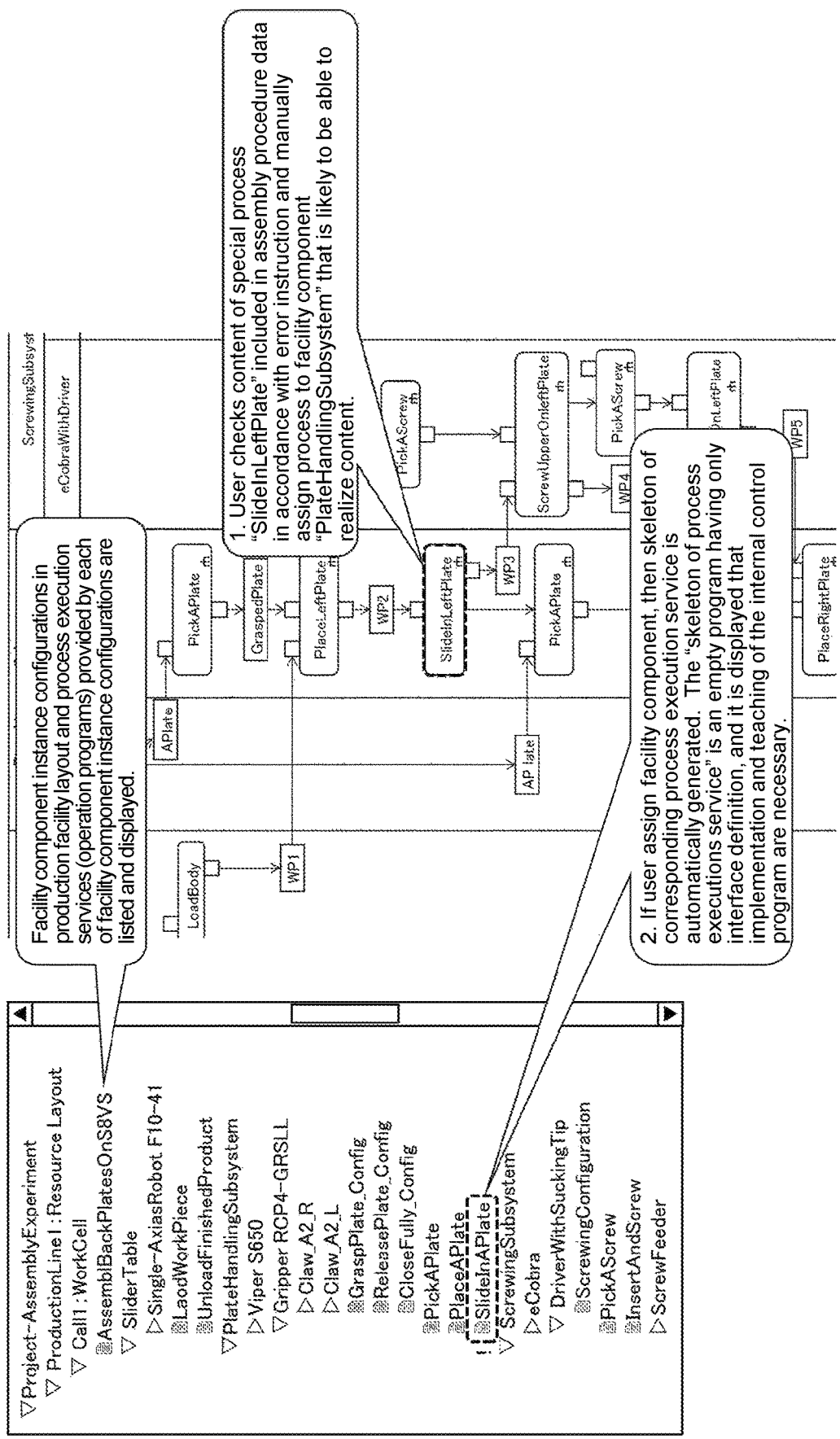
FIG. 23 is a diagram illustrating a display example that requests a user to associate a task subject with a special process on the process design screen in FIG. 20.

FIG. 23 is a diagram illustrating a display example in which the user is requested to associate a task subject with the special process SP on the process design screen in FIG. 20 and illustrates an example of the process design screen when the user performs the processing of associating the facility R with the special process SP in S3-10 in FIG. 18.

The display control unit 30, for example, displays the facility components (=arranged facilities RR) in the facility layout and the process execution services (and operation programs) provided by the respective facility components as a list on the left side of the process design screen (the left side in the sheet of FIG. 23). That is, the display control unit 30 displays "the standard processes CP defined for the arranged facility RR in the facility data Dr and the control program for causing the arranged facility RR to execute the standard processes CP" for each arranged facility RR as a list.

Here, the display control unit 30 of the process design device 1 displays (error display) the task process PP of "SlideInLeftPlate" determined to be the special process SP in an emphasized manner as the processing corresponding to S3-9 In FIG. 18, as described above with reference to FIG. 22. In addition, the display control unit 30 displays details of the task process PP of "SlideInLeftPlate" in the procedure data Dp.

The user checks the content of the special process SP: "SlideInLeftPlate" included in the procedure data Dp and manually assigns (associates) the facility component: "PlateHandlingSubsystem (Facility R(x))" that is likely to be able to realize the special process SP to the special process SP, in response to the error instruction and the like in FIG. 22.

If the user assigns the facility component (facility R(x)) to the special process SP, the process design device 1 automatically generate a skeleton for the process execution service corresponding to the assignment. "The skeleton for the process execution service" is an empty program that has only interface definition, and the process design device 1 displays the message (indicates an error) that it is necessary to mount and teach the control program inside the skeleton.

Figure 24:
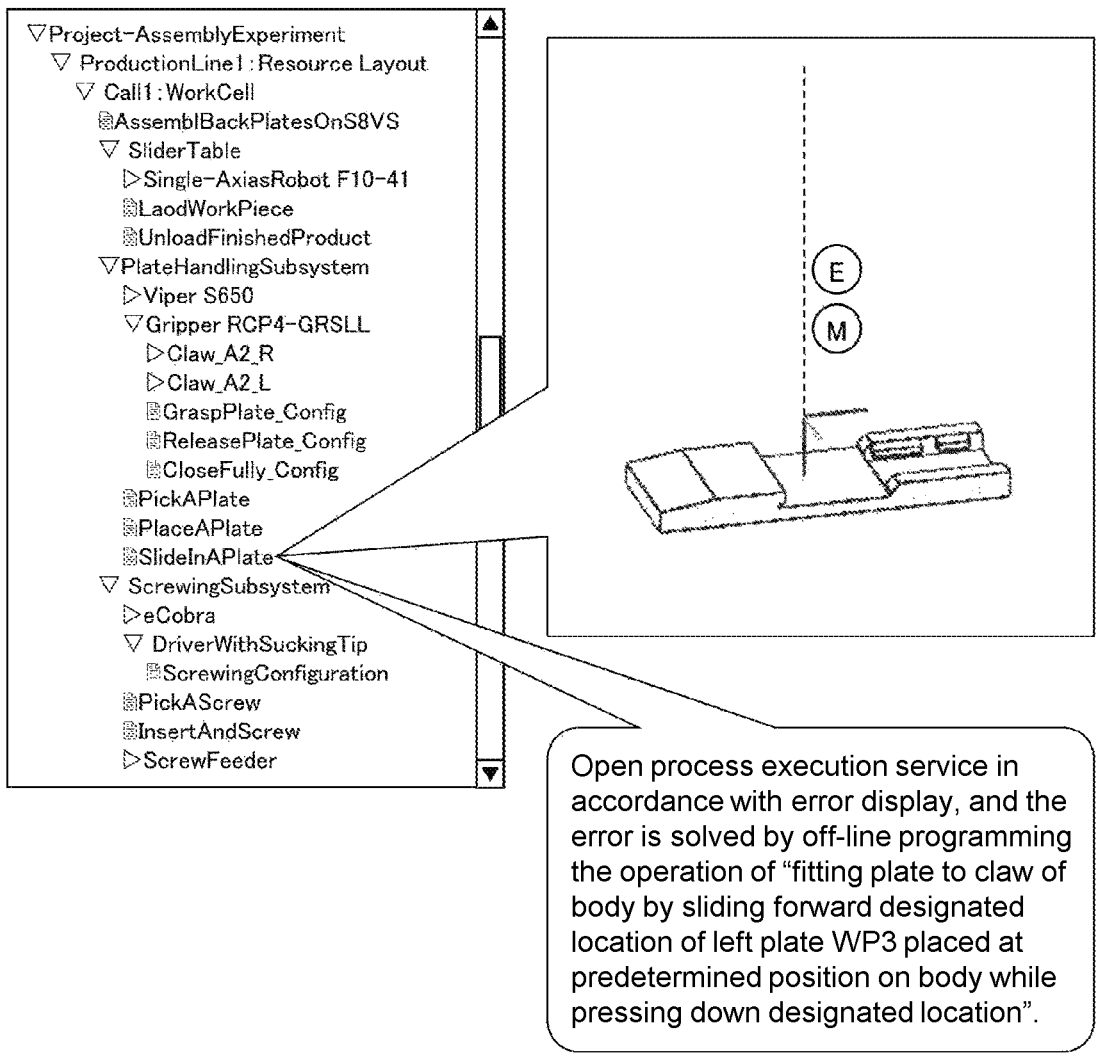
FIG. 24 is a diagram illustrating a display example of the process design screen in FIG. 20 after a user's operation in S3-10 in FIG. 18 is received.

FIG. 24 is a diagram illustrating a display example of the process design screen in FIG. 20 after the user's operation in S3-10 in FIG. 18 is received. The user opens the skeleton for the process execution service in accordance with the error display and off-line programs the operation of "fitting the plate to the claw of the body by sliding forward the designated location of the left plate placed at the predetermined position on the body while pressing down the designated location". The process design device 1 solves the error display by reading the control program generated by the off-line programming.

As described above, the process design device 1 displays the task process PP determined not to be the standard process CP, that is, the task process PP determined to be the special process SP in an emphasized manner from among the task processes PP included in the product assembly task procedure (that is, in the procedure data Dp). Then, the process design device 1 prompts the user to decide the facility R to be caused to execute the special process SP and to additionally mount the control program that realizes the special process SP on the facility R (facility component). The user performs off-line teaching about the special process SP on the facility R selected as the executing subject of the special process SP, for example. The process design device 1 reads the control program generated through the off-line teaching by the user as a control program that causes the facility R to execute the special process SP.

The process design device 1 generates the control program for associating desired facilities R with the standard processes CP in the procedure data Dp by using the facilities R and the control programs thereof defined in advance in the library (facility database 3) and causing the facility to execute the standard process CP. The process design device 1 generates the control program for setting the executing subject of the special process SP and further causing the set executing subject to realize the special process SP incorporation with the user even for the special process SP in the procedure data Dp. Therefore, the process design device 1 can cause the production simulation device 7 to efficiently execute simulation for manufacturing.

(Example of Acquisition and Addition of Uninput Item)

Figure 25:
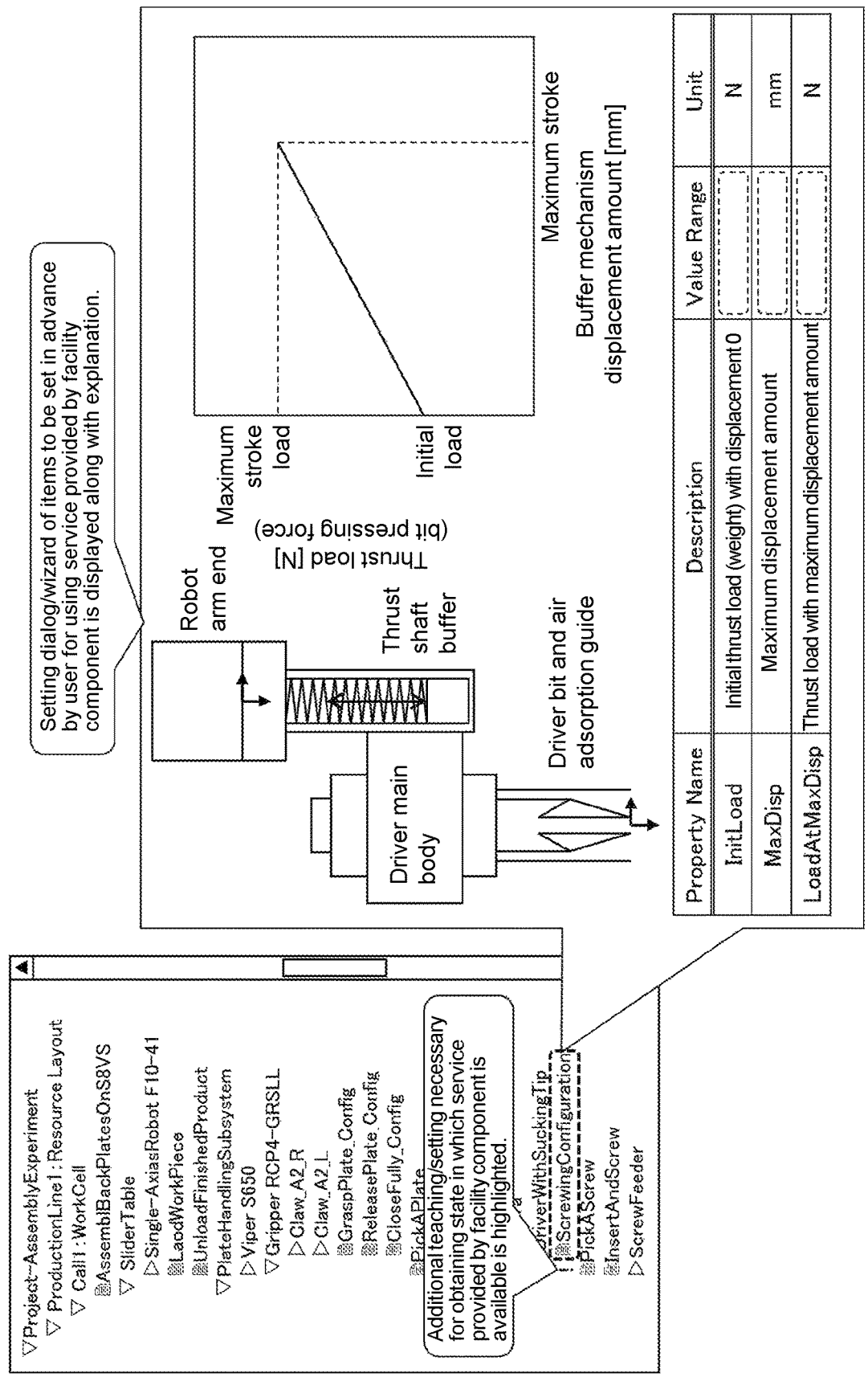
FIG. 25 is a diagram illustrating an example of a screen that prompts the user to input an unset item to be set.

FIG. 25 is a diagram illustrating an example of a screen that prompts the user to input an unset item to be set It and illustrates an example of the process design screen displayed by the process design device 1 that executes the processing corresponding to S3-13 in FIG. 19. The display control unit 30 of the process design device 1 displays setting dialog/wizard for the item to be set It that must be set by the user in advance along with an explanation when the service provided by the facility component is used. That is, the display control unit 30 displays additional teaching/setting necessary to obtain a state in which it is possible to use the service provided by the facility component in an emphasized manner.

For example, it is assumed that a task process PP(1), a task process PP(2), a task process (3), and a task process PP(4) are stored in the process execution sequence (=design process data 61) as an execution order in this order. In addition, it is assumed that the following facilities R are associated as the executing subjects of the task processes PP with the respective task processes PP in the process execution sequence. That is, it is assumed that a facility R(1) is associated with the task process PP(1), the facility R(2) is associated with the task process PP(2), a facility R(3) is associated with the task process PP(3), and a facility R(4) is associated with the task process PP(4), in the process execution sequence.

In this case, the item determination unit 77 acquires "items to be set It (1-1) to It(1-x) defined for the combination of the facility R(1) and the task process PP(1) (standard process CP(1)) in the facility data Dr" for the combination of the facility R(1) and the task process PP(1) first. Next, the part determination unit 74 determines whether or not a value has been set for each of the items to be set It(1-1) to It(1-x) at the timing at which the facility R(1) is caused to execute the task process PP(1).

In addition, the item determination unit 77 acquires "items to be set It(2-1) to It(2-x) defined for the combination of the facility R(2) and the task process PP(2) (standard process CP(2)) in the facility data Dr" for the combination of the facility R(2) and the task process PP(2). Next, the part determination unit 74 determines whether or not a value has been set for each of the items to be set It(2-1) to It(2-x) at the timing at which the facility R(2) is caused to execute the task process PP(2). Similarly, the item determination unit 77 acquires "items to be set It(3-1) to It(3-x) defined for the combination of the facility R(3) and the task process PP(3) (standard process CP(3)) in the facility data Dr" for the combination of the facility R(3) and the task process PP(3). Next, the part determination unit 74 determines whether or not a value has been set for each of the items to be set It(3-1) to It(3-x) at the timing at which the facility R(3) is caused to execute the task process PP(3). In addition, the item determination unit 77 acquires "items to be set It(4-1) to It(4-x) defined for the combination of the facility R(4) and the task process PP(4) (standard process CP(4)) in the facility data Dr" for the combination of the facility R(4) and the task process PP(4). Next, the part determination unit 74 determines whether or not a value has been set for each of the items to be set It(4-1) to It(4-x) at the timing at which the facility R(4) is caused to execute the task process PP(4).

If it is determined that no value has been set for the item to be set It(3-1) at the timing at which the facility R(3) is caused to execute the task process PP(3), for example, the item determination unit 77 notifies the display control unit 30 of the determination result and displays information for prompting setting of the value for the item to be set It(3-1).

The receiving unit 40 receives the user's operation of inputting a value for the item to be set It(3-1) and associates the item to be set It(3-1), for which the value input by the user's operation has been set, with "the combination of the facility R(3) and the task process PP(3) (standard process CP(3))" in the design process data 61.

Note that the receiving unit 40 may notify the first setting unit 51 or the second setting unit 52 of the item to be set It(3-1), for which the value input by the user's operation has been set as described above. Then, the first setting unit 51 or the second setting unit 52 may associate the item to be set It(3-1), for which the value has been set, with "the combination of the facility R(3) and the task process PP(3)" in the design process data 61.

(Example of Acquisition and Addition of Preparation Process and Supply Process)

Figure 26:
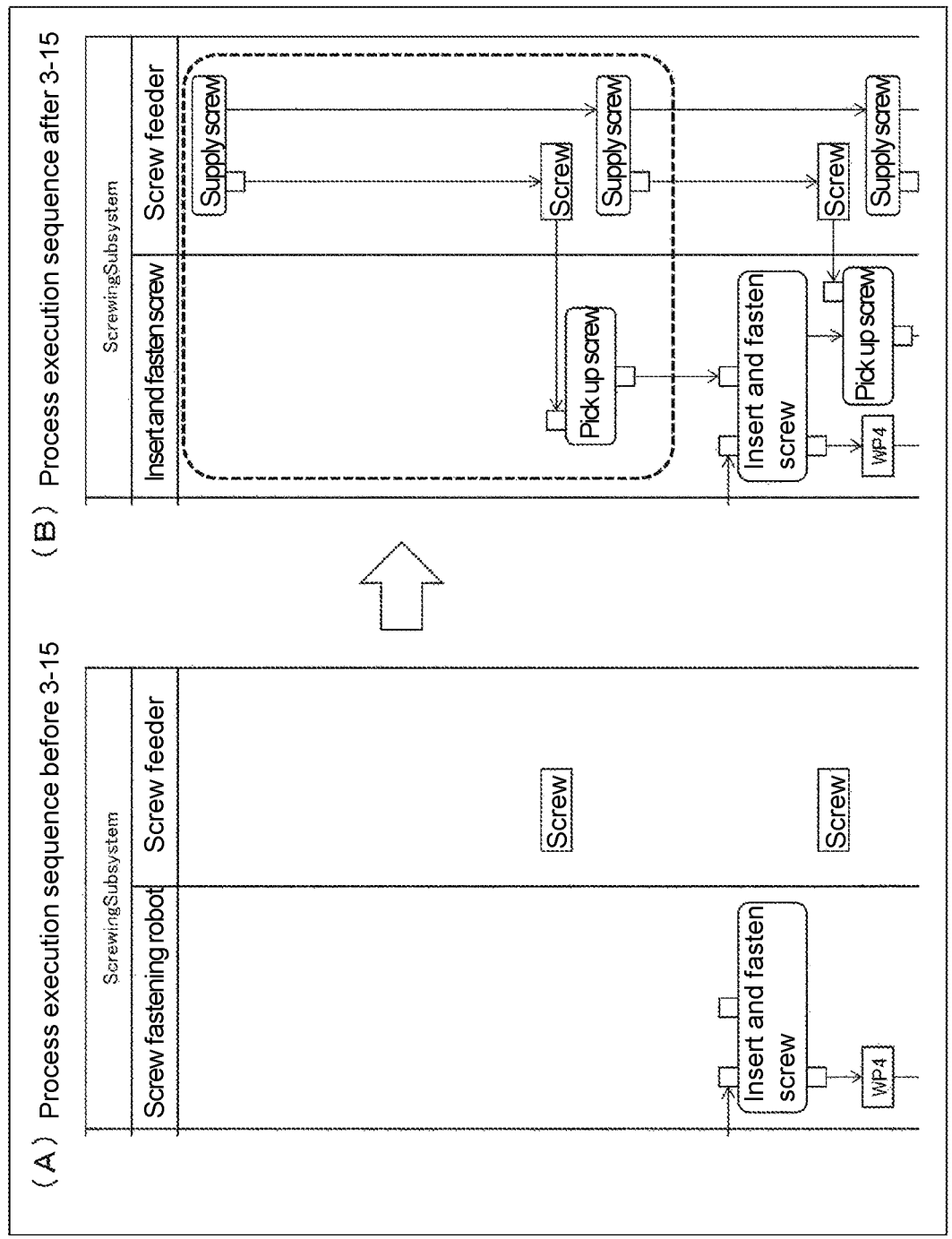
FIG. 26 is a diagram illustrating an example of a sequence description section before and after at least one of a preparation process and a supply process is added to a task process in procedure data.

FIG. 26 is a diagram illustrating an example of the sequence description section before and after at least one of the preparation process RP and the supply process IP is added to the task processes in the procedure data Dp. That is, (A) of FIG. 26 illustrates an example of the process design screen before the process design device 1 executes processing corresponding to S3-15 in FIG. 19 while (B) of FIG. 26 illustrates an example of the process design screen after the process design device 1 executes the processing corresponding to S3-15.

(A. Example of Acquisition and Addition of Preparation Process)

For example, the state determination unit 71 of the process design device 1 determines that it is necessary to execute a service of "picking up a screw" (preparation process RP(x)) before executing a service of "inserting and fastening the screw" (task process PP(x)) from the state machine of the "screw fastening component (facility R(x))".

In response to the aforementioned determination result of the state determination unit 71, the preparation process addition unit 73 adds the service of "picking up the screw" (preparation process RP(x)) to the process execution sequence as a service to be executed before the execution of the service of "inserting and fastening the screw" (task process PP(x)). Hereinafter, details of the processing of "acquiring and adding the preparation process RP" executed by the process design device 1 will be described.

For example, it is assumed that a task process PP(1), a task process PP(2), a task process PP(3), and a task process PP(4) are stored in the process execution sequence (=design process data 61) as an execution order in this order. Then, it is assumed that the following facilities R are associated as executing subjects of the task processes PP with the respective task processes PP in the process execution sequence. That is, it is assumed that a facility R(1) is associated with the task process PP(1), a facility R(2) is associated with the task process PP(2), a facility R(3) is associated with the task process PP(3), and a facility R(4) is associated with the task process PP(4), in the process execution sequence.

In this case, the state determination unit 71 performs the following determination for the combination of the task process PP(1) and the facility R(1), the combination of the task process PP(2) and the facility R(2), the combination of the task process PP(3) and the facility R(3), and the combination of the task process PP(4) and the facility R(4) first. That is, the state determination unit 71 determines "whether or not the facility R(1) is in the stand-by state for the task process PP(1) at the timing at which the facility R(1) is caused to execute the task process PP(1)" by using state transition information of the facility R(1) in the facility data Dr. Also, the state determination unit 71 determines "whether or not the facility R(2) is in the stand-by state for the task process PP(2) at the timing at which the facility R(2) is caused to execute the task process PP(2)" by using state transition information of the facility R(2) in the facility data Dr. Similarly, the state determination unit 71 determines "whether or not the facility R(3) is in the stand-by state for the task process PP(3) at the timing at which the facility R(3) is caused to execute the task process PP(3)" by using the state transition information of the facility R(3). Also, the state determination unit 71 determines "whether or not the facility R(4) is in the stand-by state for the task process PP(4) at the timing at which the facility R(4) is caused to execute the task process PP(4)" by using the state transition information of the facility R(4).

If it is determined that the facility R(3) is not in the stand-by state for the task process PP(3) at the timing at which the facility R(3) is caused to execute the task process PP(3), for example, the state determination unit 71 notifies the preparation process acquisition unit 72 of "the combination of the facility R(3) and the task process PP(3)".

The preparation process acquisition unit 72 acquires the preparation process RP for the task process PP(3) of "the combination of the facility R(3) and the task process PP(3)" notified from the state determination unit 71 by using "the state transition information of the facility R(3)" defined in the facility data Dr. For example, the preparation process acquisition unit 72 refers to the state transition information of the facility R(3), and first, acquires an intermediate state that is a state that the facility R(3) reaches before transition from "the initial state or the executions state of the task process PP(3)" to "the stand-by state for the task process PP(3)". Next, when the acquired intermediate state is the execution state of certain task process PP, the preparation process acquisition unit 72 acquires the task process PP that is executed in the intermediate state as the preparation process RP. The preparation process acquisition unit 72 notifies the preparation process addition unit 73 of the acquired preparation process RP.

The preparation process addition unit 73 adds, to the design process data 61, the preparation process RP notified from the preparation process acquisition unit 72 as the task process PP that is to be executed before the task process PP(3) of "the combination of the facility R(3) and the task process PP(3)" notified from the state determination unit 71.

The following data is stored in the design process data 61 through the addition of the aforementioned data by the preparation process addition unit 73. That is, the task process PP(1), the task process PP(2), the preparation process RP, the task process PP(3), and the task process PP(4) are stored in the design process data 61 as an execution order in this order. In addition, the facility R(1) is associated with the task process PP(1), the facility R(2) is associated with the task process PP(2), the facility R(3) is associated with the preparation process RP and the task process PP(3), and the facility R(4) is associated with the task process PP(4) as the executing subjects of the respective task processes PP in the design process data 61.

(B. Example of Acquisition and Addition of Supply Process)

The part determination unit 74 determines that "it is necessary to take a screw supplied somewhere" as an input before the execution of the service of "picking up the screw" (preparation process RP(x)). In response to the aforementioned result of determination made by the part determination unit 74, the supply process acquisition unit 75 determines that "it is necessary to cause a facility component (=facility R) provided with 'screw sharing' process execution ability to go to take the screw".

The supply process acquisition unit 75 adds the following processing if it is confirmed that only a "screw feeder" component (facility R(z)) is provided with the supply ability from among the facility components (=arranged facilities RR) in the facility layout. That is, the supply process acquisition unit 75 acquires a service of "supplying the screw" (supply process IP(z)) by the "screw feeder" component (facility R(z)) as a service (supply process IP(z)) related to the service of "picking up the screw" (preparation process RP(x)). The supply process addition unit 76 adds "the combination of the supply process IP(z) and the facility R(z)" before "the combination of the preparation process RP(x) and the executing subject of the preparation process RP(x): the facility R(x)" in the process execution sequence (=design process data 61).

When it is necessary to set a value in advance for "the screw position (screw acquisition position): item to be set It(w)" in order to execute the service of "picking up the screw" (preparation process RP(x)), the supply process acquisition unit 75 further acquires the following information. That is, the supply process acquisition unit 75 acquires a value set for "the screw position (screw supply position): item to be set It(z)" defined for the service of "supplying the screw" (supply process IP(z)) of the "screw feeder" component (facility R(z)). Then, the supply process addition unit 76 sets the value set for "the screw supply position: item to be set It(z)" for "the screw acquisition position: item to be set It(w)". Hereinafter, details of the processing of "acquiring and adding the supply process IP" executed by the process design device 1 will be described.

For example, it is assumed that a task process PP(1), a task process PP(2), a task process PP(3), and a task process PP(4) are stored in the process execution sequence (=design process data 61) as an execution order in this order. Then, it is assumed that the following facilities R are associated as executing subjects of the task processes PP with the respective task processes PP in the process execution sequence. That is, it is assumed that a facility R(1) is associated with the task process PP(1), a facility R(2) is associated with the task process PP(2), a facility R(3) is associated with the task process PP(3), and a facility R(4) is associated with the task process PP(4), in the process execution sequence.

In this case, the part determination unit 74 acquires "an input element (workpiece) defined for the combination of the facility R(1) and the task process PP(1) (standard process CP(1)) in the facility data Dr" for the combination of the facility R(1) and the task process PP(1). Next, the part determination unit 74 determines whether or not the acquired input element has been supplied to the facility R(1) at the timing at which the facility R(1) is caused to execute the task process PP(1).

In addition, the part determination unit 74 determines whether or not an input element that is necessary for the facility R(2) to execute the task process PP(2) has been supplied to the facility R(2) at the timing at which the facility R(2) is caused to execute the task process PP(2) with reference to the facility data Dr, for the combination of the facility R(2) and the task process PP(2). Similarly, the part determination unit 74 determines whether or not an input element that is necessary for the facility R(3) to execute the task process PP(3) has been supplied to the facility R(3) at the timing at which the facility R(3) is caused to execute the task process PP(3) with reference to the facility data Dr, for the combination of the facility R(3) and the task process PP(3). In addition, the part determination unit 74 determines whether or not an input element that is necessary for the facility R(4) to execute the task process PP(4) has been supplied to the facility R(4) at the timing at which the facility R(4) is caused to execute the task process PP(4) with reference to the facility data Dr, for the combination of the facility R(4) and the task process PP(4).

If it is determined that the input element necessary for the facility R(3) to execute the task process PP(3) has not been supplied to the facility R(3) at the timing at which the facility R(3) is caused to execute the task process PP(3), for example, the part determination unit 74 notifies the supply process acquisition unit 75 of "the combination of the facility R(3) and the task process PP(3)".

The supply process acquisition unit 75 acquires a supply process IP that is a task process of "supplying 'the input element necessary for the facility R(3) to execute the task process PP(3)' to the facility R(3)" for "the combination of the facility R(3) and the task process PP(3)" notified from the part determination unit 74, first. The supply process acquisition unit 75 acquires the task process PP of "supplying 'the input element necessary for the facility R(3) to execute the task process PP(3)' to the facility R(3) as the supply process IP from among the standard processes CP defined in the standard process data Dd, for example.

The supply process acquisition unit 75 determines whether or not the acquired supply process IP is the standard process CP, and if it is determined that the supply process IP is the standard process CP, the supply process acquisition unit 75 associates "the facility R(x) defined as being able to execute the supply process IP in the facility data Dr" with the supply process IP. In addition, if it is determined that the supply process IP is the special process SP, the supply process acquisition unit 75 associates "the facility R(x) set as an executing subject of the supply process IP by the user" with the supply process IP. The supply process acquisition unit 75 notifies the supply process addition unit 76 of the supply process IP with which the facility R(x) has been associated as the executing subject, that is, "the combination of the supply process IP and the facility R(x) that is an executing subject of the supply process IP".

The supply process addition unit 76 adds "the combination of the supply process IP and the facility R(x) that is an executing subject of the supply process IP" notified from the supply process addition unit 76, to the design process data 61. That is, the supply process addition unit 76 adds the supply process IP notified from the supply process addition unit 76 as the task process PP to be executed before the task process PP(3), to the design process data 61. In addition, the supply process addition unit 76 stores "the facility R(x) that is an executing subject of the supply process IP" notified from the supply process addition unit 76 in the design process data 61 in association with the supply process IP.

The following data is stored in the design process data 61 by adding the aforementioned data by the supply process addition unit 76. That is, a task process PP(1), a task process PP(2), a supply process IP, a task process PP(3), and a task process PP(4) are stored in the design process data 61 as an execution order in this order. In addition, a facility R(1) is associated with the task process PP(1), a facility R(2) is associated with the task process PP(2), a facility R(x) is associated with the supply process IP, a facility R(3) is associated with the task process PP(3), and a facility R(4) is associated with the task process PP(4) as executing subjects of the respective task processes PP in the design process data 61.

(Example of Teaching from User and Setting of Value for Unset Item)

Figure 27:
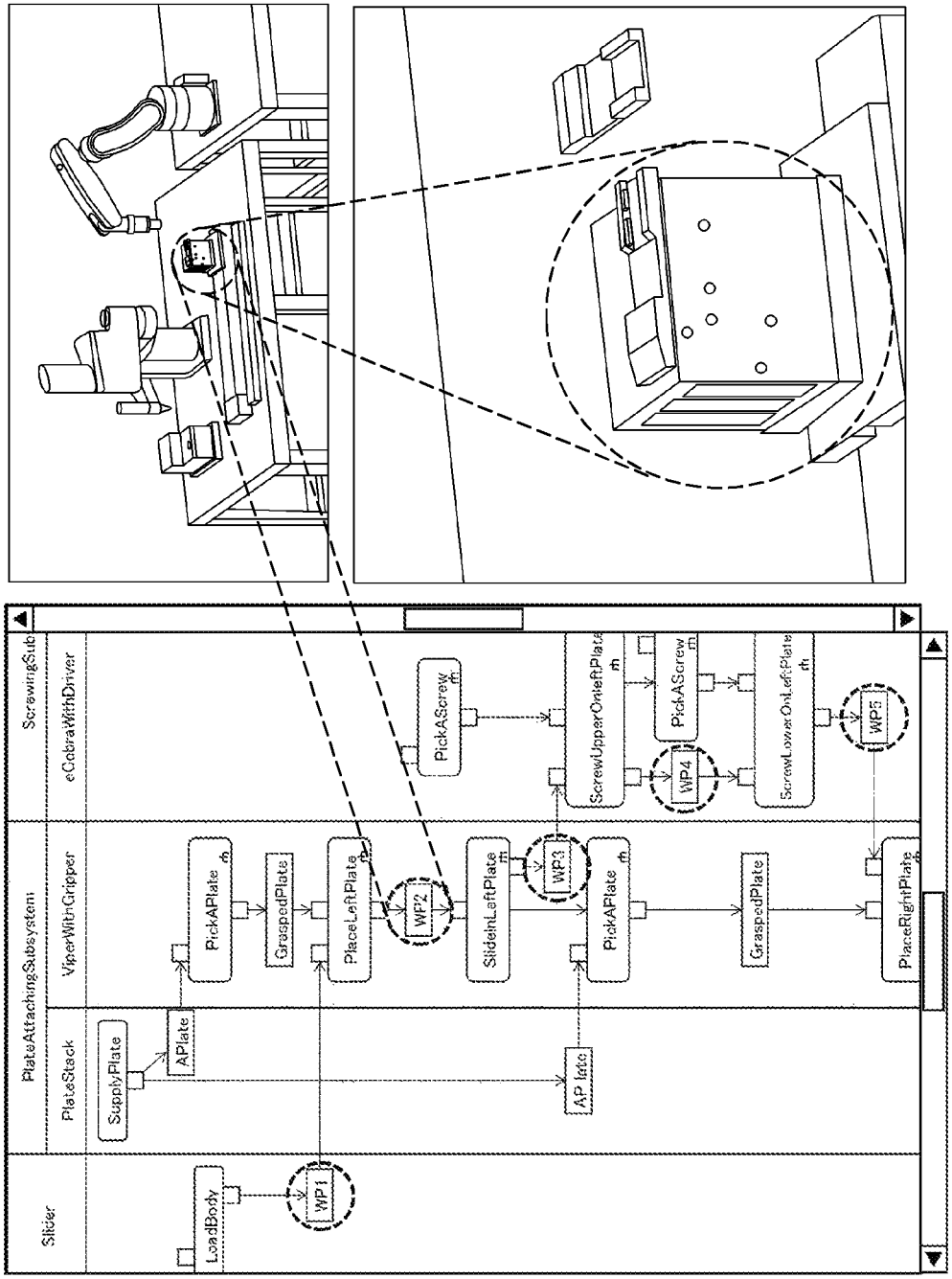
FIG. 27 is a diagram illustrating an example in which a value is set as an item to be set from a user's operation on a facility layout.

FIG. 27 is a diagram illustrating an example in which a value is set for an item to be set It from a user's operation on the facility layout and illustrates an example of the process design screen displayed by the process design device 1 that executes processing corresponding to S3-16 and S3-17 in FIG. 19.

The display control unit 30 of the process design device 1 causes the input and output elements (workpieces) defined in the facility data Dr for the combinations of the facilities R and the task processes PP with rectangular shapes (rectangular shapes with non-rounded corners) in the "process execution sequence" display section. The workpieces expressed with the rectangular shapes in the "process execution sequence" display section include absolute position information of the workpieces in the virtual production space (three-dimensional facility layout) provided by the layout creation device 6 in addition to information about the three-dimensional shapes and the two-dimensional shapes of the workpieces. The process design device 1 acquires the "absolute position information of the workpieces" from the layout creation device 6 and uses the acquired "absolute position information of the workpieces" as process execution service input information.

As described above, the items to be set It are defined for the combinations of the facilities R and the task processes PP (standard processes CP) in the facility data Dr, and the items to be set It include items to be set It related to the input and output elements (workpieces). Thus, the process design device 1 sets the "absolute position information of the workpieces" acquired from the layout creation device 6 for the items to be set It related to the input and output elements (workpieces), in particular, for the items to be set It for the positions of the input and output elements.

s4. Modification Examples (Applications to Disassembly Task Procedure)

In the embodiment described above, the example in which the process design device 1 sets the executing subjects (facilities R) and the like of the task processes PP for each of the plurality of task processes PP included in the "task procedure (assembly task procedure) for assembling the product" for each product has been described. However, the process design device 1 may set the executing subjects (facilities R) and the like of the task processes PP for each of the plurality of task processes PP included in the "task procedure (disassembly task procedure) for disassembling the product" for each product.

(Additional Registration of Control Program and the Like Added by User)

The process design device 1 may be able to add a special process SP as a new "standard process CP" to the standard process data Dd. In addition, the process design device 1 may add "a control program for causing the facility R(x) to realize the special process SP" added by the user to the facility data Dr. That is, the process design device 1 may add data that associates the "control program for causing the facility R(x) to realize the special process SP" to the facility data Dr for the combination of the special process SP and the facility R(x). In this manner, the user can use the special process SP as the standard process CP.

The production simulation device 7 can use the control program in simulation of assembling similar products by registering the "control program for causing the facility R(x) to execute the special process SP" that the process design device 1 has created once in the facility database 3.

(Implementation Example Using Software)

The control blocks of the process design device 1, the procedure generation device 5, the layout creation device 6, and the production simulation device 7 may be realized by a logic circuit (hardware) formed by an integrated circuit (IC chip) or the like or by software. For example, the standard process acquisition unit 11, the procedure acquisition unit 12, the facility acquisition unit 13, the process determination unit 20, the display control unit 30, the receiving unit 40, the first setting unit 51, the second setting unit 52, and the verification unit 70 in the process design device 1 may be realized by a logic circuit formed by an integrated circuit or the like or by software.

In the latter case, the process design device 1, the procedure generation device 5, the layout creation device 6, and the production simulation device 7 include a computer that executes instructions of a program which is software that realizes the respective functions. This computer includes one or more processors, for example, and also includes a non-transitory computer-readable recording medium that stores the aforementioned program. Then, the objective of the disclosure is achieved by the aforementioned processor reading and executing the aforementioned program from the aforementioned recording medium in the computer. A central processing unit (CPU), for example, can be used as the aforementioned processor. "A non-temporary tangible medium", for example, a tape, a disc, a card, a semiconductor memory, a programmable logical circuit, or the like as well as a read only memory (ROM) or the like can be used as the aforementioned recording medium. Also, a random access memory (RAM) and the like that develop the aforementioned program may be further included. In addition, the aforementioned program may be supplied to the aforementioned computer via an arbitrary transmission medium (a communication network, a broadcasting wave, or the like) that can transmit the program. Note that an aspect of the disclosure can also be realized in a form of a data signal that realizes the aforementioned program by electronic transmission and is embedded in a carrier wave.

The disclosure is not limited to the aforementioned respective embodiments, various modifications can be made within the scope of the claims, and embodiments obtained by appropriately combining the technical mechanisms respectively disclosed in different embodiments are also included within the technical scope of the disclosure.

What is claimed is:

1. A process design device that associates executing subjects that execute a plurality of task processes included in a task procedure for assembling or disassembling a product with the respective task processes, the device comprising:

a standard process acquisition unit that acquires standard process data defining a plurality of standard processes, each of which is a task process executable by at least one facility;

a facility acquisition unit that acquires, for each facility, facility data defining task processes executable by the facility;

a procedure acquisition unit that acquires procedure data defining a plurality of task processes for assembling or disassembling the product along with an execution order for each product;

a process determination unit that determines whether or not each of the plurality of task processes defined in the procedure data is included in the standard process data;

a display control unit that displays a special process that is a task process determined not to be included in the standard process data by the process determination unit on a display screen of the procedure data in an emphasized manner;

a receiving unit that receives a user's operation for setting the facilities for executing the special process displayed by the display control unit in the emphasized manner; and a setting unit that generates design process data that (1) associates, as an executing subject, a facility defined as a facility capable of executing a task process determined to be included in the standard process data by the process determination unit in the facility data with the task process and (2) associates, as the executing subject, the facility set by the user's operation with the special process, from among the plurality of task processes defined along with the execution order in the procedure data, wherein for each combination of a facility and a task process in the facility data, an input element necessary for the facility to execute the task process is defined, and the process design device further comprises:

a part determination unit that determines, for the combination of the facility and the task process in the design process data, whether or not an input element defined for the combination in the facility data is supplied to the facility at a timing at which the facility is caused to execute the task process, and a supply process addition unit that adds, to the design process data, a supply process that is a task process of supplying the input element to the facility as a task process to be executed before a task process of a combination determined by the part determination unit that the input element is not supplied.

2. The process design device according to claim 1, wherein for each combination of the facility and the task process in the facility data, an item that needs to set a value in advance to cause the facility to execute the task process is defined, the process design device further includes an item determination unit that determines for a combination of the facility and the task process in the design process data whether or not the value has been set for the item defined for the combination in the facility data, the display control unit displays information prompting setting of a value for the item for which the item determination unit has determined that no value has been set, the receiving unit receives a user's operation for inputting the value for the item, and the setting unit associates the item for which the value input by the user's operation has been set with the combination in the design process data.

3. The process design device according to claim 2,
wherein in the facility data, state transition information describing at least (A) an initial state of the facility, (B) an execution state that is a state in which the facility is executing a task process executable by the facility, (C) a stand-by state in which the task process executed in the execution state is executable by the facility, and (D) a transition relationship between the initial state, the execution state, and the stand-by state is defined for each facility, and the process design device further comprises:

a state determination unit that determines, for a combination of the facility and the task process in the design process data, whether or not the facility is in the stand-by state for the task process defined in the state transition information of the facility at a timing at which the facility is to be caused to execute the task process, a preparation process acquisition unit that acquires, for a task process of a combination determined not to be in the stand-by state by the state determination unit, a preparation process that is a task process to be executed in a state that the facility reaches before transition from the initial state or the execution state of the task process to the stand-by state of the task process in the state transition information of the facility, and a preparation process addition unit that adds, to the design process data, the preparation process acquired by the preparation process acquisition unit as a task process to be executed by the facility before the task process of the combination determined not to be in the stand-by state by the state determination unit.

4. The process design device according to claim 1,
wherein in the facility data, state transition information describing at least (A) an initial state of the facility, (B) an execution state that is a state in which the facility is executing a task process executable by the facility, (C) a stand-by state in which the task process executed in the execution state is executable by the facility, and (D) a transition relationship between the initial state, the execution state, and the stand-by state is defined for each facility, and the process design device further comprises:

a state determination unit that determines, for a combination of the facility and the task process in the design process data, whether or not the facility is in the stand-by state for the task process defined in the state transition information of the facility at a timing at which the facility is to be caused to execute the task process, a preparation process acquisition unit that acquires, for a task process of a combination determined not to be in the stand-by state by the state determination unit, a preparation process that is a task process to be executed in a state that the facility reaches before transition from the initial state or the execution state of the task process to the stand-by state of the task process in the state transition information of the facility, and a preparation process addition unit that adds, to the design process data, the preparation process acquired by the preparation process acquisition unit as a task process to be executed by the facility before the task process of the combination determined not to be in the stand-by state by the state determination unit.

5. A procedure generation device that supports a user generating the procedure data acquired by the process design device according to claim 1, the procedure generation device comprising:

a shape presenting unit that presents, to a user, a three-dimensional shape of the product or a three-dimensional shape of each of one or more workpieces that form the product for each product; and a process presenting unit that presents, to a user, each of a plurality of standard processes defined in the standard process data.

6. A method of controlling a process design device having a processor that associates an executing subject that executes each of a plurality of task processes included in a task procedure for assembling or disassembling a product with each task process, the method comprising:

a standard process acquisition step of acquiring, by the processor, standard process data defining a plurality of standard processes, each of which is a task process executable by at least one facility;

a facility acquisition step of acquiring, by the processor, facility data defining task processes executable by the facility for each facility;

a procedure acquisition step of acquiring, by the processor, procedure data defining a plurality of task processes for assembling or disassembling the product along with an execution order for each product;

a process determination step of determining, by the processor, whether or not each of the plurality of task processes defined in the procedure data is included in the standard process data;

a display control step of displaying, by the processor, a special process that is a task process determined not to be included in the standard process data in the process determination step in an emphasized manner on a display screen of the procedure data;

a receiving step of receiving, by the processor, a user's operation for setting the facilities for executing the special process displayed in the display control step in the emphasized manner;

a setting step of generating, by the processor, design process data that (1) associates, as an executing subject, a facility defined as a facility capable of executing a task process determined to be included in the standard process data by the process determination unit in the facility data with the task process and (2) associates, as the executing subject, the facility set by the user's operation with the special process, from among the plurality of task processes defined along with the execution order in the procedure data, wherein for each combination of a facility and a task process in the facility data, an input element necessary for the facility to execute the task process is defined;

a part determination step of determining, by the processor, for the combination of the facility and the task process in the design process data, whether or not an input element defined for the combination in the facility data is supplied to the facility at a timing at which the facility is caused to execute the task process; and a supply process addition step of adding, by the processor, to the design process data, a supply process that is a task process of supplying the input element to the facility as a task process to be executed before a task process of a combination determined by the part determination unit that the input element is not supplied.

7. A non-transitory computer readable recording medium that records an information processing program that causes a computer to execute:
- a standard process acquisition step of acquiring standard process data defining a plurality of standard processes, each of which is a task process executable by at least one facility;
- a facility acquisition step of acquiring facility data defining task processes executable by the facility for each facility;
- a procedure acquisition step of acquiring procedure data defining a plurality of task processes for assembling or disassembling the product along with an execution order for each product;
- a process determination step of determining whether or not each of the plurality of task processes defined in the procedure data is included in the standard process data;
- a display control step of displaying a special process that is a task process determined not to be included in the standard process data in the process determination step in an emphasized manner on a display screen of the procedure data;
- a receiving step of receiving a user's operation for setting the facilities for executing the special process displayed by the display control unit in the emphasized manner;
- a setting step of generating design process data that (1) associates, as an executing subject, a facility defined as a facility capable of executing a task process determined to be included in the standard process data by the process determination unit in the facility data with the task process and (2) associates, as the executing subject, the facility set by the user's operation with the special process, from among the plurality of task processes defined along with the execution order in the procedure data,
- wherein for each combination of a facility and a task process in the facility data, an input element necessary for the facility to execute the task process is defined;
- a part determination step of determining, for the combination of the facility and the task process in the design process data, whether or not an input element defined for the combination in the facility data is supplied to the facility at a timing at which the facility is caused to execute the task process; and
- a supply process addition step of adding, to the design process data, a supply process that is a task process of supplying the input element to the facility as a task process to be executed before a task process of a combination determined by the part determination unit that the input element is not supplied.

* * * * *